(12) United States Patent
Ohkura et al.

(10) Patent No.: US 7,035,536 B2
(45) Date of Patent: Apr. 25, 2006

(54) FLASH CONTROL MECHANISM

(75) Inventors: Tadahisa Ohkura, Saitama (JP); Yutaka Ohsawa, Tokyo (JP); Shigeru Iwamoto, Saitama (JP); Takuya Hasegawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 108 days.

(21) Appl. No.: 10/778,221

(22) Filed: Feb. 17, 2004

(65) Prior Publication Data

US 2004/0218915 A1  Nov. 4, 2004

(30) Foreign Application Priority Data

Feb. 18, 2003 (JP) ............................ P2003-040018

(51) Int. Cl.
G03B 15/03 (2006.01)
(52) U.S. Cl. .................................... 396/177
(58) Field of Classification Search ................ 396/177, 396/178
See application file for complete search history.

(56) References Cited

U.S. PATENT DOCUMENTS

| 3,876,889 | A |   | 4/1975  | Kawasaki | 327/94  |
|-----------|---|---|---------|----------|---------|
| 5,471,370 | A | * | 11/1995 | Takami   | 362/4   |
| RE35,415  | E |   | 12/1996 | Takami   | 396/165 |
| RE36,726  | E |   | 6/2000  | Kakiuchi | 396/263 |
| 6,222,997 | B1| * | 4/2001  | Ebe      | 396/177 |
| 2002/0071673 | A1 | * | 6/2002 | Kaihara et al. | 396/358 |

FOREIGN PATENT DOCUMENTS

| JP | 3-233529 | 10/1991 |
| JP | 4-86630  | 3/1992  |
| JP | 9-211570 | 8/1997  |

OTHER PUBLICATIONS

English language Abstract of JP 4-86630, Published Feb. 19, 2004.
English language Abstract of JP 3-233529, Published Oct. 17, 1991.
English language Abstract of JP 9-211570, published Aug. 15, 1997.

* cited by examiner

*Primary Examiner*—Michael Tokar
*Assistant Examiner*—Rishi Suthar
(74) *Attorney, Agent, or Firm*—Greenblum & Bernstein, P.L.C.

(57) ABSTRACT

A flash case, in which a flash is provided, is automatically moved to an up position, when a user selects a flash mode in a state where the flash case is at a down position, when a user begins to forcibly raise the flash case by hand in a state where the flash case is at the down position, or when the flash case is at the down position in a state where a photometric operation starts in an auto-flash mode. The flash case is automatically moved to the down position, when an external force is added to the flash case at the up position.

12 Claims, 43 Drawing Sheets

FLASH CONTROL MECHANISM

BACKGROUND OF THE INVENTION

1. Field of the Invention

The present invention relates to a camera, specifically the control of an up-down operation of a flash case.

2. Description of the Related Art

Conventionally, a flash case in which a flash is built is provided at an upper plane of a camera body. When a single-lens reflex camera is used in a situation where a flash light is needed, it is preferable that the flash case is positioned far from a photographing lens in order to prevent the red-eye phenomena. Therefore, the flash case is rotatably supported at the upper plane. When the luminance of an object is sufficient and it is not necessary to supply illumination light, the flash case is kept in an area of the upper plane. When the luminance of the object is low and it is necessary to give a suitable exposure to the object, the flash case is raised, the illumination light is supplied by driving the flash, and the object is photographed. After photographing, the flash case is put back in the area of the upper plane.

The up-down operation of the flash case is carried out by manipulating a button which is provided at a predetermined position on the camera body or by pushing down the flash case to a position where the flash case is received in the area of the upper plane. However, it is necessary to manipulate the button every time the up-down operation is performed. Also, as some distance exists between the use position (up position) and the receiving position (down position), sometimes the flash case can not be put back to the receiving position. Namely, there is the problem that the manipulation of the flash case is troublesome. Further, after photographing with flash light, if the flash case is not put back to the down position, there is the problem that the flash case and the camera becomes bulky because the flash case projects from the upper plane of the camera body. Further, in this situation, there is also the problem that the flash case is easily broken.

SUMMARY OF THE INVENTION

Therefore, an object of the present invention is to improve the manipulation of the flash case.

In accordance with an aspect of the present invention, there is provided a flash controlling mechanism of a camera comprising: a flash; a flash case in which the flash is housed, and which is rotatably supported by a camera body; a case rotating mechanism that moves the flash case between a down position at which the flash case is received by the camera body and an up position at which the flash case projects from the camera body; and a controller. The controller controls the case rotating mechanism such that: when the flash case at the down position is pulled up to the up position by an external force, the flash case is automatically moved to the up position; when the flash case at the up position is pressed to the down position by an external force, the flash case is automatically moved to the down position; and when the flash case is at the up position and a power source of the camera body is turned off, the flash case is automatically moved to the down position.

Preferably, the flash controlling mechanism further comprises: a first position detector that detects a current position of the flash case; a position memory in which a detected result of the first position detector is memorized; and a comparator that compares the current position detected by the first position detector with the detected result which has been memorized by the position memorizer. When the current position is different from the memorized detected result, the controller drives the case rotating mechanism such that the flash case is moved to a position opposite to the memorized detected result. When the power source is turned off and the current position is the up position, the controller drives the case rotating mechanism such that the flash case is moved to the down position.

For example, the first position detector is a switch, the switch is off when the flash case is at the down position, the switch is on when the flash case is at the up position, and the on/off status of the switch is changed when the flash case passes a predetermined angle position between the up and down positions.

Preferably, the case rotating mechanism comprises: a motor; a gear train that transmits the rotational force of the motor; a cam gear that is connected to the gear train, a cam being formed on one plane of the cam gear; a cam follower that is moved in accordance with the rotation of the cam due to the rotation of the cam gear; a converting mechanism that converts the movement of the cam follower to the rotation of the flash case; a second position detector that detects a position of the flash case; and a motor controller that controls the driving of the motor in accordance with the detected result of the second position detector.

For example, the second position detector includes: a brush that is provided on another plane of the cam gear; a code plate that is provided so as to face the another plane of the cam gear, and on which detecting areas for detecting the movement of the flash case caused by the rotation of the cam gear, are formed; and a switch that works in accordance with the contact and non-contact status between the brush and the detecting area.

Preferably, the case rotating mechanism includes: a first connecting member that is mounted on and moved with the flash case, the first connecting member having a first engaging portion; a second connecting member that includes a second engaging portion which is capable of engaging with the first engaging portion; an urging member that urges the second connecting member such that the second connecting member is engaged with the first connecting member; a pressing member that is moved together with the second connecting member, the pressing member being arm shaped and extending to the first connecting member, such that a predetermined space exists between the second engaging portion and the pressing member and a driving mechanism that rotates the second connecting member. The first engaging portion is engaged with one of the second engaging portion and the pressing member.

Preferably, the urging member urges the second connecting member in a first direction whereby the flash case is moved to the up position, and the first engaging portion is engaged with the pressing member when the second connecting member is driven in a second direction opposite to the first direction by the driving mechanism.

According to the present invention, if the power source of the camera body is turned off in a state where the flash case is at the up position, the flash case is automatically moved to the down position. Accordingly, in this situation, it is unnecessary for a user to manipulate the flash case so as to return it to its down position, and the inconvenience of the manipulation is removed.

If the user tries to directly raise the flash case when it is at the down position by hand, the flash case is automatically moved to the up position by the controller. Further, if the user directly presses down the flash case when it is at the up position, the flash case is automatically moved to the down position. Accordingly, the convenience of manipulating the flash case is improved.

Further, due to the above-mentioned down operation of the flash case, the camera body is not carried around with the flash case staying at the up position. Accordingly, the flash and the camera body is prevented from being damaged.

BRIEF DESCRIPTION OF THE DRAWINGS

The objects of the present invention will be better understood from the following description, with reference to the accompanying drawings, in which:

FIG. 19 shows a metal brush, which is provided on a cam gear, so as to be seen through;

DESCRIPTION OF THE PREFERRED EMBODIMENTS

Figure 1:
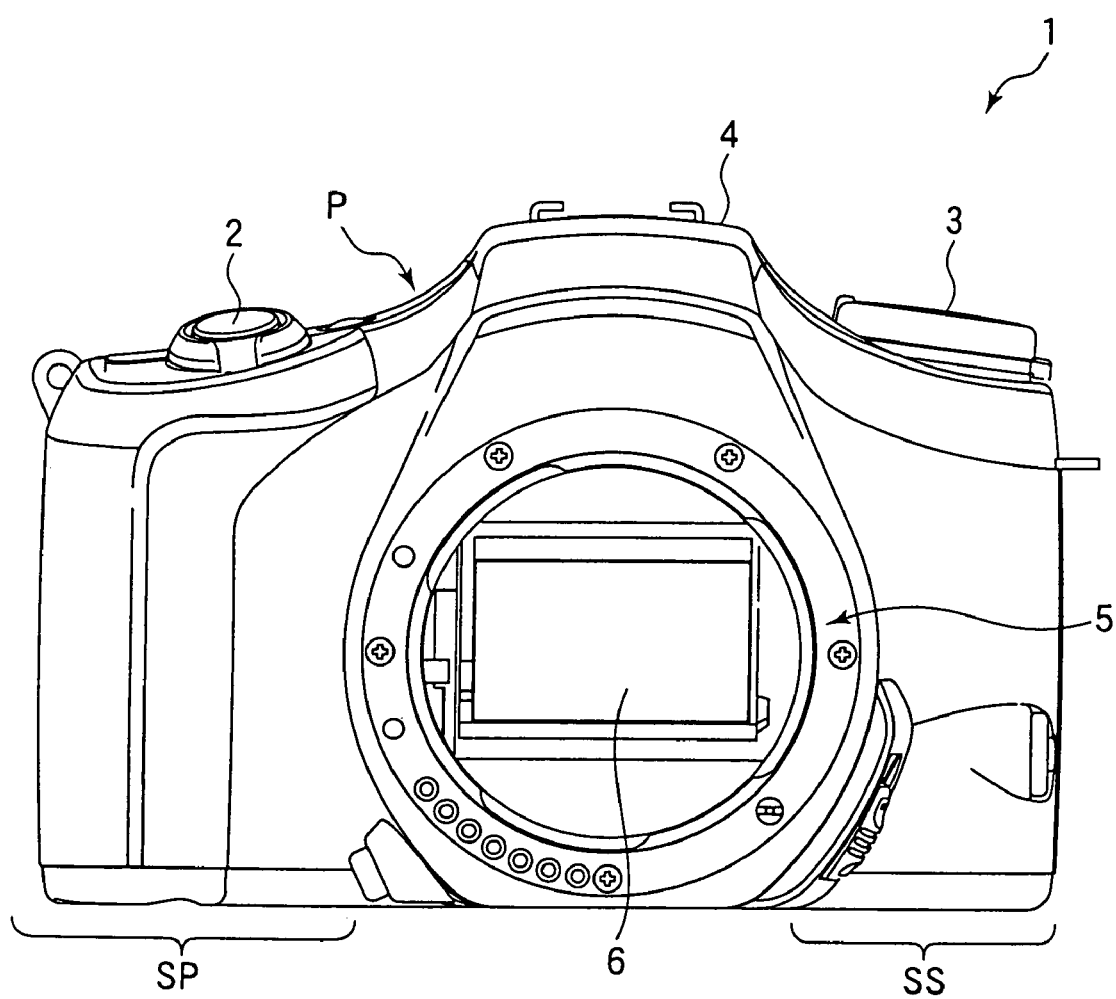
FIG. 1 is a front view of a camera body of a single lens reflex camera to which an embodiment according to the present invention is applied.

The present invention will now be described with reference to an embodiment shown in the drawings.

Figure 2:
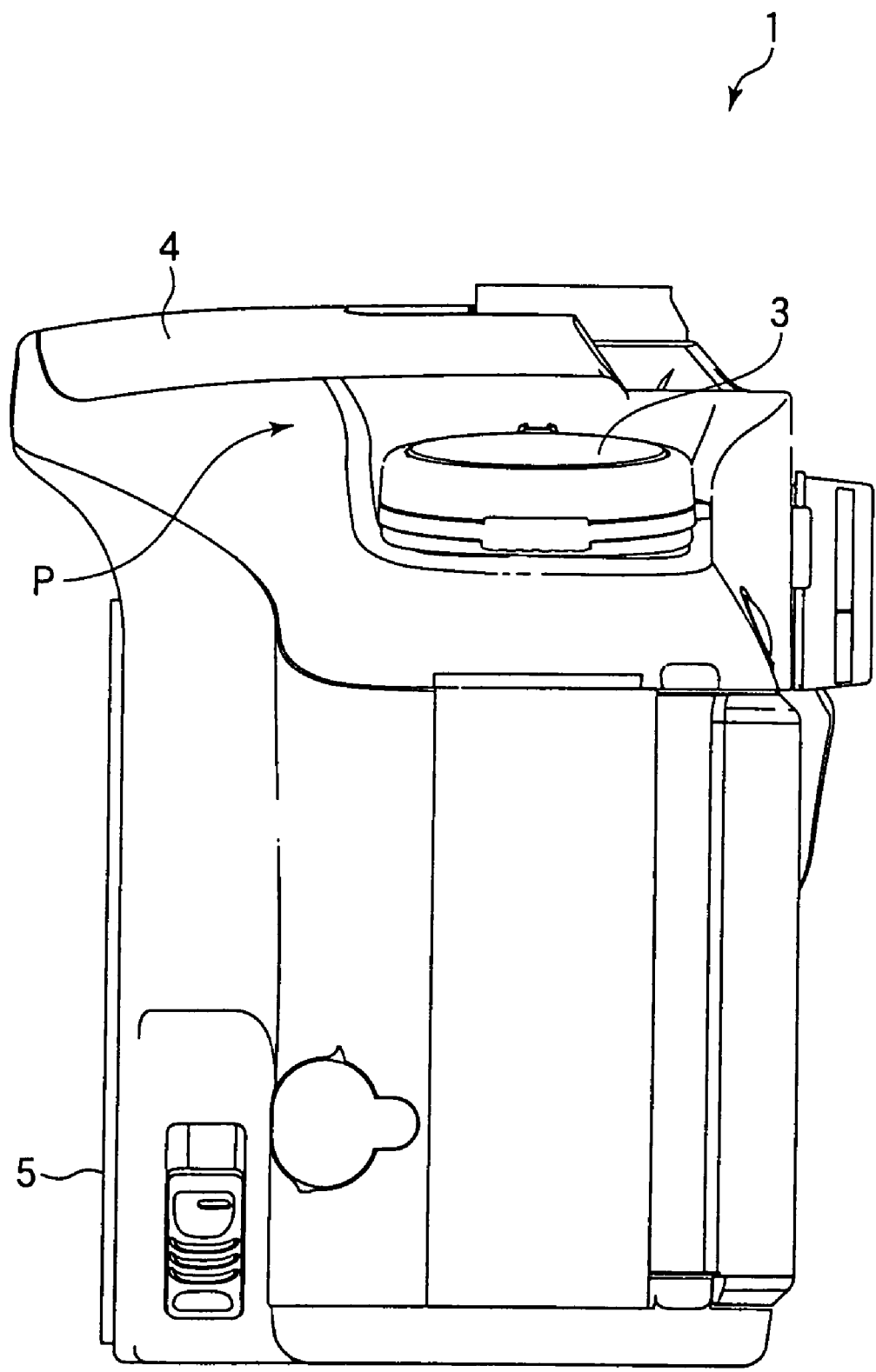
FIG. 2 is a side view of the camera body, viewed at the right side of FIG. 1.

FIG. 1 is a front view of a camera body 1 of a single lens reflex camera to which an embodiment according to the present invention is applied. FIG. 2 is a side view of the camera body 1, viewed from the right side of FIG. 1.

An upper casing plate P is placed on the upper side of the camera body 1. A release button 2 is provided on the plate P, being positioned at the left side in FIG. 1. A setting dial 3 for setting various modes is provided on the plate P, being position at the right side in FIG. 1. A flash case 4 is positioned at the center of the plate P. A flash (not shown) is built in the flash case 4, being positioned at the front side end of the camera body 1. The flash case 4 is rotatably supported by a shaft which is provided at the back side end of the camera body 1. When the flash is not used, the flash case 4 is held at a storage position as shown in FIGS. 1 and 2. When the flash is used, the flash case 4 is rotated around the above-mentioned shaft, the front side end in which the flash is built is moved upwardly, and the flash case 4 is held in an operating position. A lens mount 5 is provided at the center of the camera body 1. A quick return mirror 6 is provided in the camera body 1, being on an optical axis of a lens barrel which is mounted on the lens mount 5.

Figure 3:
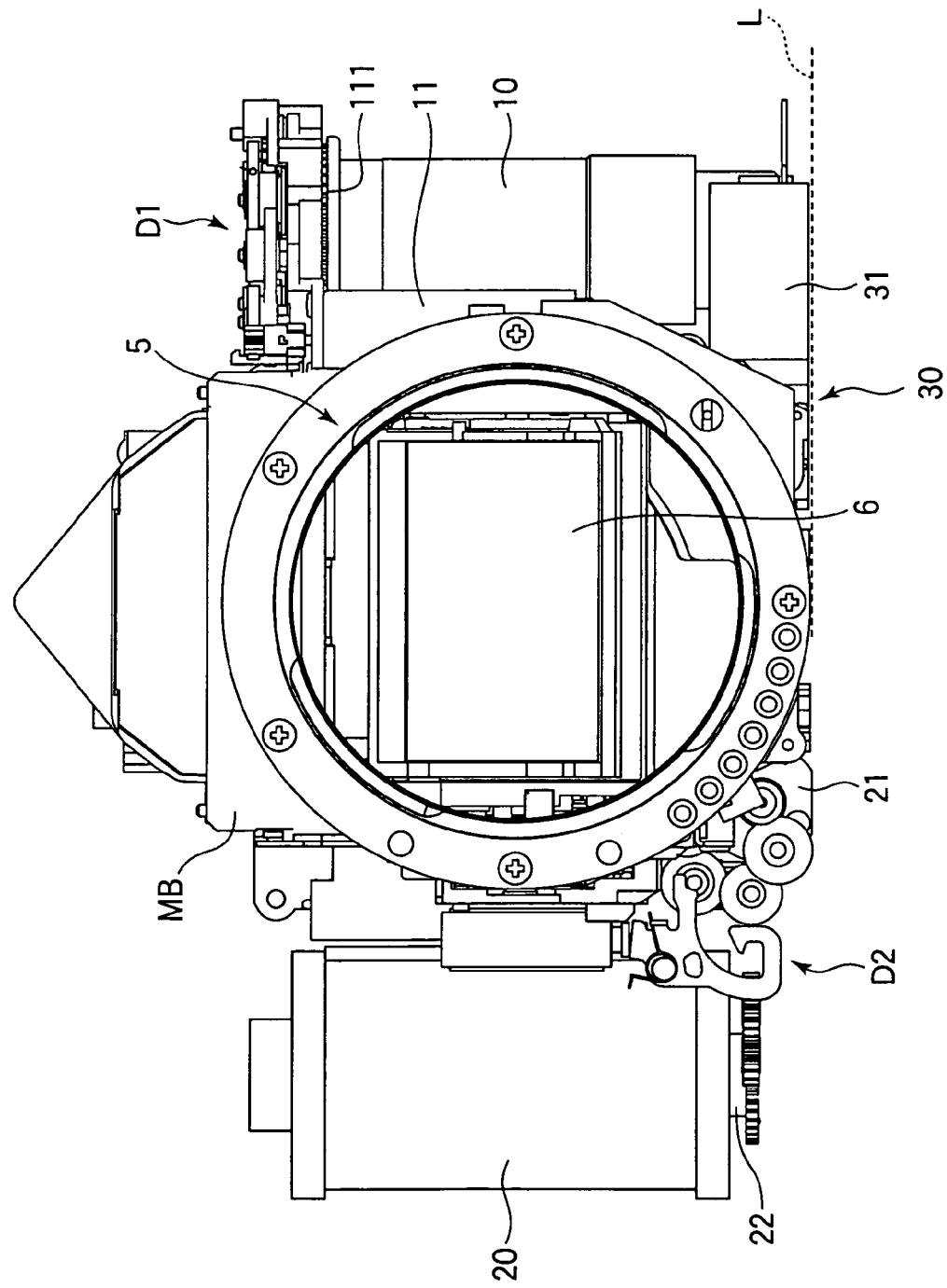
FIG. 3 is a front view of an inside structure of the camera body.
Figure 4:
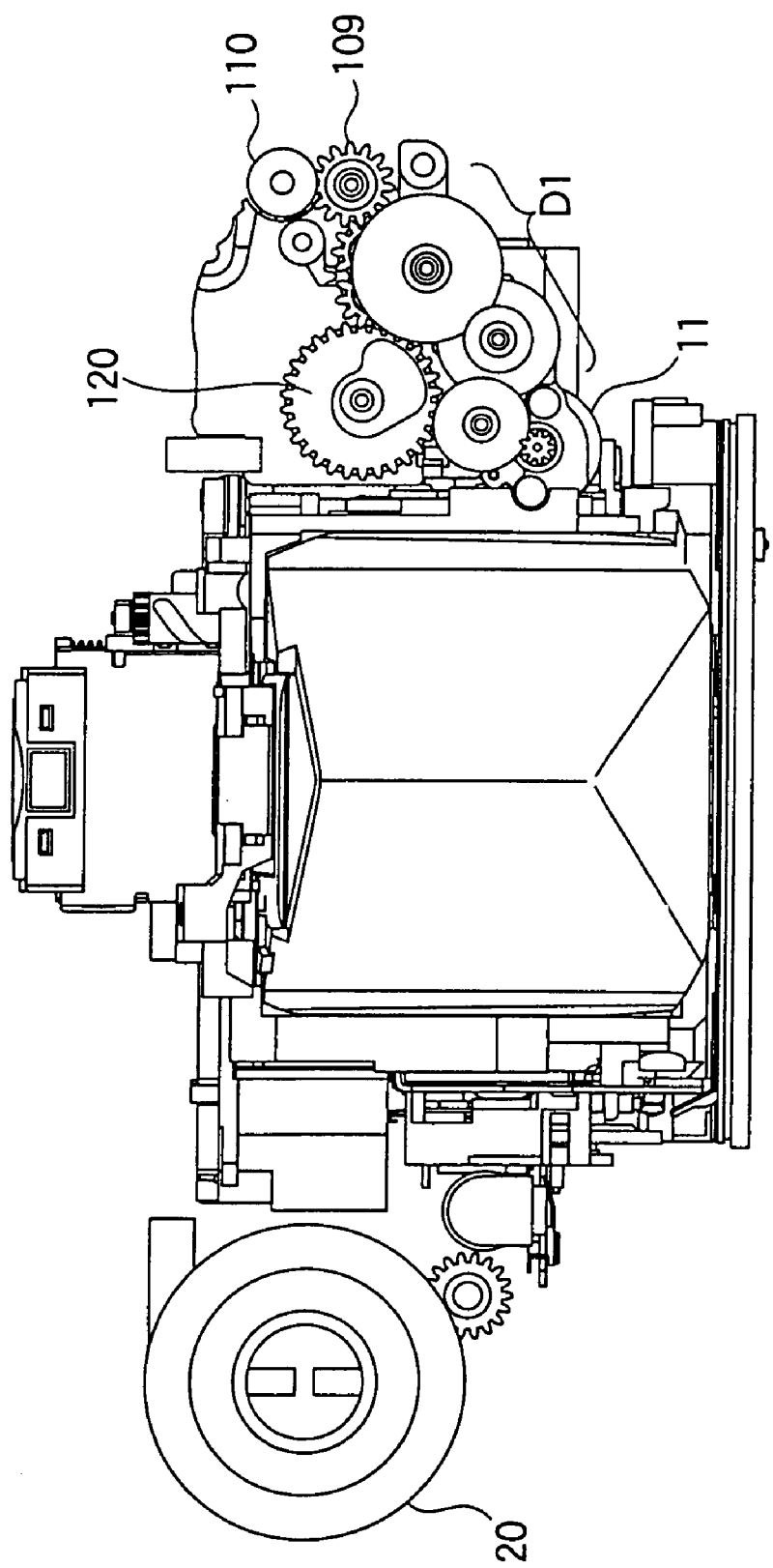
FIG. 4 is a plane view of the inside structure.
Figure 5:
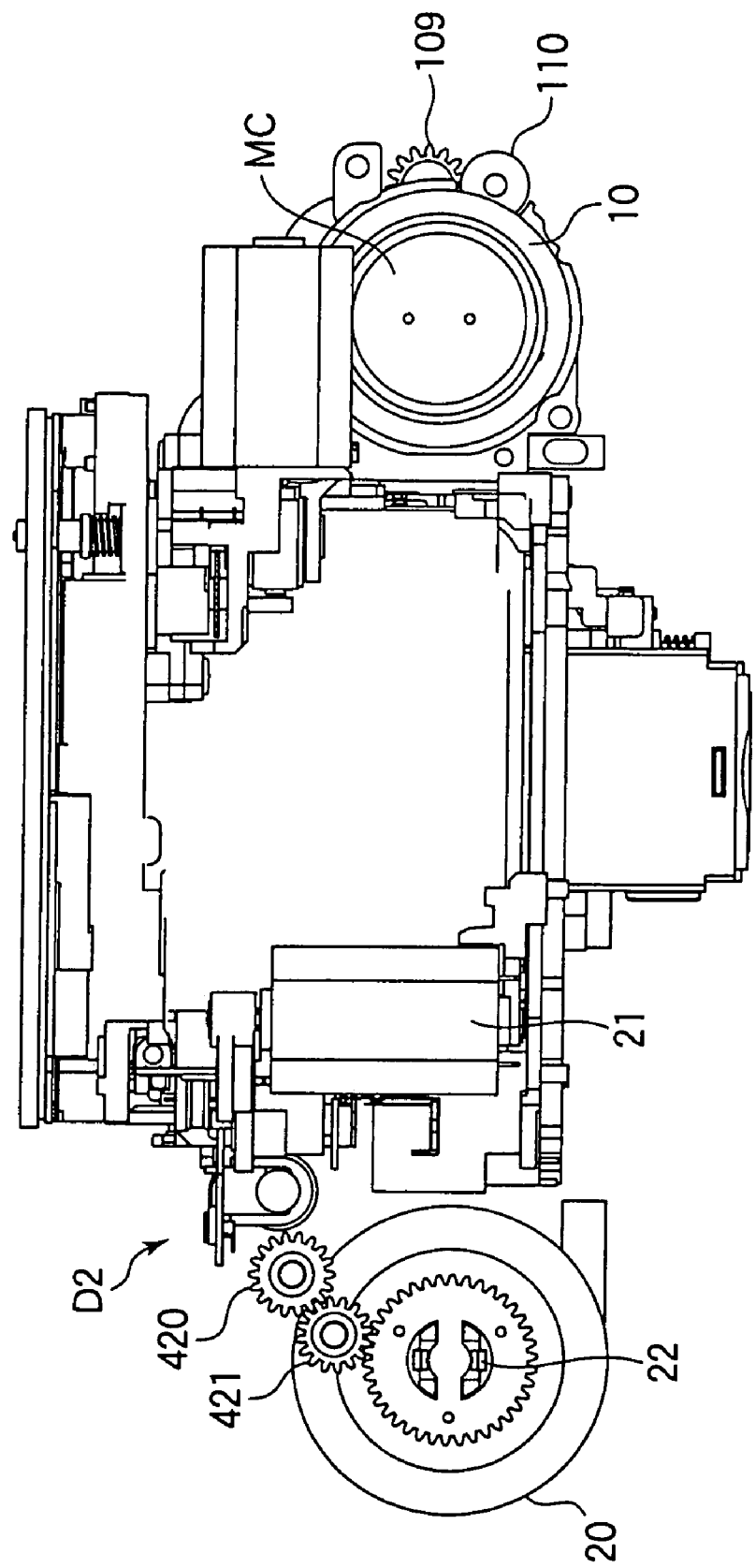
FIG. 5 is a bottom view of the inside structure.
Figure 6:
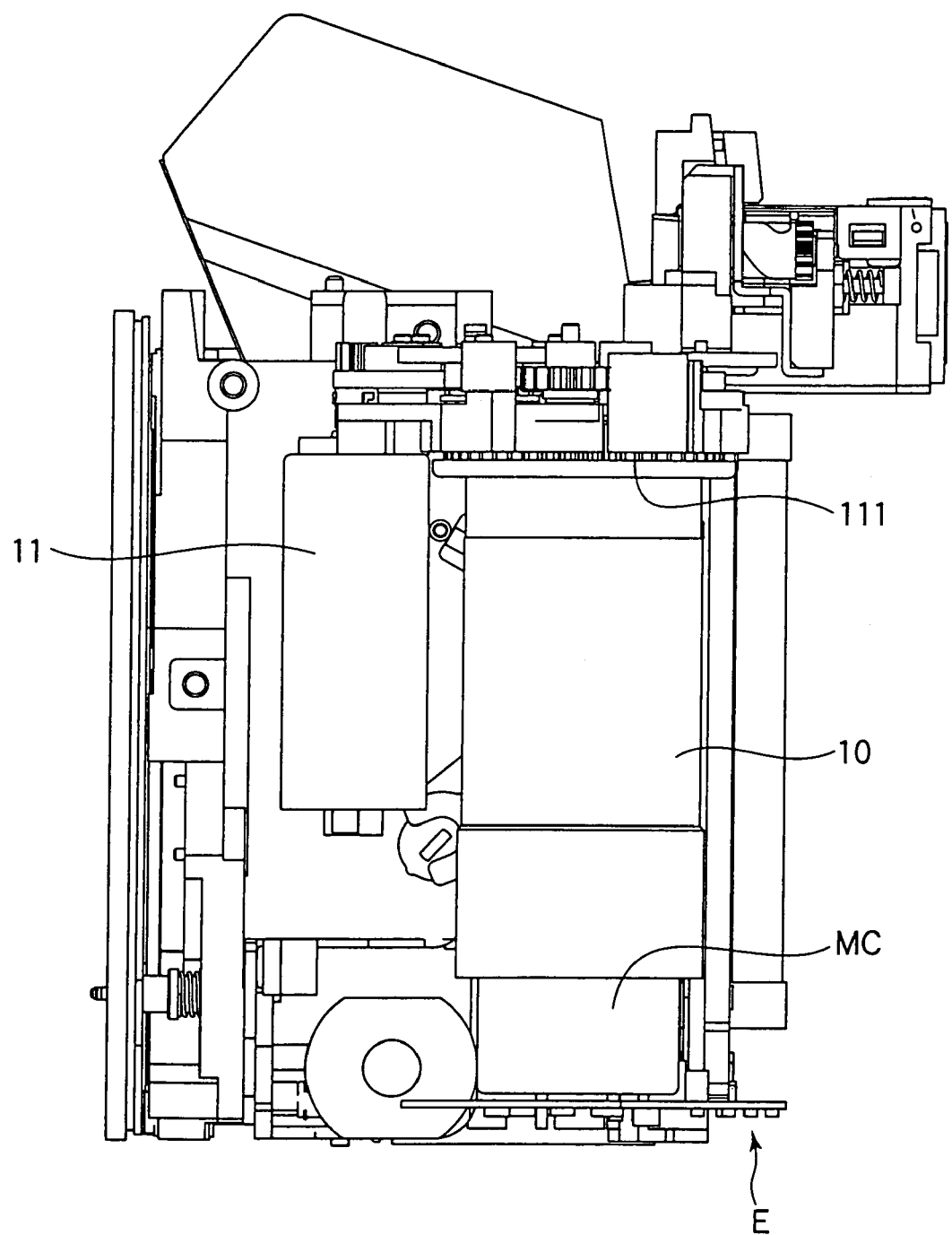
FIG. 6 is a side view of the inside structure, viewed from the right side of FIG. 3.

FIG. 3 is a front view of an inside structure of the camera body 1, FIG. 4 is a plane view of the inside structure, FIG. 5 is a bottom view of the inside structure, and FIG. 6 is a side view of the inside structure, viewed from the right side of FIG. 3. A first motor 11 is provided adjacent to a spool 10. The rotation of the first motor 11 is optionally transmitted to an up-down mechanism of the flash or the spool 10, through a first speed reducing mechanism D1. The transmission of the rotation of the first motor 11 to the spool 10 is performed through a friction gear 109, a connecting gear 110, and a spool gear 111 of the spool 10. Further, the rotation of the first motor 11 is transmitted to the up-down mechanism of the flash, namely the driving mechanism of the flash case 4, through a cam gear 120. With respect to the rotation of the first motor 11, a first change mechanism 14 (see FIG. 7) of the first speed reducing mechanism D1 changes the transmission of the rotational force between the spool 10 and the up-down mechanism. A second motor 21 is provided adjacent to the bottom of the cartridge room 20. A controller CR (see FIG. 7) controls the start and stop of rotation and the rotational directions of the first motor 11 and the second motor 21. Note that, the first change mechanism 14 and the controller CR are explained later.

The rotation of the second motor 21 is transmitted to a rewinding fork 22 of the cartridge room 20 and driving mechanisms of the quick return mirror 6, a diaphragm (not shown) and a shutter (not shown). With respect to the rotation of the second motor 12, a second change mechanism 23 (see FIG. 21) of a second transmitting mechanism D2 changes the transmission of the rotational force between the rewinding fork 22 and the driving mechanisms. Note that, the second change mechanism 23 is explained later.

Figure 7:
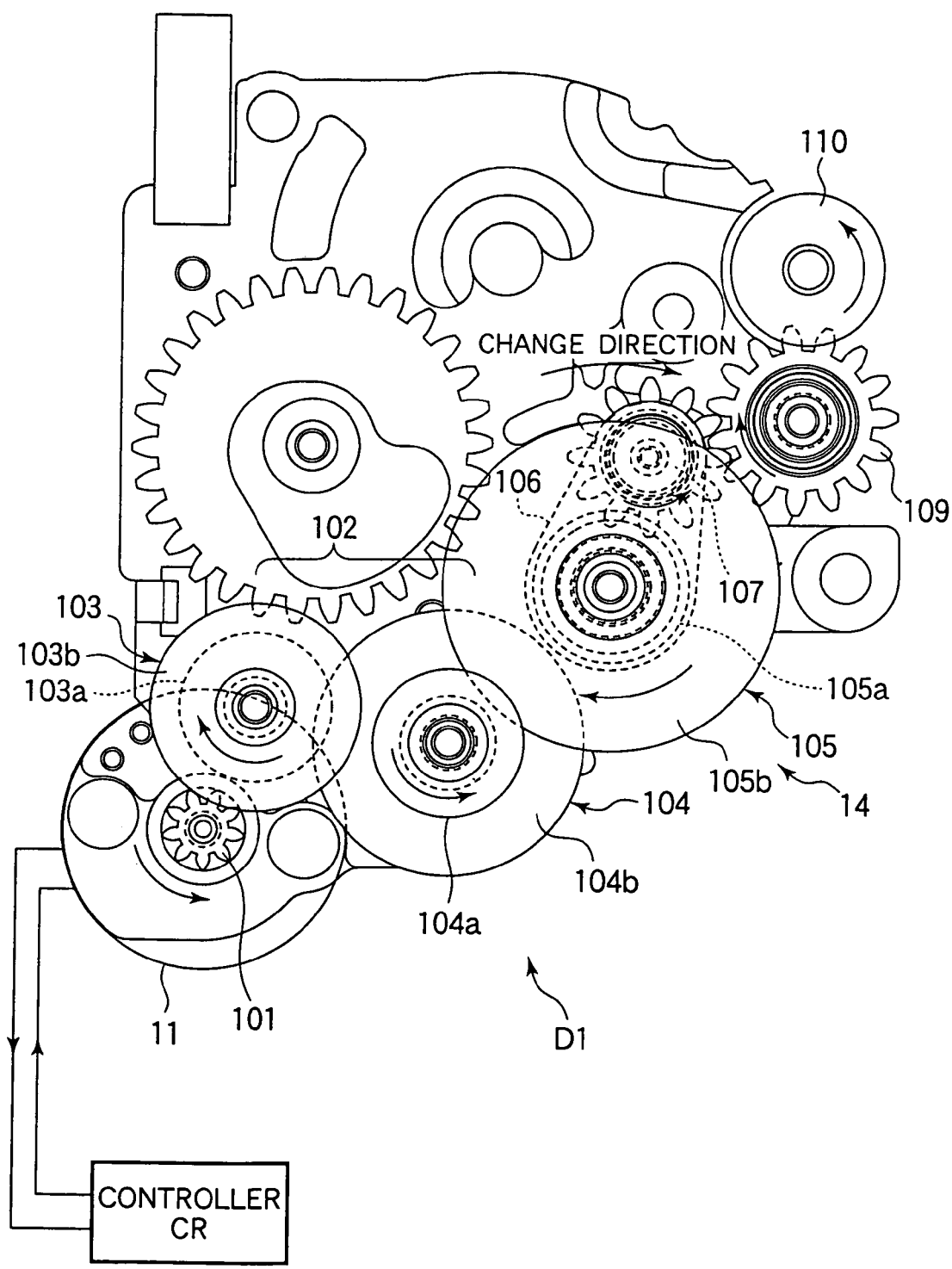
FIG. 7 is a plane view of a gear structure of a first speed reducing mechanism when the rotation of a first motor is transmitted to a spool.
Figure 8:
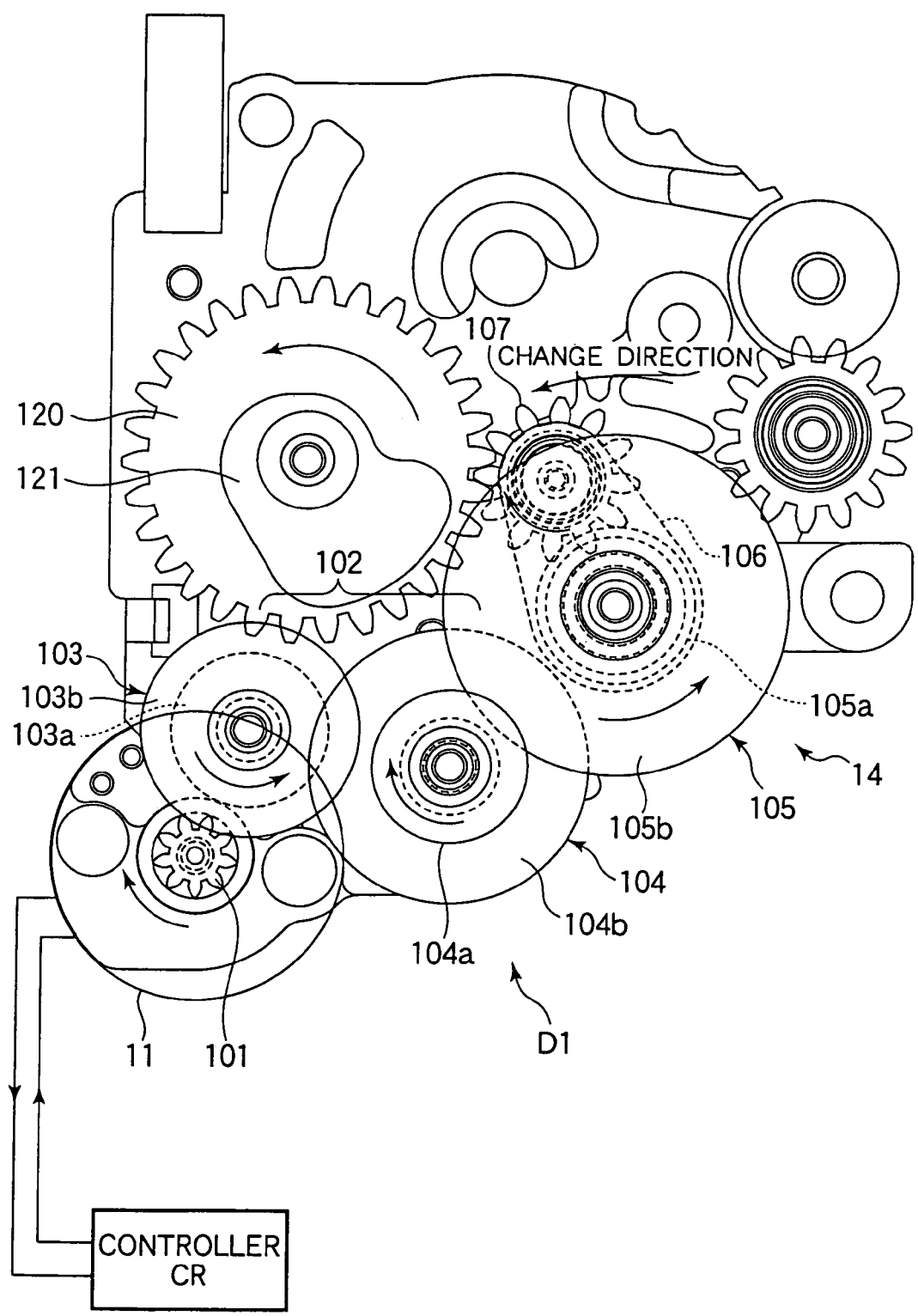
FIG. 8 is a plane view of a gear structure of the first speed reducing mechanism when the rotation of the first motor is transmitted to an up-down operating mechanism of a flash case.

FIGS. 7 and 8 are plane views of the structure of the first speed reducing mechanism D1. In the first mechanism D1, a pinion gear 101 is fixed at the output shaft of the first motor 11. A speed reduction gear train 102 includes first and second reduction gears 103 and 104. The reduction gear 103 includes a small-diameter gear 103*a* and a large-diameter gear 103*b* which are unitarily formed, being coaxial. Similarly, the reduction gear 104 includes a small-diameter gear 104*a* and a large-diameter gear 104*b* which are unitarily formed, being coaxial. The pinion gear 101 is engaged with the gear 103*b* of the reduction gear 103, and the gear 103*a* of the reduction gear 103 is engaged with the gear 104*b* of the reduction gear 104.

A sun gear 105 includes a small-diameter gear 105*a* and a large-diameter gear 105*b* which are unitarily formed, being coaxial. The gear 105*b* is engaged with the gear 104*a* of the reduction gear 104. Namely, the rotation of the first motor 11 is decelerated at a predetermined speed reduction ratio and is transmitted to the sun gear 105.

A rotating plate 106 is pivoted by the rotating shaft of the sun gear 105. A planet gear 107 is rotatably provided at the end of the rotating plate 106, being engaged with the small-diameter gear 105*a* of the sun gear 105. The rotating plate 106 and the planet gear 107 are elements of the first change mechanism 14.

When the first motor 11 is rotated in the reverse direction (the counterclockwise direction in FIG. 7), the rotation is transmitted to the sun gear 105 through the pinion gear 101 and the speed reduction gear train 102, and the sun gear 105 is rotated in the clockwise direction. As shown in FIG. 7, in accordance with the rotation of the sun gear 105 in the clockwise direction, the rotating plate 106 is rotated in the clockwise direction around the center shaft of the sun gear 105. Due to the rotation of the rotating plate 106, the planet gear 107 is moved to be engaged with a friction gear 109.

The friction gear 109 is engaged with the connection gear 110. The connection gear 110 is engaged with the spool gear 111 (see FIGS. 3 and 6), which is coaxial with the central axis of the rotation of the spool 10. Accordingly, while the first motor 11 is rotating, the rotation of the first motor 11 is transmitted to the spool 10 through the pinion gear 101, the speed reduction gear train 102, the sun gear 105, the planet gear 107, the friction gear 109, the connection gear 110, and the spool gear 111, so that the film is wound.

When the first motor 11 is rotated in the forward direction (the clockwise direction in FIG. 8), the rotation is transmitted to the sun gear 105 through the pinion gear 101 and the speed reduction gear train 102, and the sun gear 105 is rotated in the counterclockwise direction. As shown in FIG. 8, in accordance with the rotation of the sun gear 105 in the counterclockwise direction, the rotating plate 106 is rotated in the counterclockwise direction around the central shaft of the sun gear 105. Due to the rotation of the rotating plate 106, the planet gear 107 is engaged with the cam gear 120.

Figure 9:
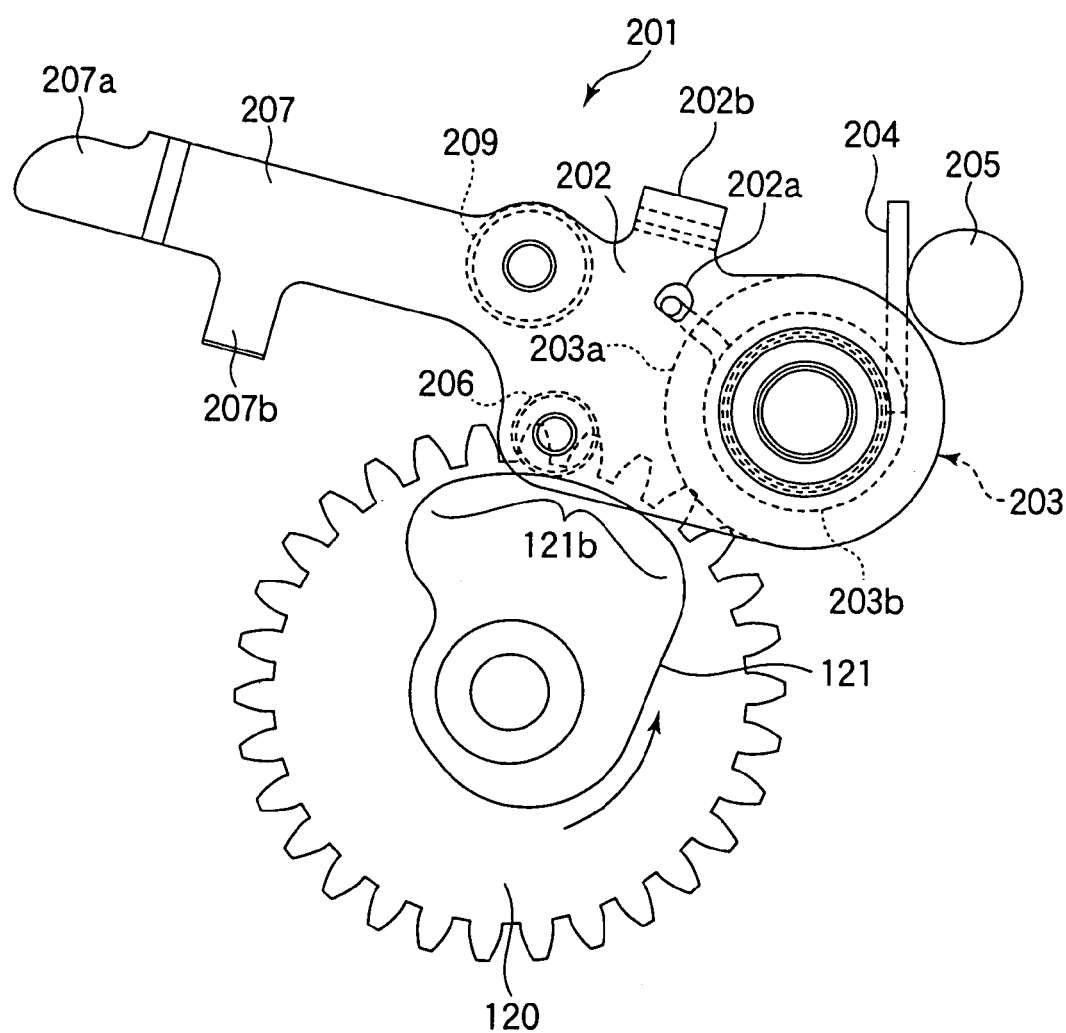
FIG. 9 is a plane view of a cam gear and a rotating lever of the up-down operating mechanism of the flash case.
Figure 10:
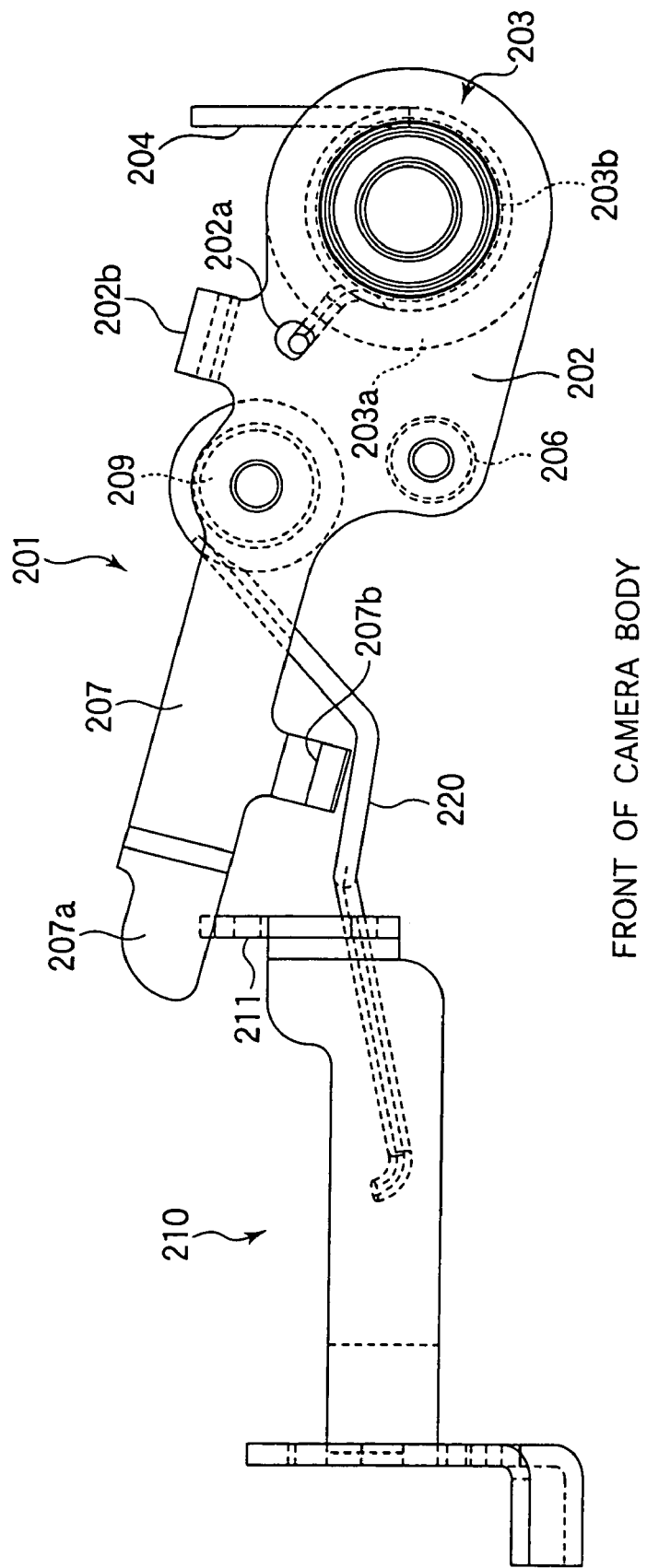
FIG. 10 is a plane view of the rotating lever, a rotating arm, and a press spring of the up-down operating mechanism.
Figure 11:
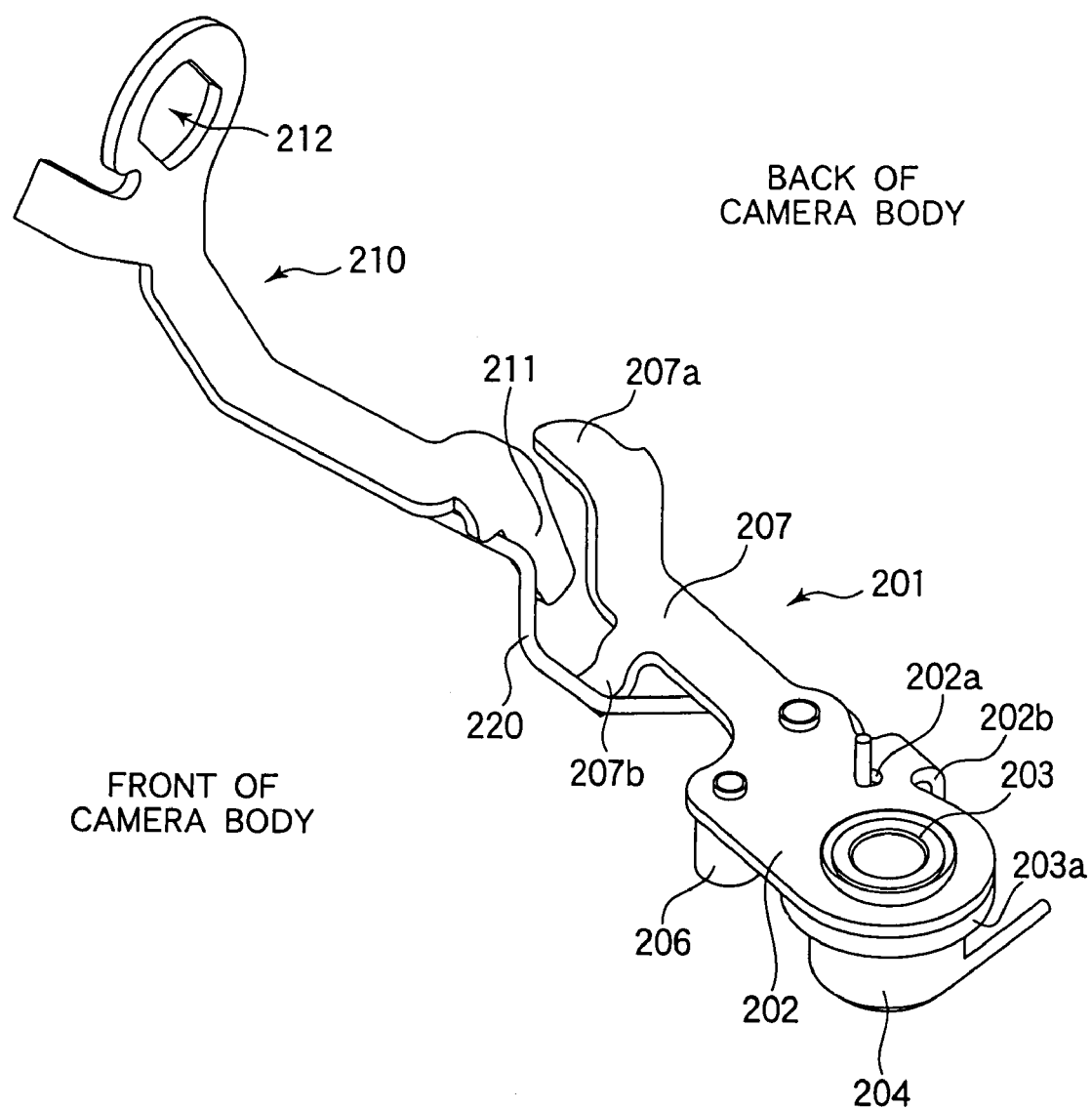
FIG. 11 is a perspective view of the rotating lever, the rotating arm, and the press spring.

FIG. 9 is a plane view which shows the cam gear 120 and a rotating lever 201. FIG. 10 is a plane view which shows the rotating lever 201, a rotating arm 210, and a press spring 220, and FIG. 11 is a perspective view of the lever 201, the arm 210, and the spring 220. The lever 201, the arm 210, and the spring 220 are members which compose an up-down mechanism of the flash case 4. Note that, in FIG. 9, a side at which the cam gear 120 is positioned corresponds to the front side of the camera body 1.

A rotating shaft 203 is provided at a base portion 202 of the rotating lever 201 in such a manner that the shaft 203 is positioned on the plane opposite to the first speed reducing mechanism D1. The rotating lever 201 is rotatably supported by the shaft 203. The shaft 203 includes a large diameter portion 203*a* and a small diameter portion 203*b*. A pop-up spring 204 is wound around the outer surface of the portion 203*b*. As shown in FIG. 9, one end of the pop-up spring 204 is in contact with a pin 205 which is fixedly provided on the inner surface of the camera body 1, and another end of the spring 204 is penetrated through a hole 202*a* which is formed at the base portion 202. The pop-up spring 204 urges the rotating lever 201 in the counterclockwise direction in FIGS. 9 and 10, at all times. Namely, the lever 201 is urged by the pop-up spring 204 from the back side to the front side of the camera body 1.

Similar to the shaft 203, a cam follower 206, which is cylindrical, is fixedly provided at the base portion 202. An arm engaging piece 207*a* and a spring engaging piece 207*b* are formed at an engaging portion 207 of the rotating lever 201. The rotating arm 210 is engaged with the arm-engaging piece 207*a*. The press spring 220 is generally arm shaped. One portion of the press spring 220 is engaged with the spring-engaging piece 207*b*. Further, a supporting pin 209, which is cylindrical, is provided adjacent to the cam follower 206 at the base portion 202 of the lever 201, in such a manner that the pin 209 is projected to the first change mechanism 14.

As shown in FIGS. 10 and 11, an engaging piece 211 is formed at one end of the rotating arm 210. The engaging piece 211 is engaged with the arm engaging piece 207*a* of the rotating lever 201 and one end of the press spring 220. Further, as shown in FIG. 11, an engaging hole 212 is formed at another end of the rotating arm 210. A case shaft 301 (described later) of the flash case 4 is engaged with the hole 212.

Another end of the press spring 220 which is a wirelike member is wound around the pin 209 of the base 202 of the rotating lever 201. The tip of the end of the press spring 220 is in contact with the piece 202b formed on the base 202, being securely engaged. The end continues to a straight portion. The straight portion is bent at two points at predetermined angles. The part of the straight portion, between the two bent points, is engaged with the piece 207b. Further, the straight portion continues to the end which is engaged with the engaging piece 211 as described above. As shown in FIG. 11, the engaging piece 211 of the rotating arm 210 is between the press spring 220 and the piece 207a of the rotating lever 201. Namely, the press spring 220 is moved together with the lever 201, and extends to the arm 210 such that a predetermined space exists between the press spring 220 and the engaging arm piece 207a.

As shown in FIG. 9, a cam 121 is provided on a plane, which faces the rotating lever 201, of the cam gear 120. The cam 121 is a wall-like member which has a predetermined height, including a straight portion and several curved portions which have different centers of curvature. When the cam 121 is moved in accordance with the rotation of the cam gear 120, the cam follower 206 is moved along the outline of the cam 121. Accordingly, the rotating lever 201 is rotated around the rotating shaft 203.

Figure 12:
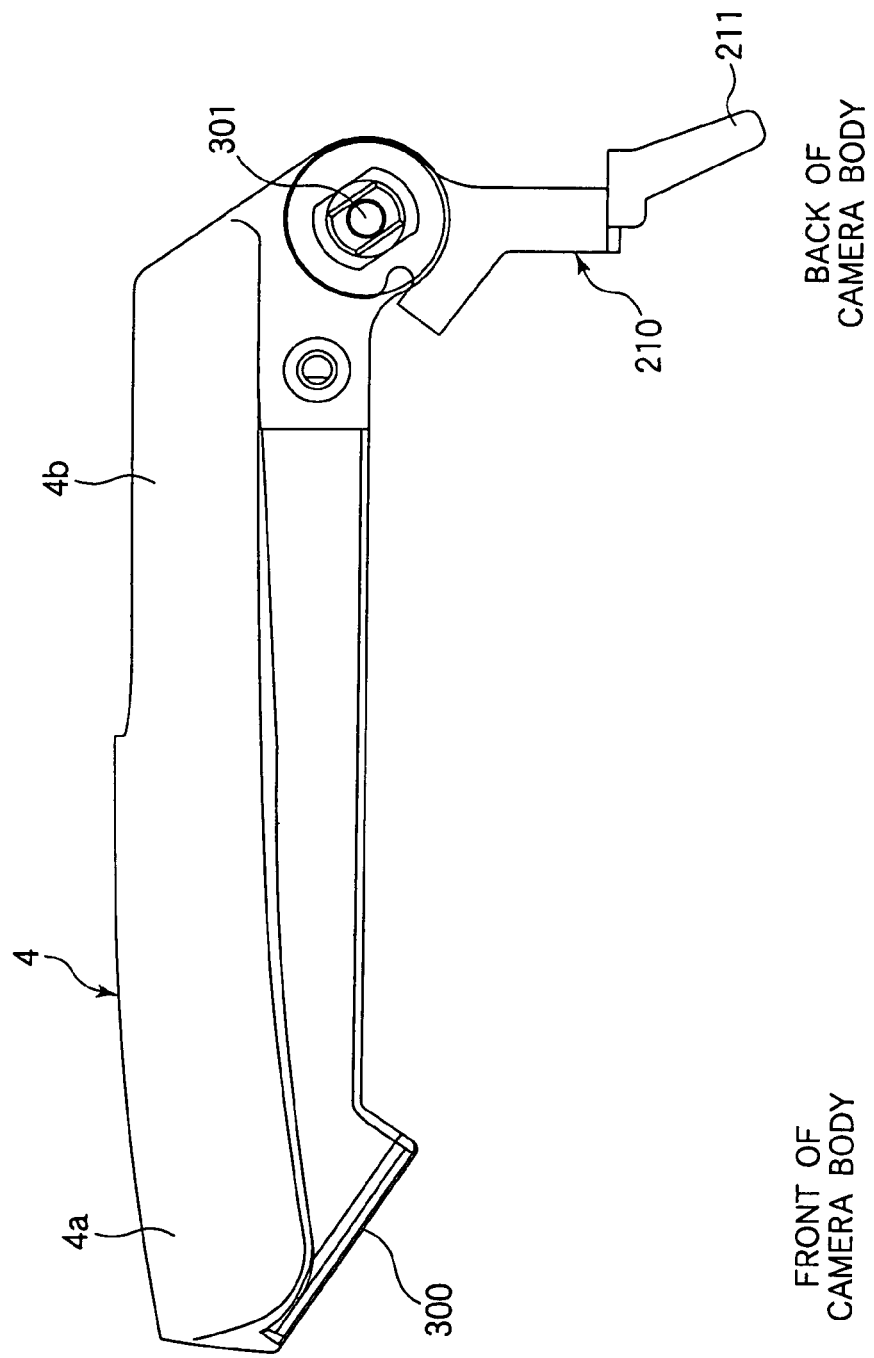
FIG. 12 is a side view of the rotating arm of the up-down operating mechanism and the flash case.

FIG. 12 is a side view which shows the rotating arm 210 and the flash case 4. The flash case 4 includes a head portion 4a and a pair of leg portions 4b. These portions are unitarily formed. A flash light emitting unit 300 is provided in the head portion 4a. The flash case 4 is situated in such a manner that the head 4a is positioned at the front side of the camera body 1 and the pair of leg portions 4b are positioned at the back side of the camera body 1. A case shaft 301 is fixed at one of the pair of legs portions 4b. The shaft 301 is fixed in the engaging hole 212 (see FIG. 11) of the rotating arm 210, being caulked. Accordingly, the flash case 4 is rotated in accordance with the rotation of the rotating arm 210.

As described above, when the first motor 11 is rotated in the forward direction, the planet gear 107 is moved to be engaged with the cam gear 120. When the first motor 11 keeps rotating in this situation, the rotation of the first motor 11 is transmitted to the cam gear 120, so that the cam gear 120 keeps rotating in the counterclockwise direction in FIG. 8. In accordance with the rotation of the cam gear 120, the rotating lever 201 is rotated around the rotating shaft 203 through the cam 121 and the cam follower 206 (see FIG. 9).

Figure 13:
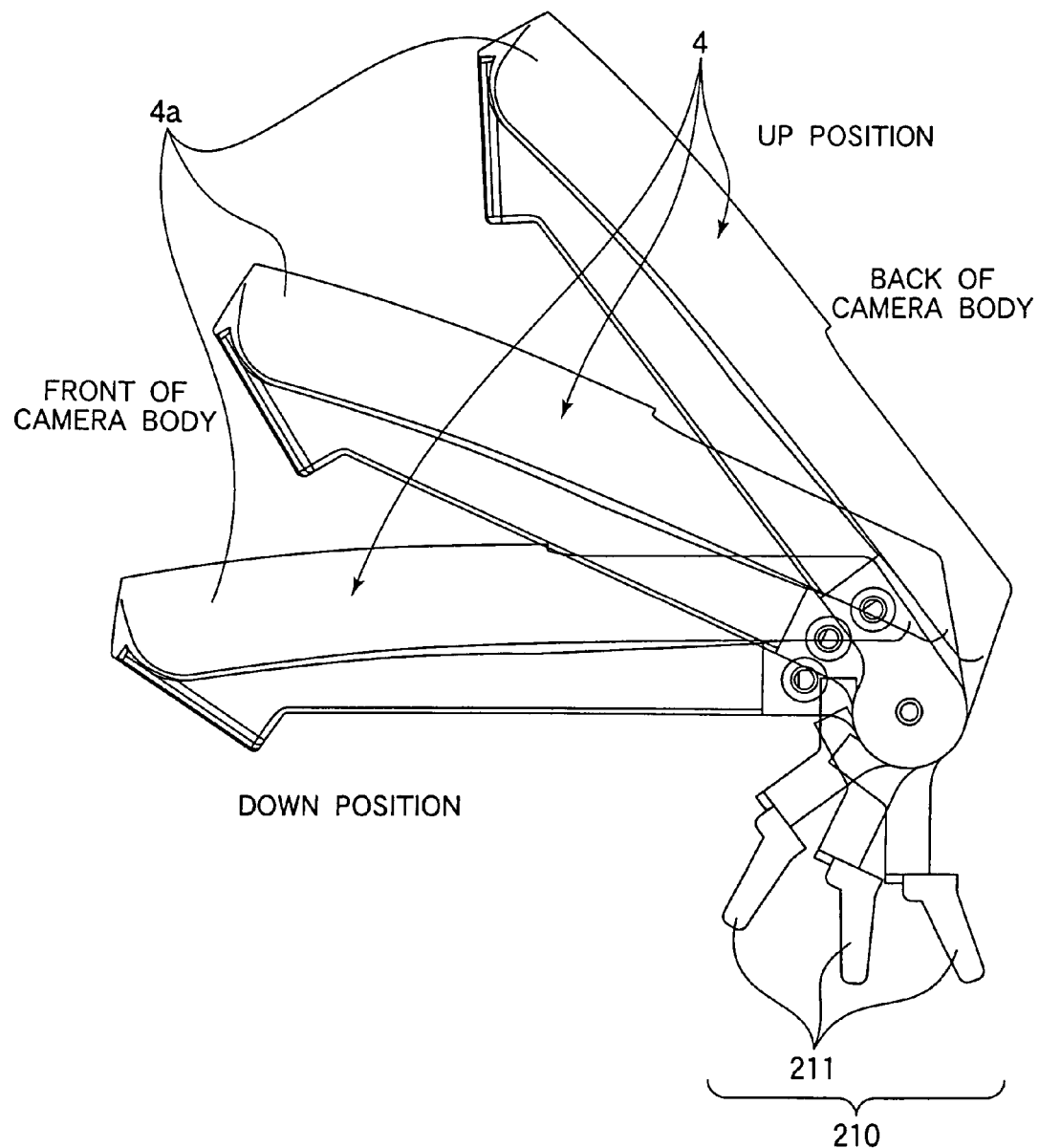
FIG. 13 is a side view which shows the motion of the rotating arm of the up-down operating mechanism and the flash case.

Now, the up-down operation of the flash case 4 is explained. FIGS. 9 through 11 show the positional relationship between the rotating lever 201, the rotating arm 210, and the press spring 220 when the flash case 4 is down, namely when the flash case 4 is received in the upper portion of the camera body 1. When the cam follower 206 is in the area 121b of the cam 121, the cam follower 206 is positioned farthest from the central axis. In other words, the cam follower 206 is positioned at the back side of the camera body 1. In this situation, the rotating lever 201 is positioned at the back side of the camera body 1, resisting against the urging force of the pop-up spring 204, and accordingly the press spring 220 is engaged with the piece 211 of the rotating arm 210 and the rotating arm 210 is positioned at the back side of the camera body 1. Accordingly, the flash case 4 is situated at the down position as shown in FIG. 13.

As described above, the rotating lever 201 is urged by the pop-up spring 204 in the direction from the back side to the front side of the camera body 1, at all times. Namely, the rotating lever 201 is urged towards the front side of the camera body 1, causing the rotating arm member 210 to urge the flash case 4 to the up position. Also, the cam follower 206 is urged to be in contact with the cam 121, at all times. Accordingly, if the cam gear 120 keeps rotating in the counterclockwise direction in the situation shown in FIG. 9, the cam follower 206 is moved along the cam 121 and the rotating lever 201 is gradually moved from the back side to the front side of the camera body 1.

In accordance with the movement of the rotating lever 201, the piece 207a of the lever 201 engages with the piece 211 of the rotating arm 210, the arm 210 is rotated so that the piece 211 is moved from the back side to the front side of the camera body 1.

As described above, the flash case 4 is rotated together with the rotating arm 210. Accordingly, the head portion 4a of the flash case 4 begins to gradually rise. When the cam follower 206 is moved to the position shown in FIG. 14, the flash case 4 is positioned at the up position as shown in FIG. 13. Note that, if the flash case 4 is moved from the up position to the down position by some external force, the rotating arm 210 rotates the rotating lever 201 in the direction against the urging force of the pop-up spring 204, namely in the direction by which the cam follower 206 is parted from the contact surface of the cam 121. Accordingly, the cam 121 is not effected by the external force.

Figure 14:
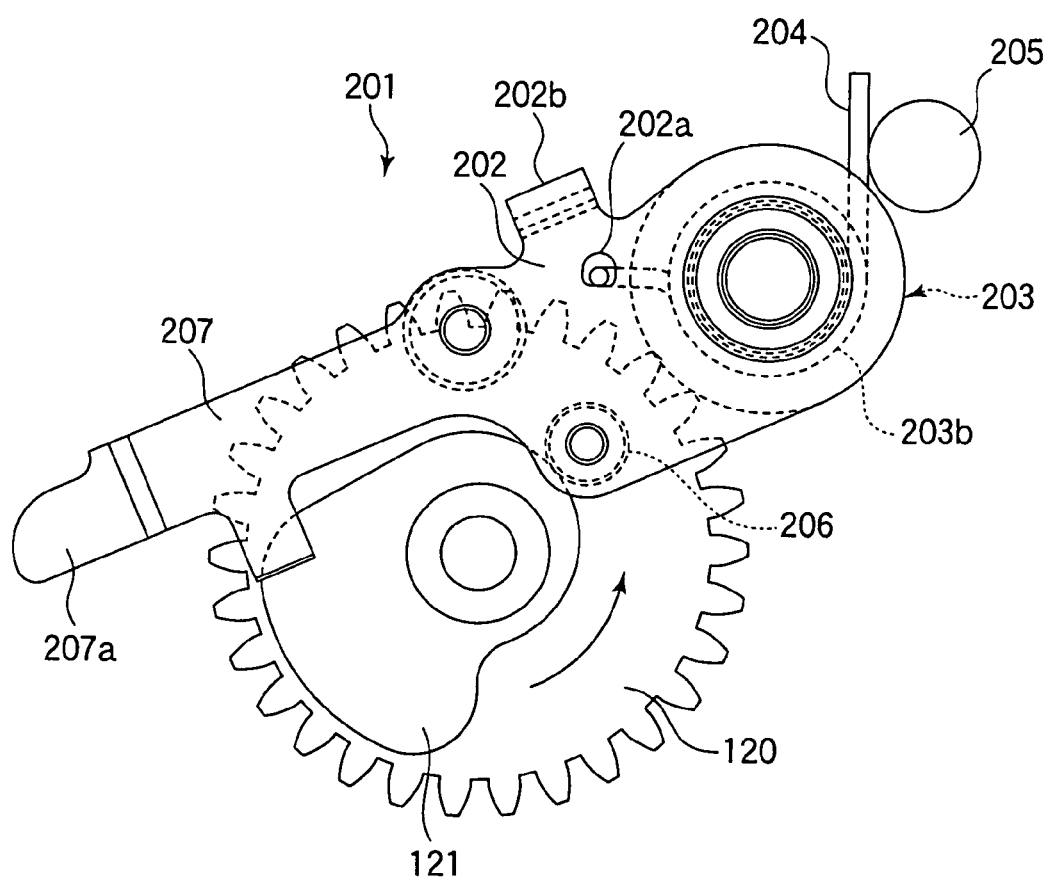
FIG. 14 is a plane view of the cam gear and the rotating lever of the up-down operating mechanism when the flash case is positioned at a middle position between an up position and a down position.
Figure 15:
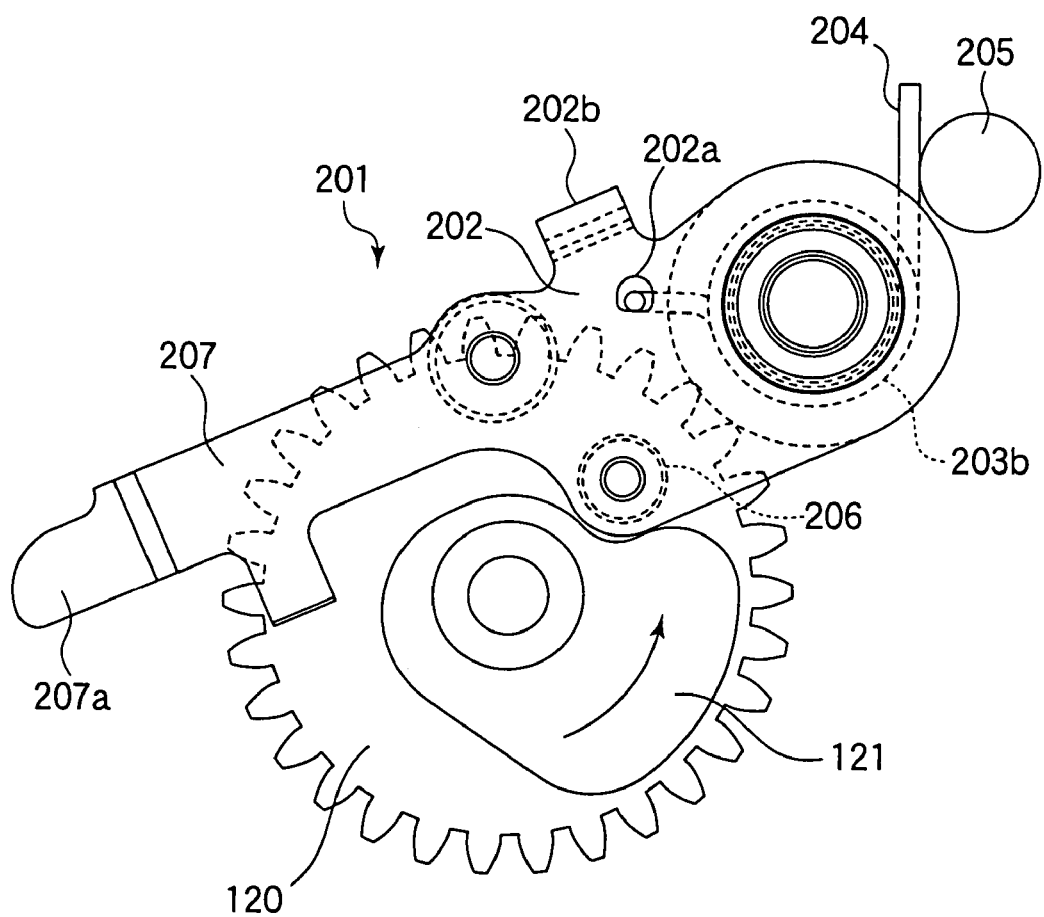
FIG. 15 is a plane view of the cam gear and the rotating lever of the up-down operating mechanism when the flash case is positioned at the up position.

When the first motor 11 keeps rotating in the forward direction, the cam gear 120 in the situation of FIG. 14 is rotated more in the counterclockwise direction. In accordance with the rotation of the cam gear 120, the cam follower 206 is moved along the cam 121 against the urging force of the pop-up spring 204 after being moved to the position of FIG. 15, and then the rotating lever 201 is gradually moved from the front side to the back side of the camera body 1. Accordingly, the flash case 4 is positioned at the down position as shown in FIG. 13. Since the rotating arm 210 is urged by the press spring 220 at all times, the rotating arm 210 is moved to the position at which the arm 210 is mechanically stopped. Therefore, the flash case 4 is prevented from stopping at a position above the outer surface of the camera body 1, and the flash case 4 can be precisely positioned at the down position. Further, when a user tries to rise the flash case 4 to the up position by hand, the rotational force of the rotating lever 210 is absorbed by the elastic deformation of the press spring 220. Accordingly, the rotating lever 201 and the cam gear 120 are prevented from being deformed or damaged.

Figure 16:
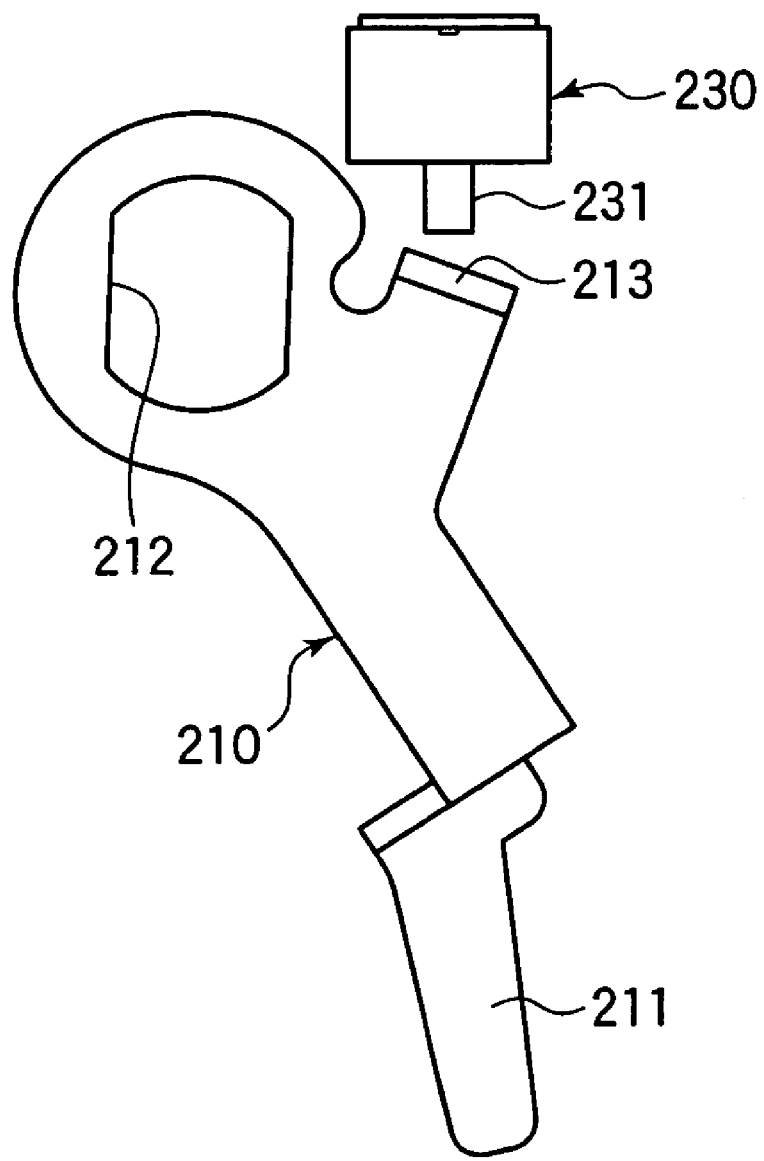
FIG. 16 shows a positional relationship between a rotating arm and a flash-up detecting switch when the flash case is positioned at the down position.
Figure 17:
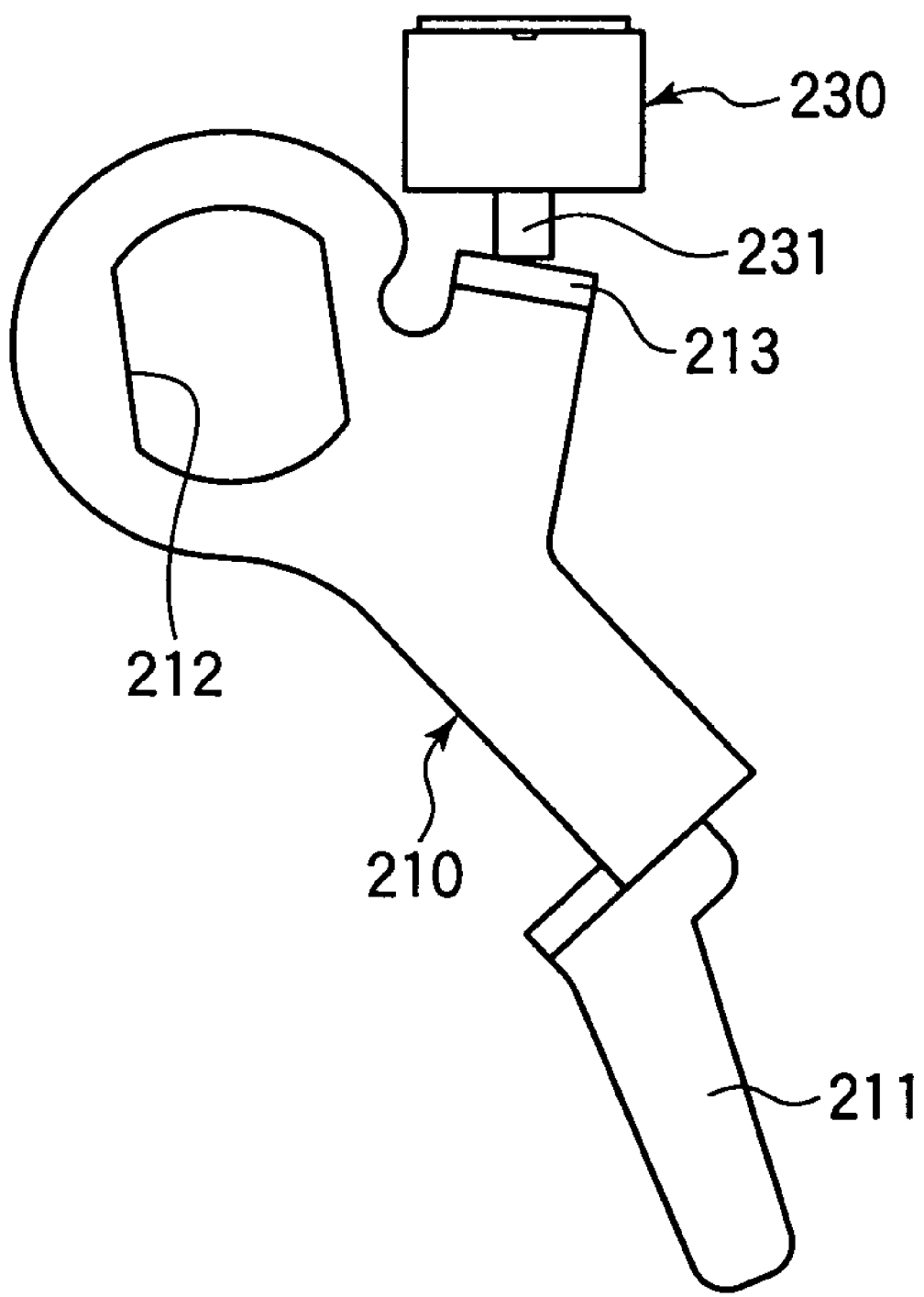
FIG. 17 shows a positional relationship between the rotating arm and the flash-up detecting switch when the flash case is positioned at the middle position.
Figure 18:
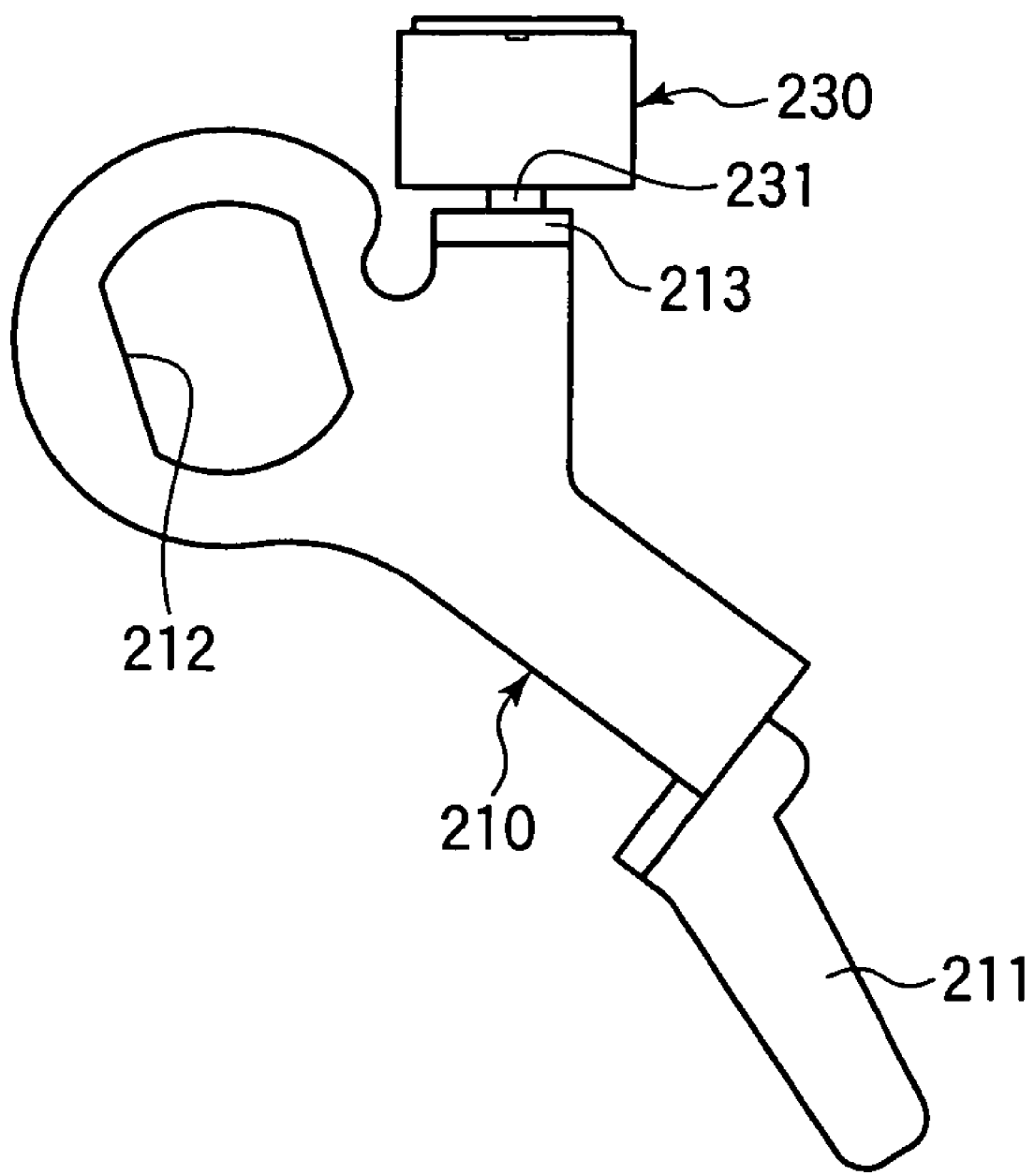
FIG. 18 shows a positional relationship between the rotating arm and the flash-up detecting switch when the flash case is positioned at the up position.

FIGS. 16 through 18 show the rotating arm 210 and a flash-up detecting switch 230. In these Figures, the reverse side of the rotating arm 210 to that depicted in the situations shown in FIGS. 12 and 13, is shown. The detecting switch 230 is provided on an inner wall of the upper side of the camera body 1, being positioned adjacent to a press portion 213 of the rotating arm 210. A push button 231 is provided at the detecting switch 230. When the push button 231 is not pressed by the press portion 213, the detecting switch 230 is off. When the rotating arm 210 is rotated by more than a predetermined angle and the push button 231 is pressed by the press portion 213, the detecting switch 230 is turned on.

When the flash case 4 is at the down position as shown in FIG. 13, the push button 231 is not pressed by the press portion 213 of the rotating arm 210 as shown in FIG. 16, and the detecting switch 230 is off. When the flash case 4 is at the middle position of FIG. 13 between the down position and the up position, the push button 231 is pressed by the press portion 213 as shown in FIG. 17, and the detecting switch 230 is turned on. When the flash case is at the up position of FIG. 13, the push button 231 is completely pressed by the press portion 213, and the detecting switch 230 is on. Namely, when the rotating arm 210 is between the position of FIG. 16 and the position of FIG. 17, the detecting switch 230 is off, and when the rotating arm 210 is between the position of FIG. 17 and the position of FIG. 18, the detecting switch 230 is on.

In other words, when the flash case 4 is completely at the down position, the detecting switch 230 is off, and when the flash case 4 is completely at the up position, the detecting switch 230 is on. And when the flash case 4 starts moving from the down position to the up position, and the rotating arm 210 is rotated by more than a predetermined angle and reaches a predetermined position adjacent to the up position, the detecting switch 230 is turned on. When the flash case 4 starts moving from the up position to the down position, and the rotating arm 210 is rotated by more than a predetermined angle and moves closer to the down position than the above-mentioned position adjacent to the up position, the detecting switch is turned off. Accordingly, the rotational situation of the flash case 4 can be confirmed by monitoring the on-off status of the detecting switch 230.

Figure 19:
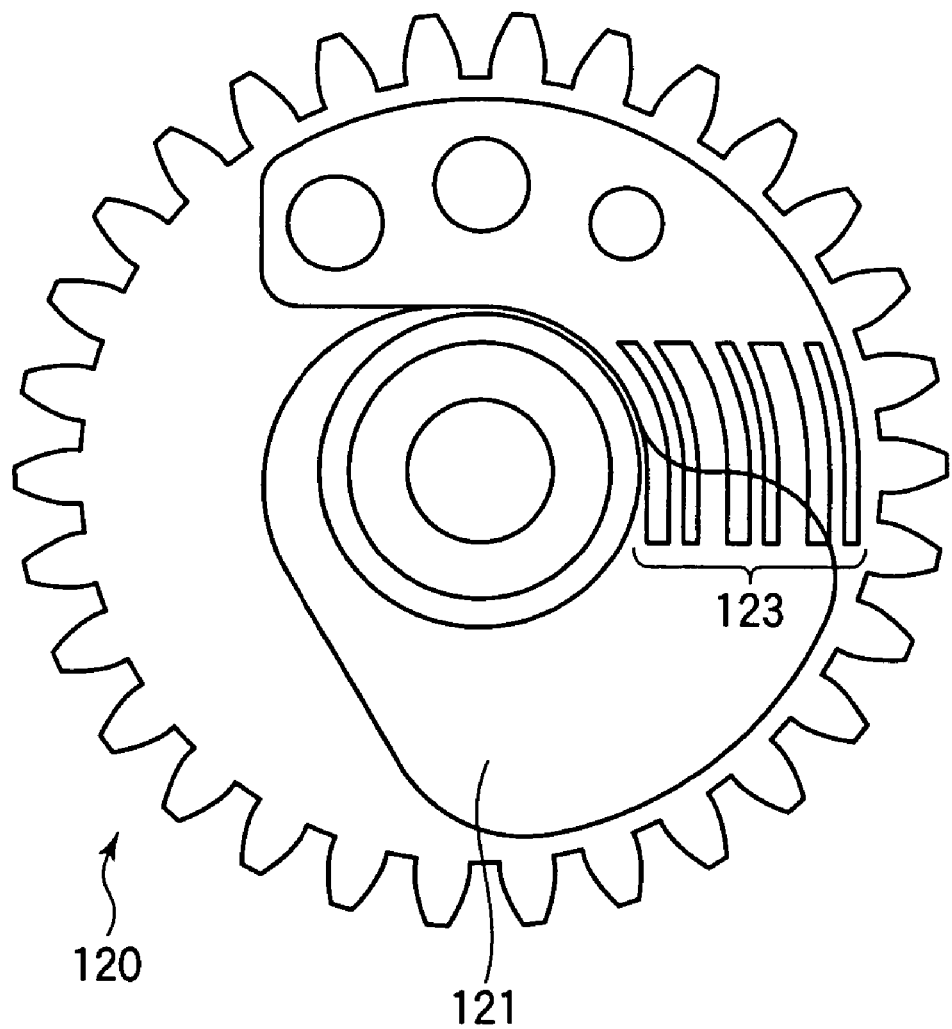
Figure 20:
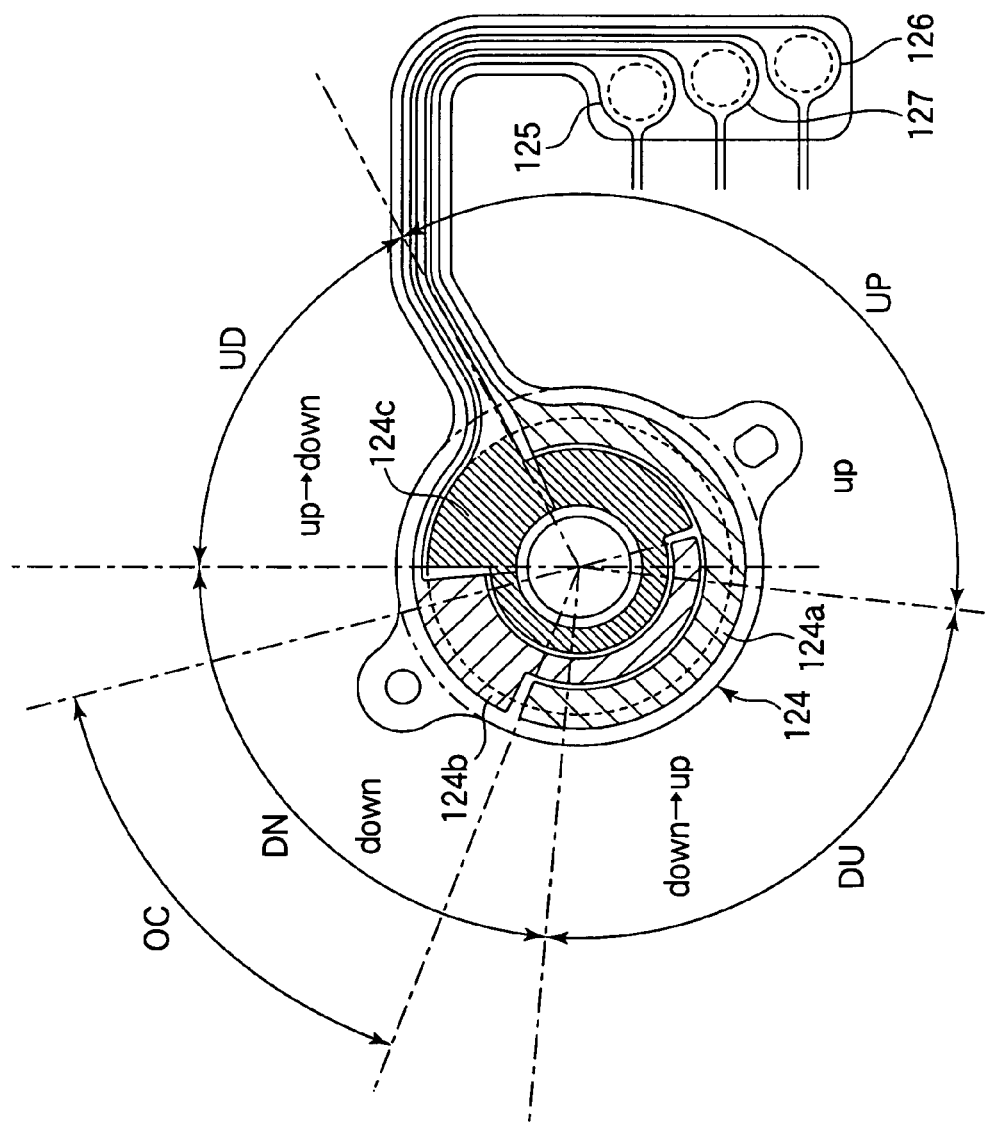
FIG. 20 shows a code plate and switches for detecting the position of the flash case.

As shown FIG. 19, a metal brush 123 is provided on the cam gear 120, being position on a plane opposite to the plane on which the cam 121 is provided. Note that, in FIG. 19, the brush 123 is depicted so as to be seen through, in order to clarify the positional relationship between the brush 123 and the cam 121. Further, a code plate 124 as shown in FIG. 20 is fixedly positioned so as to face the plane on which the metal brush 123 is provided. An up portion 124*a*, a down portion 124*b*, and a ground portion 124*c* are formed on the code plate 124. The up portion 124*a* is connected to a flash-up switch 125, the down portion 124*b* is connected to a flash-down switch 126, and the ground portion 124*c* is connected to a ground 127. In accordance with the rotation of the cam gear 120, the portions 124*a*, 124*b*, and 124*c* respectively contact with and cease contact with the brush 123. When the portions 124*a*, 124*b*, and 124*c* come into contact with the brush 123, the corresponding switches 125, 126, and 127 are turned on, and when the portions 124*a*, 124*b*, and 124*c* are not in contact with the brush 123, the corresponding switches 125, 126, and 127 are turned off.

Namely, when the brush 123 is in an area DN, the flash-up switch 125 is off, and the flash-down switch 126 is on. When the brush 123 is in an area DU, both the flash-up and flash-down switches 125 and 126 are on. When the brush 123 is in an area UP, the flash-up switch 125 is on, and the flash-down switch 126 is off. When the brush 123 is in an area UD, both the flash-up and flash-down switches 125 and 126 are off.

As described above, the up-down operation of the flash case 4 is carried out in accordance with the rotation of the cam gear 120. Accordingly, the up portion 124*a* is formed such that the up portion 124*a* is in contact with the brush 123 when the flash case 4 is moved from the down position to the up position and when the flash case 4 stays at the up position during the rotation of the cam gear 120. Further, the down portion 124*b* is formed such that the down portion 124*b* is in contact with the brush 123 when the flash case 4 is moved from the up position to the down position and the flash case 4 stays at the down position during the rotation of the cam gear 120.

Note that, when the brush 123 is in an area OC of the code plate 124, the rotating arm 210 is overcharged by the press spring 220. Namely, in this situation, the urging force of the press spring 220 is added to the rotating arm 210, and the flash case 4 is precisely positioned at the down position.

Figure 21:
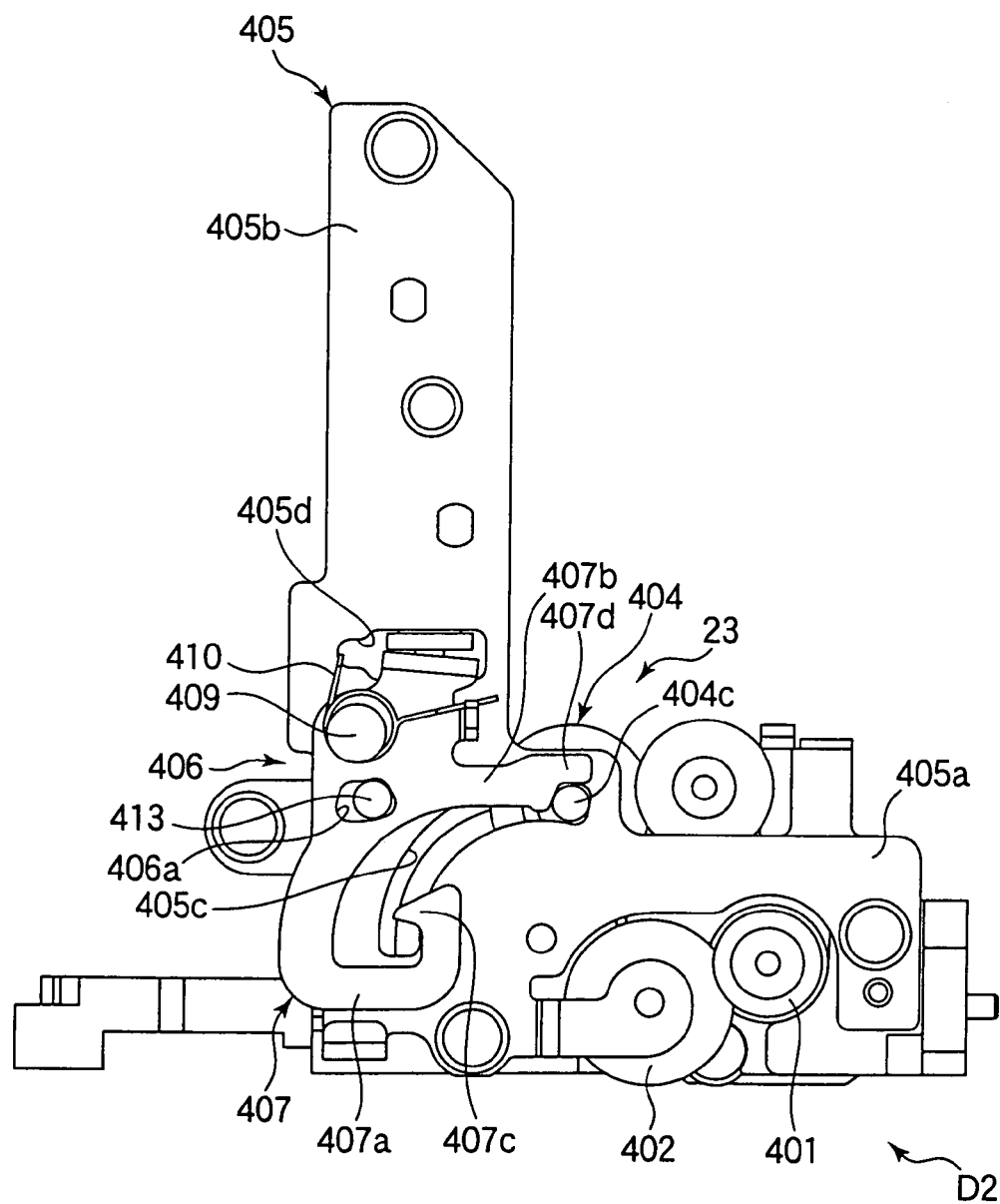
FIG. 21 shows an enlarged front view of a second speed reducing mechanism.
Figure 22:
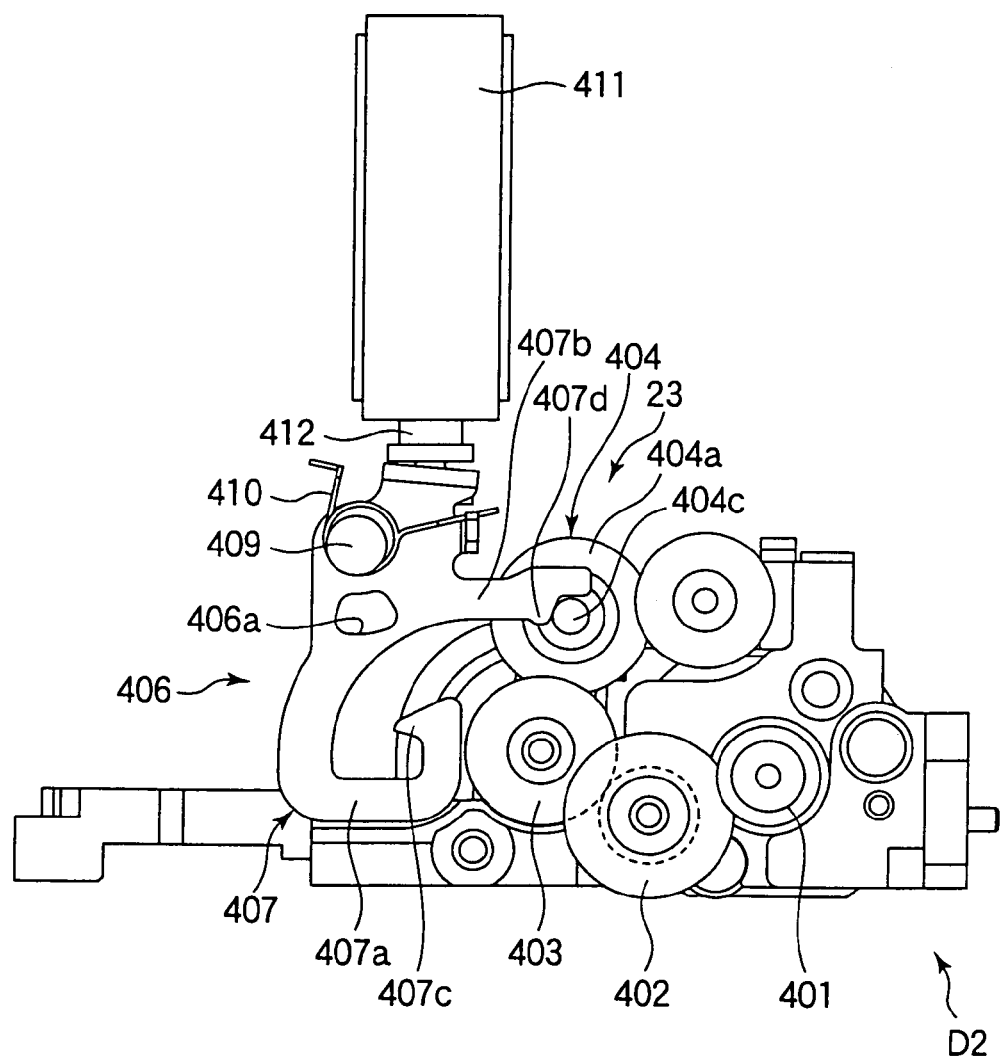
FIG. 22 is an enlarged front view of the second speed reducing mechanism, in which some members are omitted.
Figure 23:
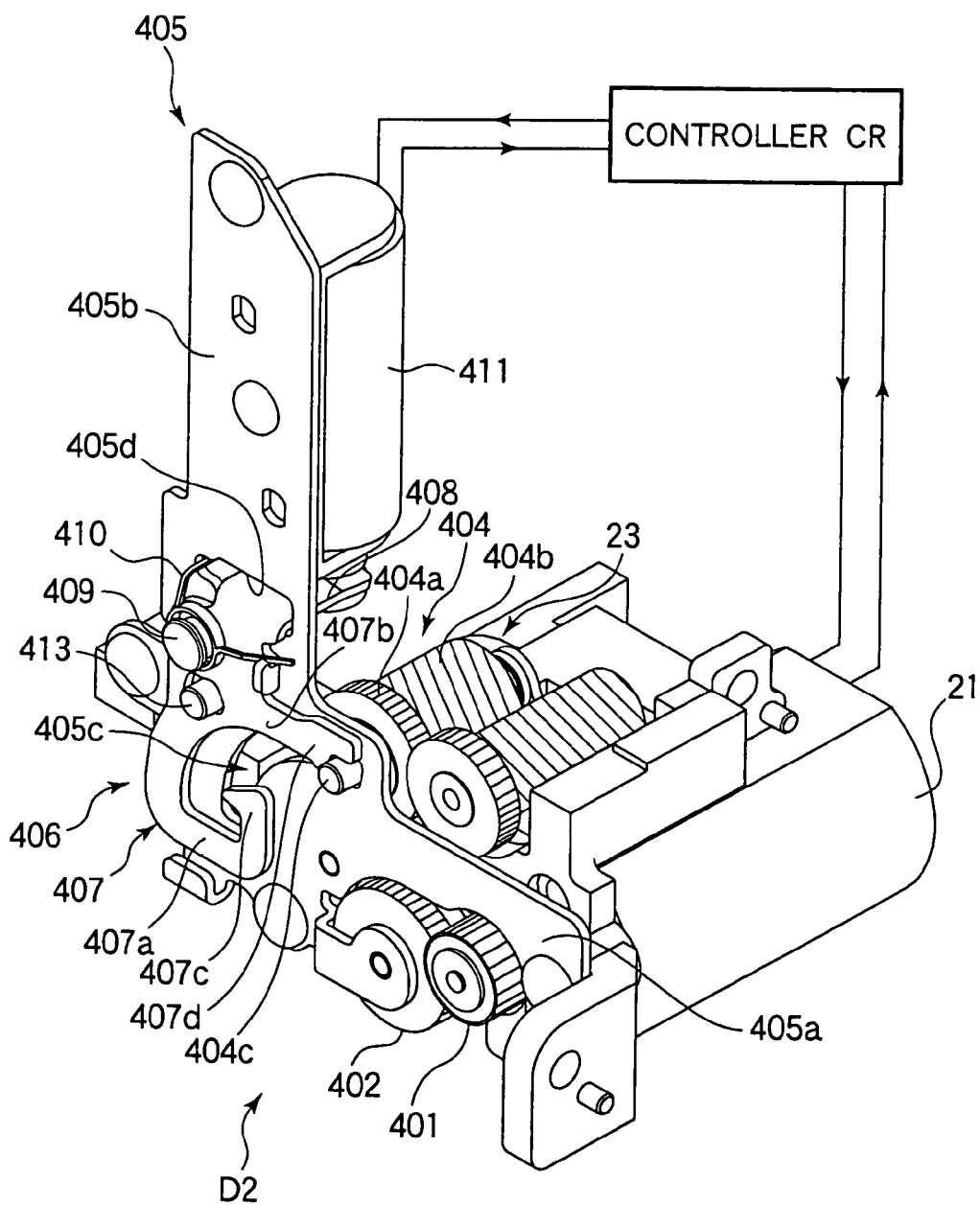
FIG. 23 is a perspective view of the second speed reducing mechanism.
Figure 24:
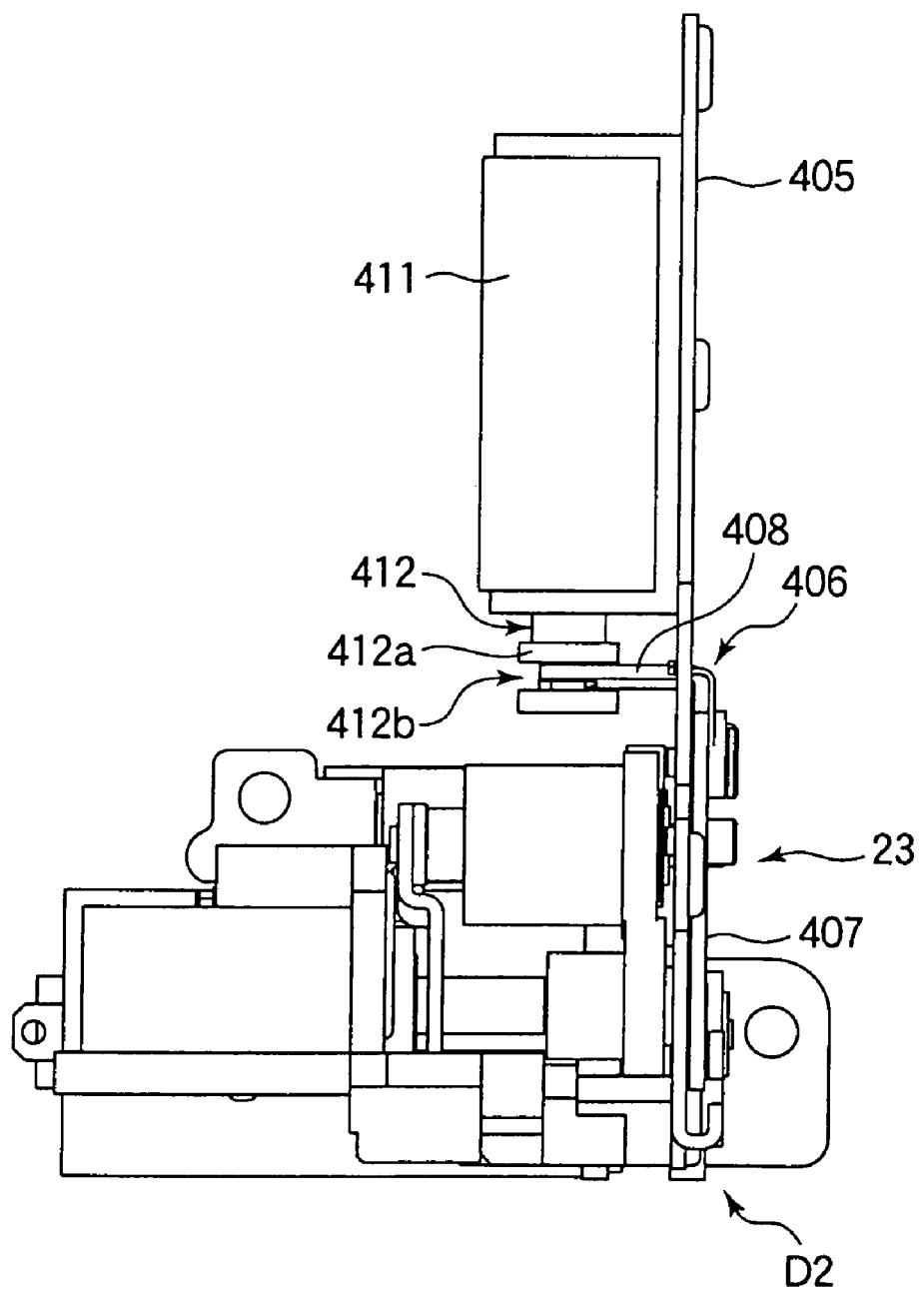
FIG. 24 is a side view of the second speed reducing mechanism, from the left side of FIG. 21.

FIG. 21 is an enlarged front view of a second speed reducing mechanism D2. FIG. 22 is an enlarged front view of the mechanism D2, in which some members are omitted. FIG. 23 is a perspective view of the mechanism D2. FIG. 24 is a side view of the mechanism D2, from the left side of FIG. 21. A pinion gear 401 is fixed at a rotating shaft of a second motor 21 (see FIG. 23). A reduction gear 402 is engaged with the pinion gear 401, and a sun gear 403 (see FIG. 22) is engaged with the reduction gear 402. Namely, the rotation of the second motor 21 is transmitted to the sun gear 403, with its speed being reduced through the pinion gear 401 and the reduction gear 402, at a predetermined speed reduction ratio. Further, the rotation of the sun gear 403 is transmitted to a second change mechanism 23 which includes a planet worm 404.

As shown in FIG. 23, the planet worm 404 includes a spur gear portion 404*a* and a worm portion 404*b*. The spur gear portion 404*a* is engaged with the sun gear 403 (see FIG. 22). The planet worm 404 is supported so as to be rotatable around the central axis of the sun gear 403. Accordingly, in accordance with the rotation of the sun gear 403, the planet worm 404 is moved in the clockwise or counterclockwise directions in FIGS. 21 and 22 around the central axis of the sun gear 403.

A leading board 405 is provided in front of the spur gear portion 404*a*. The shape of the board 405 is an L-figure, including two arm portions 405*a* and 405*b*. At the corner where the arm portions 405*a* and 405*b* cross, a slit 405*c*, which is arc shaped, is formed. When the planet worm 404 is moved, the central shaft 404*c* of the planet worm 404 is led by the slit 405*c*. The planet worm 404 is situated such that the end of the central shaft 404*c* exists in the slit 405*c*. Note that, in FIG. 22, the leading board 405 is omitted in order to clearly show the structure of the above-mentioned gear train.

In the leading board 405, a lever 406 is provided adjacent to the slit 405*c*. The lever 406 includes a stopper portion 407 and a driven portion 408 (see FIGS. 23 and 24). The stopper portion 407 is parallel to the leading board 405, and the driven portion 408 is perpendicular to the leading board 405. The portions 407 and 408 are unitarily formed. The stopper portion 407 is situated so as to face a plane, of the leading board 405, opposite to a plane on which the above-mentioned gear train is situated. The driven portion 408 is penetrated through a hole 405*d* of the leading board 405 and extended to the side at which the above-mentioned gear train is provided. The lever 406 is supported by a supporting shaft 409 provided on the board 405 so as to be rotatable around the shaft 409.

A coil spring 410 is wound around the outer surface of the supporting shaft 409. One end of the coil spring 410 is engaged with the hole 405*d* of the leading board 405, and another end of the coil spring 410 is engaged with a projecting piece formed on the stopper portion 407 of the lever 406. Accordingly, the coil spring 410 urges the lever 406 in the clockwise direction in FIG. 21, at all times.

A solenoid 411 is provided at the arm portion 405*b* of the leading board 405, being positioned on the plane of the side at which the above-mentioned gear train is provided. A plunger 412 is provided in the solenoid 411. An end 412*a* of the plunger 412 is formed such that its diameter is larger than that of the other portions of the plunger 412. The end 412*a* has a groove 412*b* formed in the circumference direction. As shown in FIG. 24, an end of the driven portion 408 of the lever 406 is positioned in the groove 412b.

The controller CR controls the starting and stopping of the electric supply to the solenoid 411, the starting and stopping of the rotation of the second motor 21, and further it controls the rotational direction of the motor 21.

When the solenoid 411 is electrically energized by the control of the controller CR, the plunger 412 is upwardly moved in FIG. 24. In accordance with this movement of the plunger 412, the driven portion 408, of the lever 406, which is in the groove 412b of the plunger 412, is upwardly driven. Accordingly, the lever 406 is rotated around the supporting shaft 409 in the counterclockwise direction in FIG. 22 against the urging force of the coil spring 410. Then, the engagement between the central shaft 404c of the planet worm 404 and the stopper piece 407d is released, as shown in FIG. 22, so that the planet worm 404 becomes movable along the slit 405c of the leading board 405.

When the second motor 21 is rotated in the reverse direction based on the control of the controller CR in this situation, the pinion gear 401 is rotated in the counterclockwise direction in FIG. 22. The rotation of the pinion gear 401 is transmitted to the sun gear 403 through the speed reduction gear, so that the sun gear 403 is rotated in the counterclockwise direction. Accordingly, the planet worm 404 is moved to a position adjacent to the cartridge room 20 through the spur gear portion 404a which is engaged with the sun gear 403.

When the solenoid 411 is electrically deenergized based on the control of the controller CR in the situation of FIG. 21, the plunger 412 returns to the original position. In accordance with the movement of the plunger 412, the lever 406 is rotated in the clockwise direction around the supporting shaft 409, and then the stopper piece 407c of the lever 406 and the central shaft 404c of the planet worm 404 are engaged. Accordingly, the planet worm 404 is fixed.

When the solenoid 411 is electrically energized based on the control of the controller CR, the lever 406 is rotated in the counterclockwise direction around the supporting shaft 409 in accordance with the movement of the plunger 412, and the engagement between the stopper piece 407c and the central shaft 404c is released. When the second motor 21 is rotated in the forward direction based on the control of the controller CR, and the pinion gear 401 is rotated in the clockwise direction, in this situation, the rotation of the second motor 21 is transmitted to the sun gear 403 through the speed reduction gear 402, and the sun gear 403 is rotated in the clockwise direction. Accordingly, the planet worm 404 is moved to the position adjacent to the lens mount 5 through the spur gear 404a which is engaged with the sun gear 403, so that the planet worm 404 is moved to the position adjacent to the lens mount 5.

When the solenoid 411 is electrically deenergized based on the control of the controller CR in this situation, the plunger 412 returns to the original position. In accordance with the movement of the plunger 412, the lever 406 is rotated in the clockwise direction around the supporting shaft 409, and then the stopper piece 407d and the central shaft 404c engage. Accordingly, the planet worm 404 is fixed at the position as shown in FIG. 22.

An engaging hole 406a is formed in the lever 406, being adjacent to the central shaft 409. A projecting stopper 413 which is unitarily formed with the leading board 405 is penetrated through the hole 406a. Due to the engagement between the stopper 413 and the hole 406a, the lever 406 is prevented from being excessively rotated and moved while the solenoid 411 is electrically energized.

When the planet worm 404 is fixed at the position adjacent to the cartridge room 20, the worm portion 404b of the planet worm 404 is engaged with a gear train (not shown) which transmits the rotation to a rewind fork gear (not shown). When the planet worm 404 is fixed at the position adjacent to the lens mount 5, the spur gear portion 404a is engaged with a gear train (not shown) which transmits the rotation to a shutter driving mechanism, a quick return mirror driving mechanism, and a diaphragm driving mechanism.

An AF driving mechanism 30 is provided at the bottom of the camera body 1, being situated adjacent to the lens mount 5. In other words, as shown in FIG. 3, the AF driving mechanism 30 is provided in a space which is defined by one portion of the arc periphery of the lens mount 5 and a tangent L of the point which is on the periphery of the lens mount 5 and closest to the bottom of the camera body 1.

Figure 25:
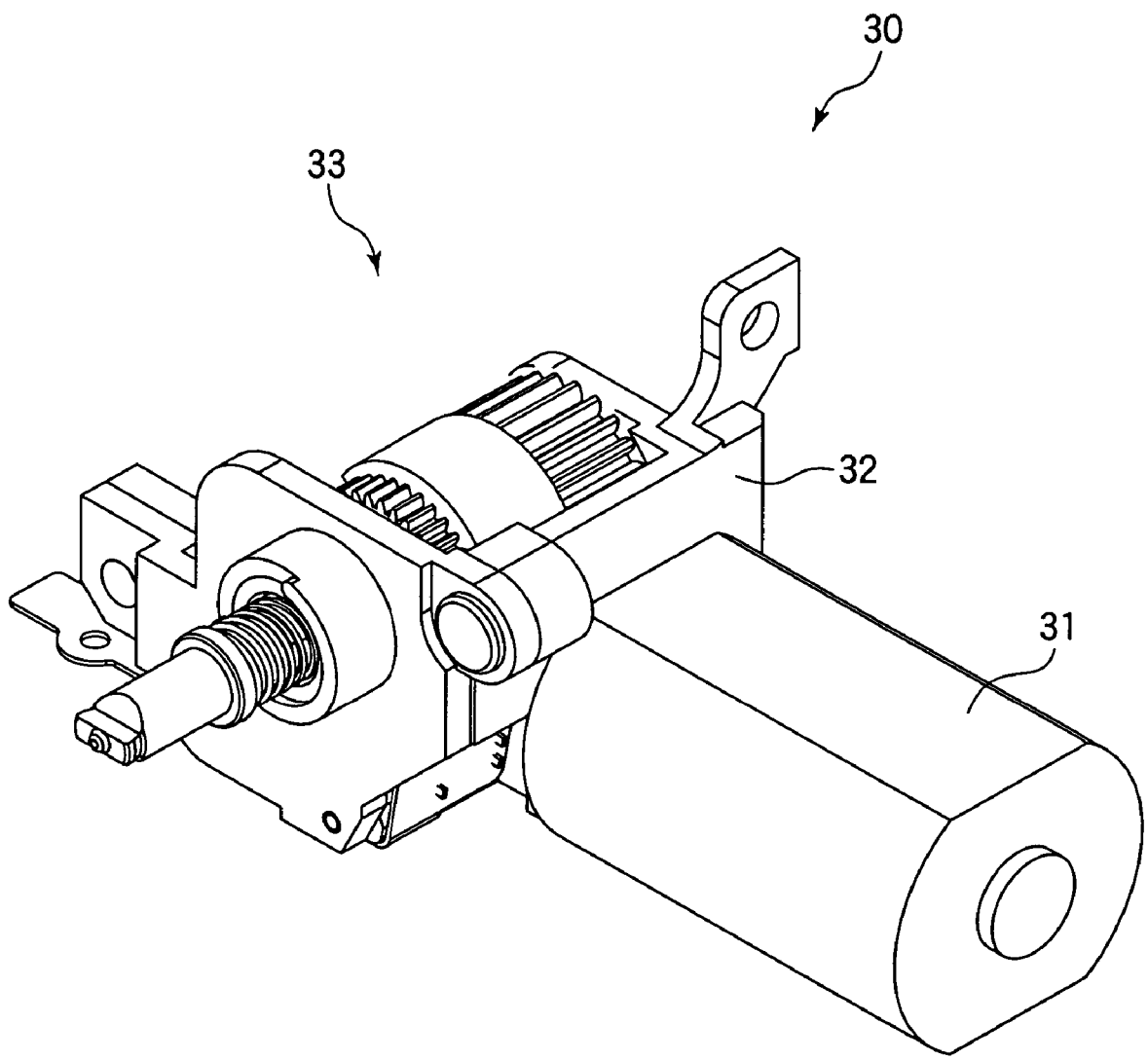
FIG. 25 is a perspective view of an AF driving mechanism.
Figure 26:
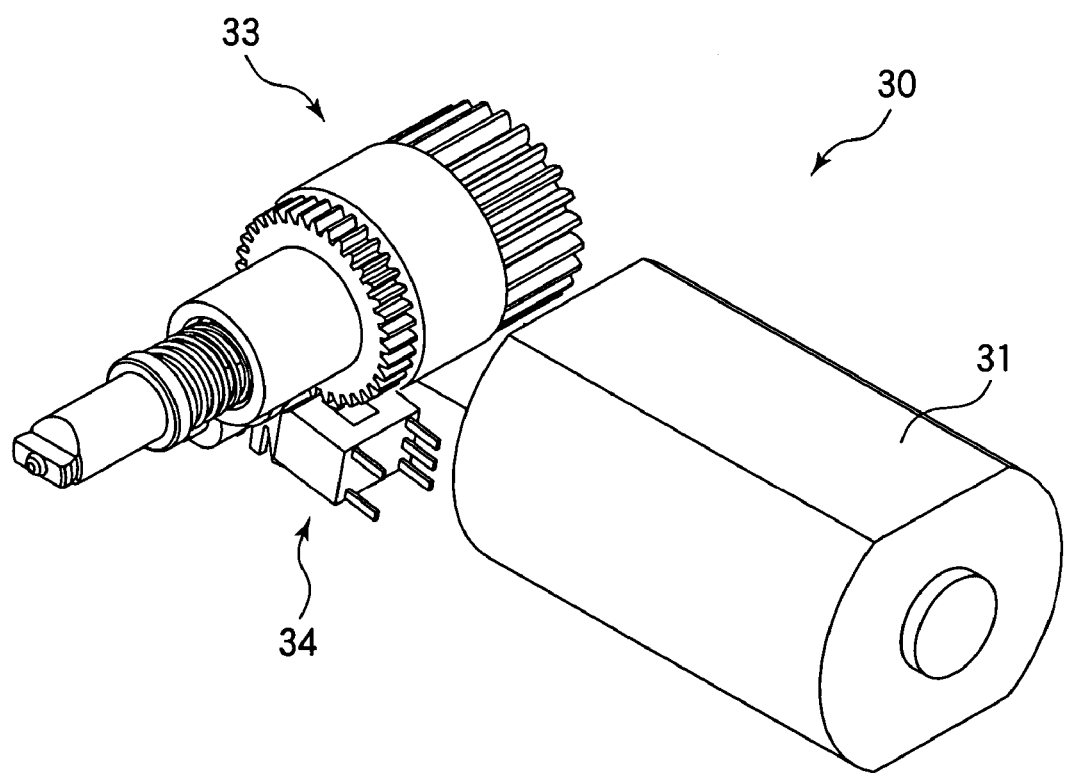
FIG. 26 is a perspective view of the AF driving mechanism, in which a holding case is omitted.

FIGS. 25 and 26 are perspective views of the AF driving mechanism 30. A holding case 32 holds an AF motor 31, a transmitting unit 33, and an AF sensor 34. The rotation of the AF motor 31 is transmitted to a lens barrel which is mounted on the lens mount 5, by the transmitting unit 33.

Figure 27:
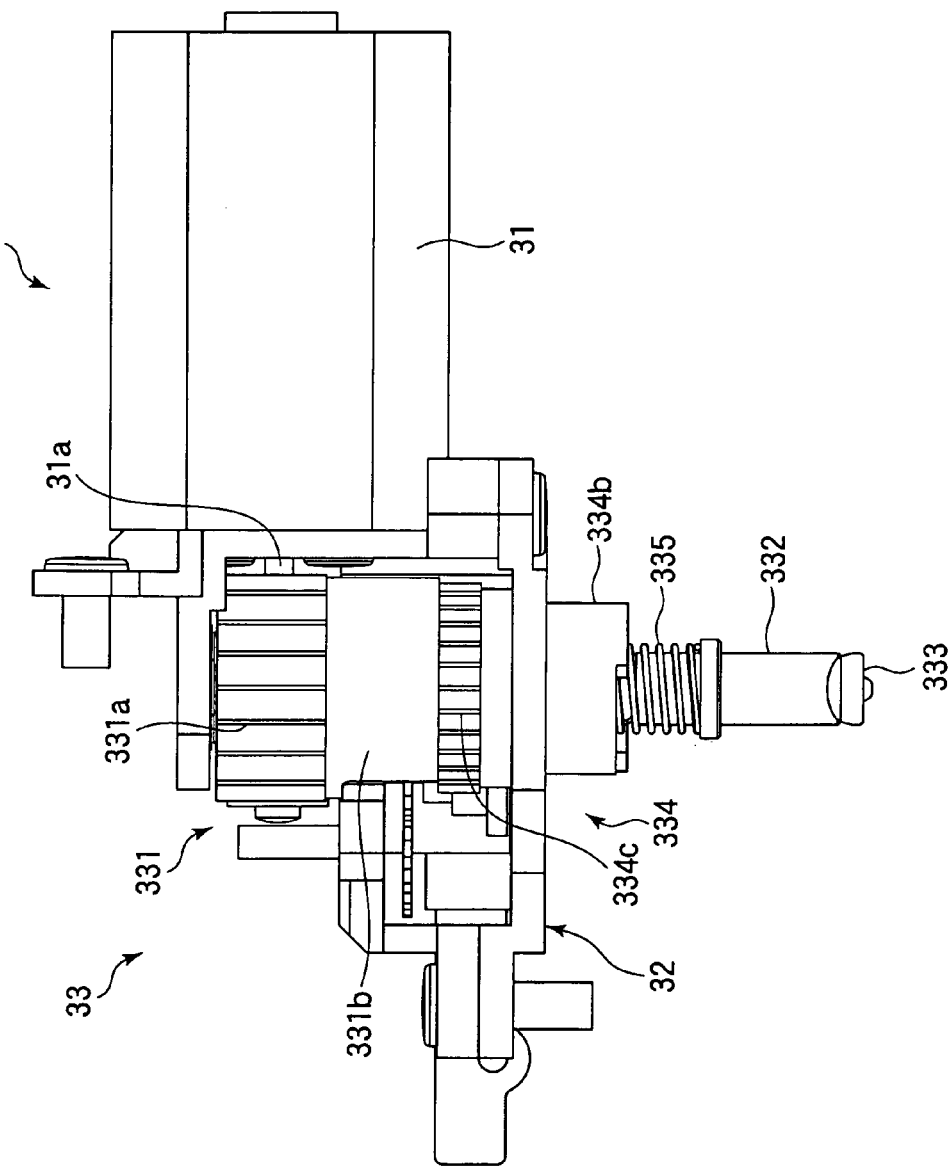
FIG. 27 is a plane view of the AF driving mechanism.

FIG. 27 is a plane view of the AF driving mechanism 30. A worm gear (not shown) is fixed at a rotating shaft 31a of the AF motor 31. The transmitting unit 33 includes a first supporting cylinder 331 and a second supporting cylinder 334. The first cylinder 331 is column shaped, and includes a gear portion 331a and a receiving portion 331b. A wheel gear, which is engaged with the worm gear, is formed on the outer surface of the first cylinder 331. The receiving portion 331b is approximately column shaped. The receiving portion 331b is a hollow cylinder with a base at one end.

An AF coupler 332 includes a joint portion 333 which is provided at the tip thereof. The AF coupler 332 is situated such that the AF coupler 332 is penetrated through the lens mount 5 and the joint portion 333 is positioned outside. A second supporting cylinder 334 includes a supported portion (not shown) and a receiving portion 334b. The supported portion is provided in the receiving portion 331b of the first cylinder 331. The receiving portion 334b supports the AF coupler 332. A gear 334c is engaged with a connecting portion between the supported portion and the receiving portion 334b.

A coil spring 335 is wound around an outside surface of a portion, of the AF coupler 332, which is supported by the receiving portion 334b. Accordingly, the AF coupler 332 is urged by the coil spring 335, at all times, such that the joint portion 333 moves away from the second supporting cylinder 334.

The rotational force of the AF motor 31 is transmitted to the AF coupler 332 through the worm gear 331a, the wheel gear, the first supporting cylinder 331, and the second supporting cylinder 332. Accordingly, the joint portion 333 is rotated in accordance with the rotation of the AF motor 31. Further, the amount of the rotation of the AF motor 31 is detected by a photo interrupter of an AF sensor unit 34.

Figure 28:
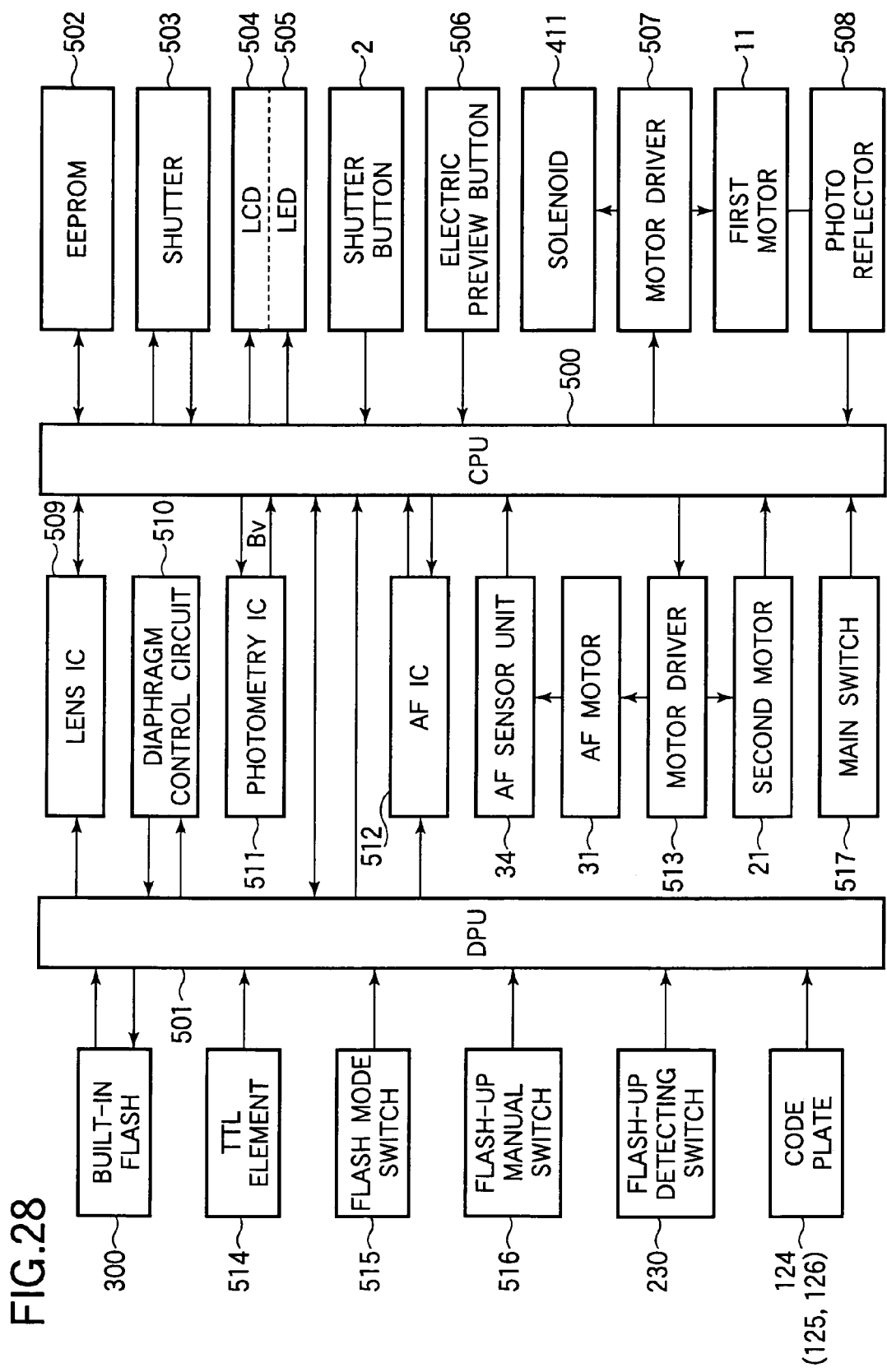
FIG. 28 is a block diagram of the singe-lens reflex camera.

FIG. 28 is a block diaphragm of the single-lens reflex camera. A CPU 500 is an IC which wholly controls the single-lens reflex camera. The CPU 500 carries out the control of peripheral circuits, switching operations in which interruption is needed, and so on. A DPU 501 has generally the same structure as the CPU 500. The DPU 501 carries out the control of peripheral circuits, the control of power source, and switching operations in which interruption is not needed, and so on. The CPU 500 and the DPU 501 are provided in the camera body 1. The CPU 500 communicates various data with the DPU 501 and an IC of an interchangeable lens.

In an EEPROM 502, various data such as adjusting data for auto exposure and auto focus are stored. The CPU 500 reads and writes data, from and into the EEPROM 502, in the various controls and operations described later.

A shutter 503 is connected with the CPU 500. A signal, which represents the on/off status of a timing switch, is output from the shutter 503 to the CPU 500. When the shutter 503 stops running, the timing switch is turned on. Based on the on/off status of the timing switch, the CPU 500 outputs signals which control the operation of first and second blinds.

LCDs 504 and LEDs 505 are connected to the CPU 500. The LCDs 504 are provided in the view finder and on the back of the camera body 1. The LEDs 505 supply emitting light to the LCDs. Based on the control signals output from the CPU 500, the driving of the LEDs 505 and the display of characters on the LCDs 504 are controlled.

When the shutter button 2 (see FIG. 1) is pressed by one step, a signal which represents the start of a photometric operation is input to the CPU 500. When the shutter button 2 is pressed by two steps, a signal which represents the start of release operation is input to the CPU 500. When an electric preview button 506, which is provided on the outer surface of the camera body 1, is manipulated, a signal which represents the start of an electric preview is input to the CPU 500. The electric preview is an operation which drives the diaphragm based on an aperture value set by the camera body 1 without the release operation. If the electric preview is performed, a user is able to confirm a real depth of field, which is set based on the aperture value, through the view finder.

A motor driver 507 is an IC which controls the first motor 11 of the first change mechanism 14 and the solenoid 411 of the second change mechanism 23. When the film is wound, the motor driver 507 outputs a control signal for rotating the first motor 11 in the reverse direction. When the up-down operation of the flash case 4 is carried out, the motor driver 507 outputs a control signal for rotating the first motor 11 in the forward direction. Further, the motor driver 507 controls the electrical energizing and deenergizing of the solenoid 411 in accordance with the changing operation of the second change mechanism 23.

A photoreflecter 508 is positioned at a position where perforations of the film pass through. The photoreflecter 508 confirms the status of the feeding of the film, by monitoring the number of perforations which pass through. The monitored result is output to the CPU 500, so that the control of winding of the film by one frame is carried out in the film winding operation.

A lens IC 509 is provided in the lens barrel which is mounted on the lens mount 5. The DPU 501 supplies electric power to the lens IC 509. Various information is communicated between the CPU 500 and the lens IC 509.

A diaphragm control circuit 510 is connected to the DPU 501. An encoder outputs a pulse signal in accordance with the rotation of the lever which drives the diaphragm. The pulse signal of the encoder is input to the DPU 501 through the diaphragm control circuit 510. The DPU 501 calculates the amount the diaphragm has been driven, and outputs a diaphragm control signal to the diaphragm control circuit 510 in accordance with the calculation.

A photometry IC 511 is connected to the CPU 500. The photometry calculations are performed based on a 16-segment multi-pattern metering system. A sensor is provided for each of the 16 segments. The CPU 500 outputs to the photometry IC 511, a signal which represents which sensor is selected for photometry. A voltage value output from the selected sensor is input to the CPU 500 through the photometry IC 511. The CPU 500 carries out a photometry calculation, based on the input voltage value.

An AF IC 512 is an IC which controls a CCD line-sensor which is provided in the AF unit 30. The power for the AF IC 512 is supplied from the DPU 501. The CPU 500 detects the focusing status of the photographing lens, based on a video signal output from the CCD line-sensor.

A motor driver 513 is an IC for controlling the drive of the second motor 21 and the AF motor 31. The control signals of the second motor 21 and the AF motor 31 are output from the CPU 500 to the motor driver 513. When the control signal for the AF motor 31 is input to the motor driver 513, the motor driver 513 outputs the control signal to the AF motor 31. Accordingly, the AF motor 31 is driven, and a focusing lens in the lens barrel mounted on the lens mount 5 of the camera body 1 is driven. The amount of movement of the focusing lens is detected by the photo interrupter of the AF sensor unit 34. A pulse signal, which is generated based on the result of the detection, is output to the CPU 500. The CPU 500 calculates the amount of movement of the focusing lens, based on the pulse signal which is output from the photo interrupter. The amount of the movement is reflected in the AF motor control signal.

When the control signal for the second motor 21 is input to the motor driver 513, the motor driver 513 outputs control signals to the second motor 21. When the photographing operation (the raising of the quick-return mirror, the drive of the diaphragm, and the drive of the shutter) is performed, a control signal for rotating the second motor 21 in the forward direction is output from the motor driver 513 to the second motor 21. When the film is rewound, a control signal for rotating the second motor in the reverse direction is output from the motor driver 513 to the second motor 21.

A built-in flash 300 is connected to the DPU 501. A control signal for charging is output from the CPU 500 to the built-in flash 300 through the DPU 501. The voltage value of the built-in flash 300 is output from the DPU 501 to the CPU 500, after being input to the DPU 501. The CPU 500 judges, based on the input voltage value, whether the charging of the built-in flash 300 is completed or not. The operation of the built-in flash 300 is carried out based on a flash control signal which is output from the DPU 501.

The amount of luminance of the built-in flash 300 is controlled based on the output from a TTL photoreceptor element 514. Electric current output from the TTL photoreceptor element 514 is charged in a predetermined capacitor in the DPU 501. When the amount of charging of the capacitor reaches to a predetermined level, a control signal to stop the emission of light by the built-in flash 300 is output from the DPU 501 to the flash 300.

A flash mode switch 515, a flash-up manual switch 516, and the above-mentioned flash-up detecting switch 230 (see FIGS. 16 through 18) are connected to the DPU 501. The status of each of these switches is input to the DPU 501. The status of the flash mode switch 515 represents a flash mode which is selected by the user. Note that there are a red-eye preventing mode, a non flash mode, an auto-flash mode, and so on. The flash-up manual switch 516 is turned on/off in accordance with manipulation of a button for raising the flash case 4 and driving the built-in flash 300. The button is provided on the camera body 1. The flash-up detecting switch 230 is turned on/off in accordance with the up-down operation of the flash case 4, as described above.

A main switch 517 is connected to the CPU 500. The main switch 517 is turned on/off in accordance with a power source button of the camera body 1.

The flash-up switch 125 and the flash-down switch 126 (see FIG. 20), which are connected to the code plate 124, are connected to the DPU 501. The DPU 501 detects the position of the flash case 4 based on the combinations of the statuses of these switches.

Figure 29:
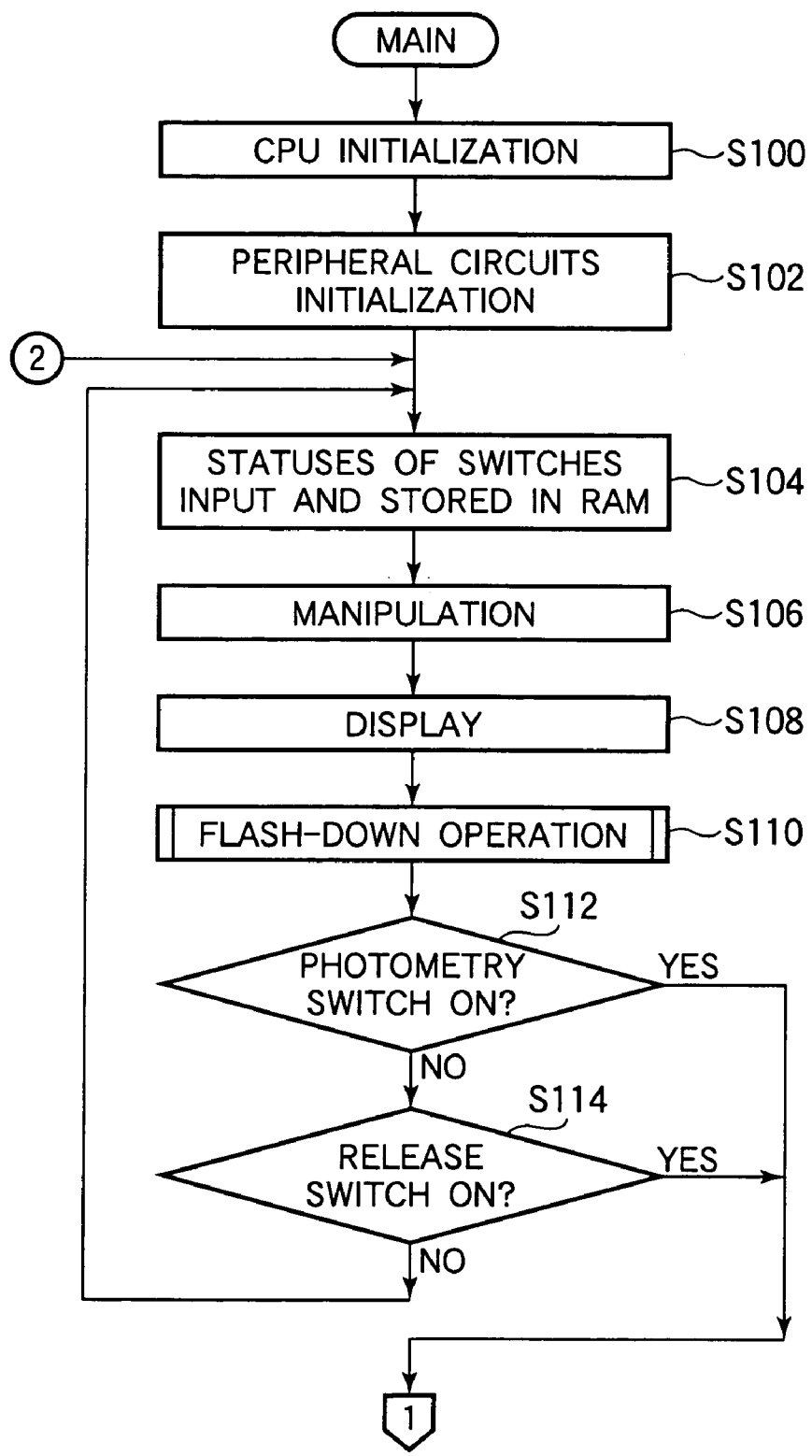
FIG. 29 is a flow-chart which shows an initial part of the procedures of a main routine of photographing.
Figure 30:
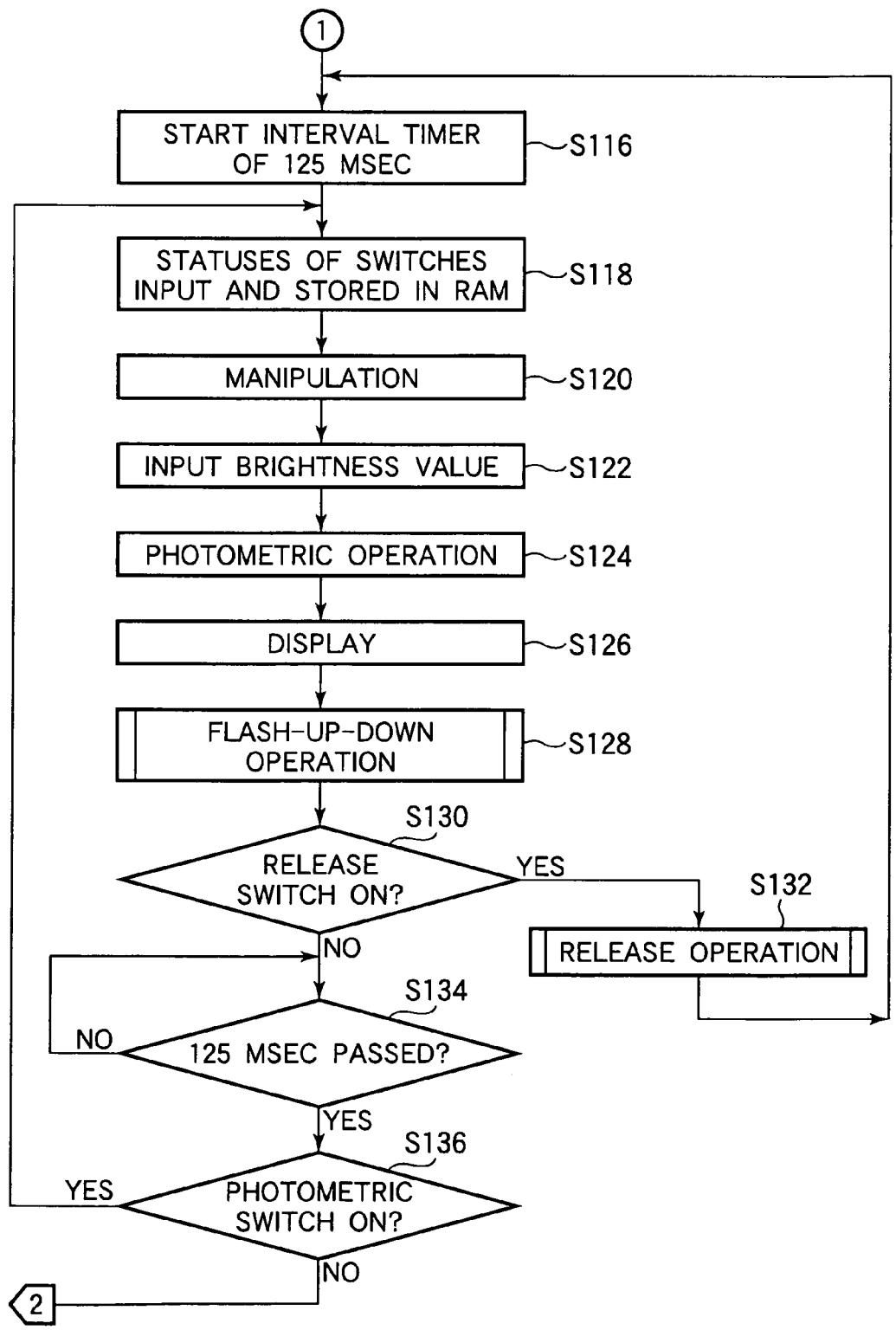
FIG. 30 is a flow-chart which shows a latter part of the procedures of the main routine.

FIG. 29 is a flow-chart which shows the initial part of the procedures of the main photographing routine, and FIG. 30 is a flow-chart which shows the latter part of the procedures of the main photographing routine. After the power source button of the camera body 1 is pressed and the main switch 517 is turned on, the CPU 500 is initialized in step S100. For example, the RAM which is connected to the CPU 100 is cleared by the initialization in step S100. In step S102, the peripheral circuits which are connected to the CPU 500, such as the motor drivers 507, 513, and the AF IC 512 and so on, are initialized.

In step S104, the on/off statuses of the above-mentioned switches shown in FIG. 28 are input and stored in the RAM. Next, in step S106, the above-mentioned modes are changed by the user's manipulation of the switches, based on the input on/off statuses of the switches. In step S108, the result of the user's manipulation of the buttons and the switches is displayed on the LCD 504 on the back side of the camera body 1.

Next, the control goes to step S110. In step S110, a flash-down operation is performed. The flash-down operation is the operation where the flash case 4 is returned to the down position when the power source button of the camera body 1 is pressed and the main switch 517 is turned off.

In step S112, it is confirmed if the shutter button 2 of the camera body 1 is pressed by one step and the photometry switch is turned on. In step S114, it is confirmed if the shutter button 2 is pressed by two steps and the release switch is turned on. While the shutter button is not being pressed, the procedures from step S104 through step S114 are repeated.

When it is judged that the photometry switch or the release switch are turned on, the control goes to step S116 of FIG. 30. In step S116, an interval timer of 125 msec (milli-seconds) is started so that the procedures after step S116 are carried out once per 125 msec. Next, in step S118, similarly to step S104, the on/off statuses of the switches are input and stored in the RAM. In step S120, similarly to step S106, the above-mentioned modes are changed by the user's manipulation of the switches, based on the input on/off statuses of the switches.

In step S122, the photometry IC 511 is powered on, and the brightness value of the above-mentioned selected sensor is input to the CPU 500. In step S124, the photometric operation is carried out based on the input brightness value, and a shutter speed and an aperture value are calculated. Next, in step S126, each mode, the shutter speed, and the aperture value are displayed on the LCD 504.

Next, the control goes to step S128, a flash-up-down operation is performed. The flash-up-down operation is the operation which controls the driving of the flash case 4 except for the flash-down operation when the power source is turned off.

In step S130, the status of the release switch is checked. If it is confirmed that the release switch is on, the control goes to step S132. In step S132, a release operating routine is carried out. In the release operating routine, the driving the shutter and the controlling the diaphragm are carried out. Then, the control returns to step S116, the interval timer is reset, and the procedures after step S116 are repeated.

If it is confirmed that the release switch is off, the control goes to step S134. In step S134, it is checked if the 125 msec have passed. If it is confirmed that the 125 msec have passed, the control goes to step S136. In step S136, the status of the photometric switch is checked. If it is confirmed that the photometric switch is on, the control returns to step S118, and the procedures after that are repeated. If it is confirmed that the photometric switch is off, the control returns to step S104 of FIG. 29, and the procedures after that are repeated.

Figure 31:
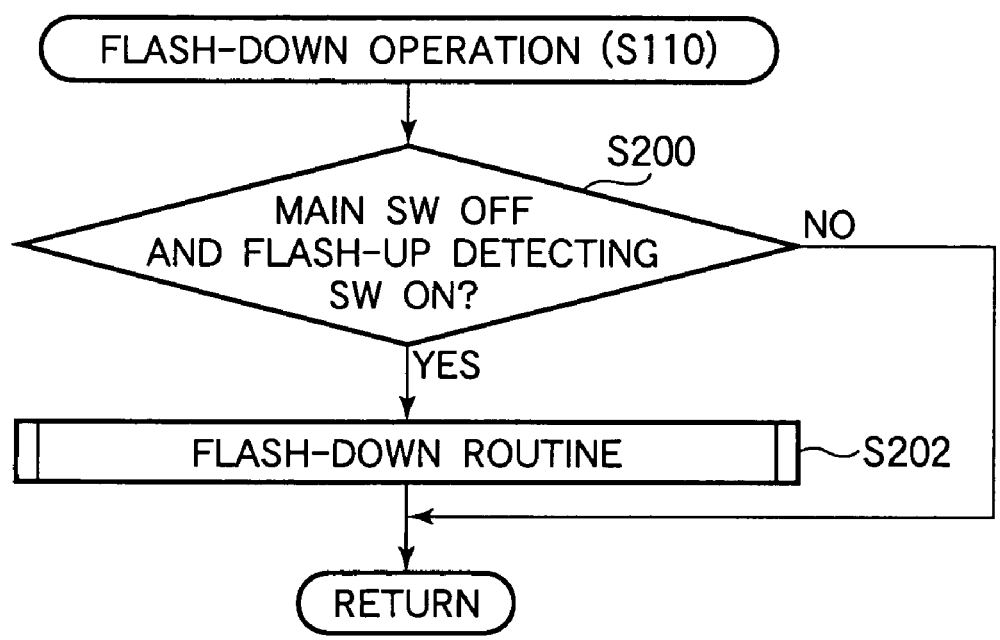
FIG. 31 is a flow-chart which shows procedures of a flash-down operation.

FIG. 31 is a flow-chart which shows procedures of the flash-down operation of step S110. Namely, these procedures are carried out when the power source switch is turned off. In step S200, the statuses of the main switch 517 and the flash-up detecting switch 230 are checked. If the main switch 517 is off and the detecting switch 230 is on, the control goes to step S202. In step S202, the flash-down routine for taking down the flash case 4 is performed. Namely, when the power source is turned off in a state where the flash case 4 is positioned at the up position, the operation by which the flash case 4 is taken down is carried out.

Figure 32:
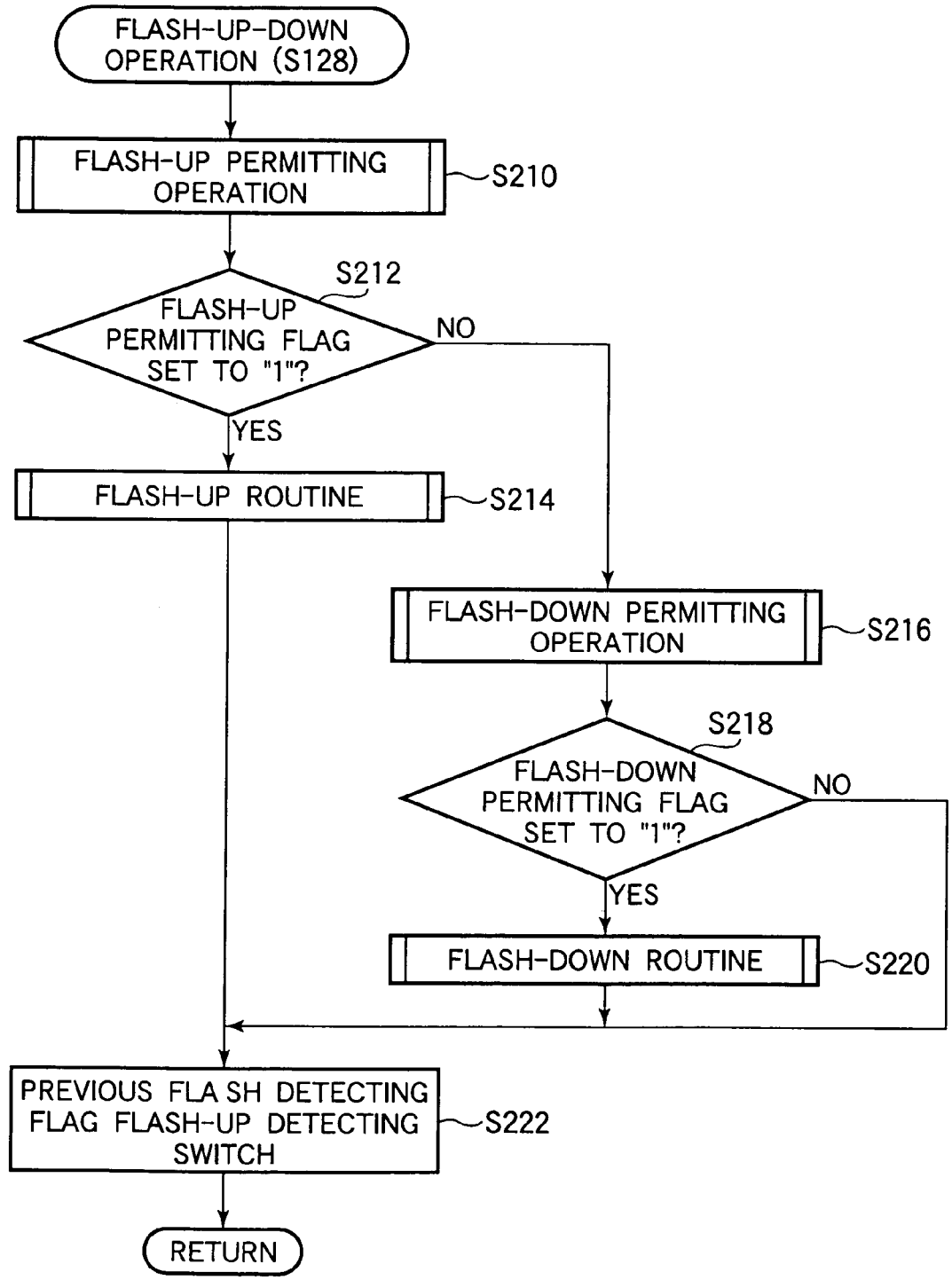
FIG. 32 is a flow-chart which shows procedures of a flash-up-down operation.

FIG. 32 is a flow-chart which shows the procedures of the flash-up-down operation of step S128. In step S210, a flash-up permitting operation is carried out. In the flash-up permitting operation, it is judged whether the raising of the flash case 4 can be done or not. If it is judged that the raising can be done, a flash-up permitting flag is set to "1".

In step S212, it is checked if the flash-up permitting flag is set to "1". If it is confirmed this flag is set to "1", the control goes to step S214. In step S214, the flash-up routine is carried out. Namely, the first motor 11 is rotated and the flash case 4 is raised.

If it is confirmed in step S212 that the flash-up permitting flag is not set to "1", the control goes to step S216. In step S216, a flash-down permitting operation is performed. In the flash-down permitting operation, it is judged whether the taking down of the flash case 4 can be done or not. If it is judged that the taking down can be done, a flash-down permitting flag is set to "1".

In step S218, the flash-down permitting flag is checked. If it is confirmed that this flag is not set to "1" and the taking down of the flash case 4 is not to be carried out, the control goes to step S222.

If it is confirmed in step S218 that the flash-down permitting flag is set to "1", the control goes to step S220. In step S220, the first motor 11 is rotated and the taking down of the flash case 4 is carried out.

After the flash-up operation or the flash-down operation is completed, or if it is confirmed that both the flash-up permitting flag and the flash-down permitting flag are not set to "1" (NO in step S218), the control goes to step S222. In step S222, a previous flash detecting flag is set to a value based on the current on/off status of the flash-up detecting switch 230. Namely, this flag is set to a value which represents the current position of the flash 300 (up or down). Then, this routine is ended.

Figure 33:
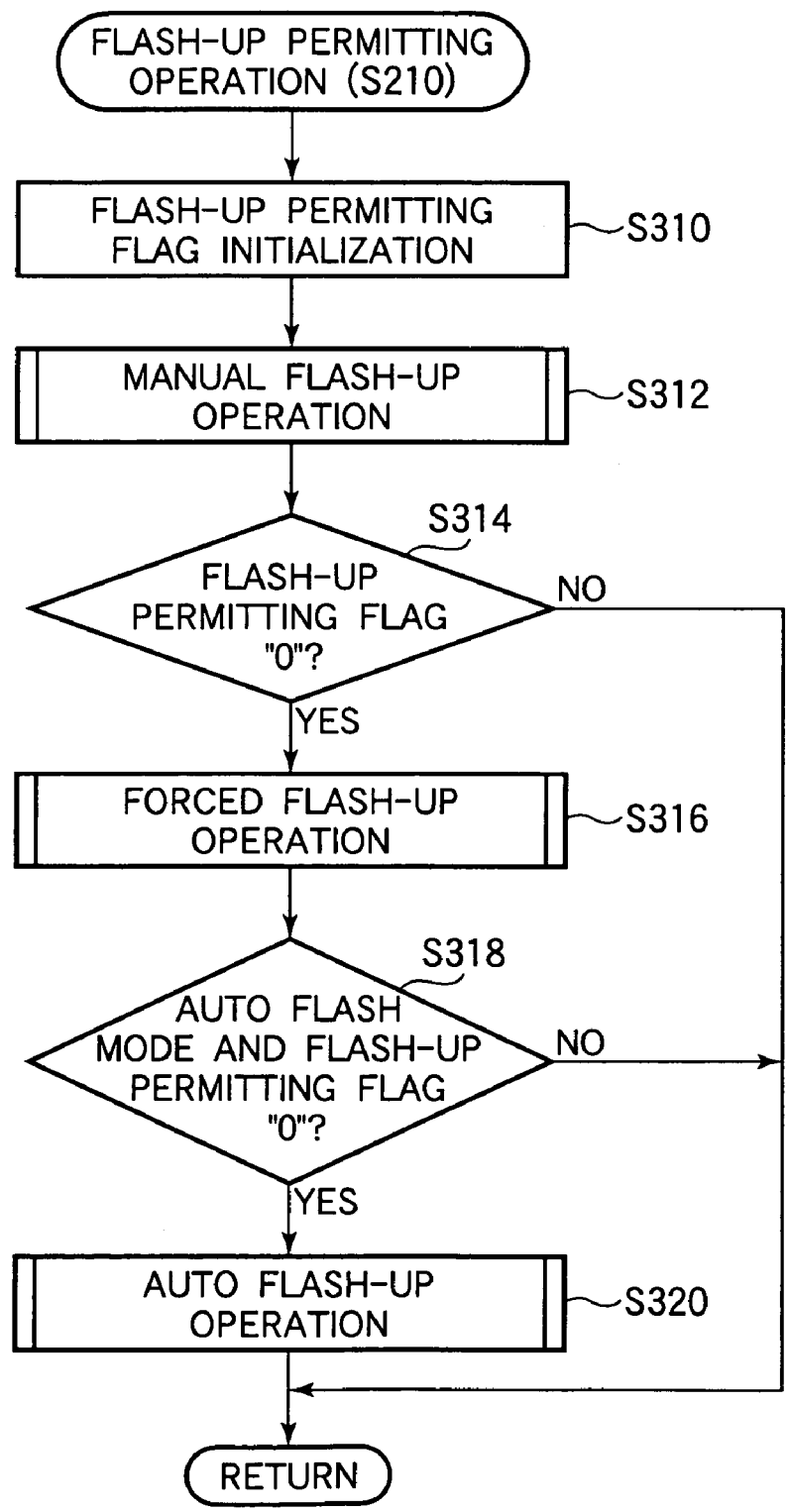
FIG. 33 is a flow-chart which shows procedures of a flash-up permitting operation.

FIG. 33 is a flow-chart which shows procedures of the flash-up permitting operation performed in step S210 of FIG. 32. In step S310, the flash-up permitting flag is set to "0" to be initialized. Next, in step S312, the manual flash-up operation is carried out. In this operation, it is checked if the flash-up button which is provided on the camera body 1 has been manipulated and the user has commanded the raising of the flash.

Figure 34:
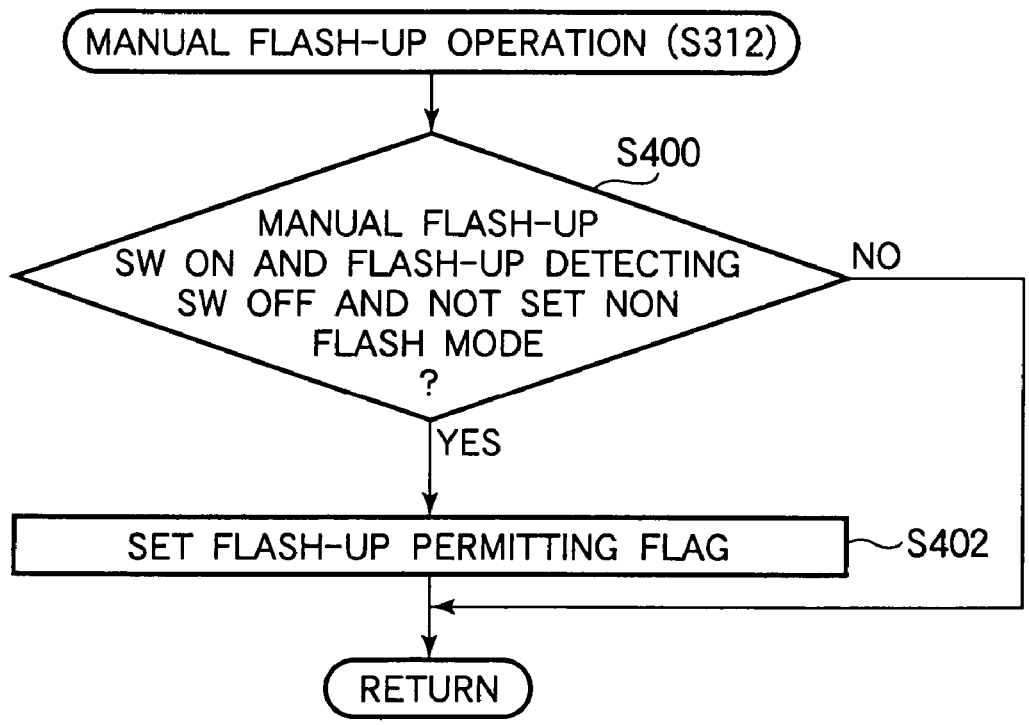
FIG. 34 is a flow-chart which shows procedures of a manual flash-up operation.

FIG. 34 is a flow-chart which shows the procedures for the manual flash-up operation of step S312. In step S400, it is checked if the manual flash-up switch 516 is on, the flash-up detecting switch 230 is off, and if the status of the flash mode switch 515 does not represent the non flash mode. When these conditions are met, it means that the user has selected the use of the flash 300 in a state where the flash case 4 is at the down position. Accordingly, the control goes to step S402, and the flash-up permitting flag is set to "1". On the other hand, when the conditions of step S400 are not met, the procedure of step S402 is skipped and this routine is ended. Namely, when the flash-up button is pressed in a state where the non-flash mode is set, or when the flash-up detecting switch 230 is on and the flash case 4 has already been raised, the flash-up permitting flag is kept "0".

After the manual flash-up operation has ended, it is checked in step S314 of FIG. 33 if the value of the flash-up permitting flag is "0". If it is confirmed that the value of the flag is "0", the control goes to step S316. In step S316, a forced flash-up operation is carried out.

Figure 35:
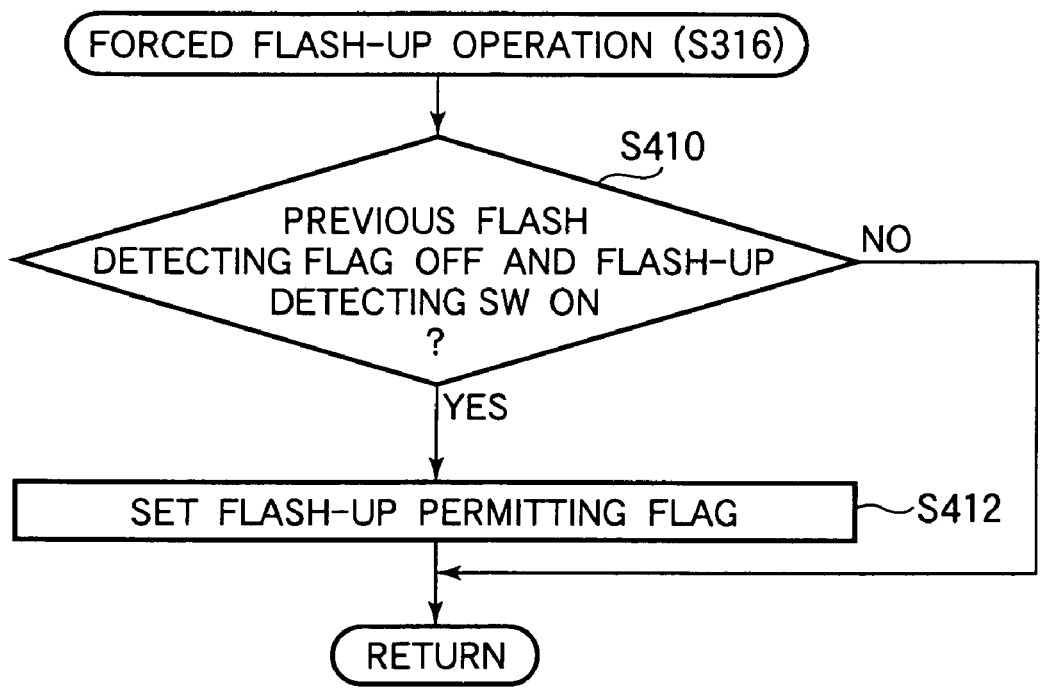
FIG. 35 is a flow-chart which shows procedures of a forced flash-up operation.

FIG. 35 is a flow-chart which shows the procedures of the forced flash-up operation. Instep S410, it is checked if the value of the previous flash detecting flag represents "off" and the flash-up detecting switch 230 is on. When these conditions are met, it means that the flash case 4 is positioned at the down position and the user begins to forcibly raise the flash case 4 by hand, without manipulating the manual flash-up switch 516. Accordingly, the control goes to step S412 and the flash-up permitting flag is set to "1" in order to carry out an up-operation of the flash case 4. Note that the up-operation will be described later. If it is confirmed that the conditions of step S410 are not met, the procedure of step S412 is skipped, and this routine is ended in a state where the flash-up permitting flag is kept "0".

After the forced flash-up operation is ended, the control goes to step S318 of FIG. 33. In step S318, it is checked if the status of the flash mode switch 515 represents the auto-flash mode and the value of the flash-up permitting flag is "0". If these conditions are met, the control goes to step S320 and an auto flash-up operation is carried out.

Figure 36:
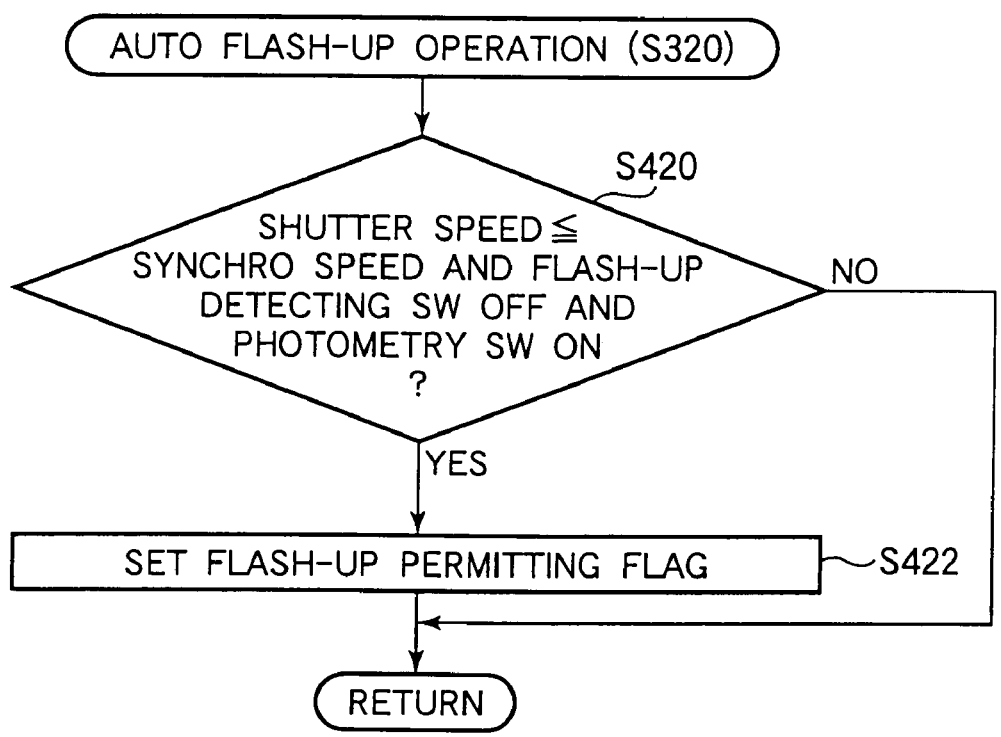
FIG. 36 is a flow-chart which shows procedures of an auto flash-up operation.

FIG. 36 is a flow-chart which shows the procedures for the auto flash-up operation. In step S420, it is confirmed that the shutter speed is equal to or less than a synchro-speed, the flash case 4 is at the down position, the flash-up detecting switch 230 is off, and the photometry switch is on. Note that the synchro-speed is a speed which the flash 300 can synchronize. As described above, this routine is performed when it is confirmed in step S318 of FIG. 33 that the auto flash mode is set. Further, when the conditions of step S420 are met, it means that the photometry switch is on in the auto flash mode, the shutter speed calculated in step S124 of FIG. 30 is equal to or less than the synchro-speed, and the flash case 4 is at the down position. Accordingly, the control goes to step S422 and the flash-up permitting flag is set to "1". If the conditions of step S420 are not met, the procedure in step S422 is skipped, and this routine is ended.

After the auto flash-up operation of step S320 is ended, the flash-up permitting operation is ended, and the control returns to step S210 of FIG. 32. As described above, the flash-up permitting flag is set to "1" in the following cases: the case in which the user selects the use of the flash 300 in the state where the flash case 4 is at the down position (judged in step S312); the case in which the user begins to forcibly raise the flash case 4 at the down position by hand (judged in step S316); and the case in which the photometry switch is turned on in the auto flash mode and the flash case is at the down position (judged in step S320). In these cases, the flash-up operation which is described later is carried out and the flash case 4 is raised.

Figure 37:
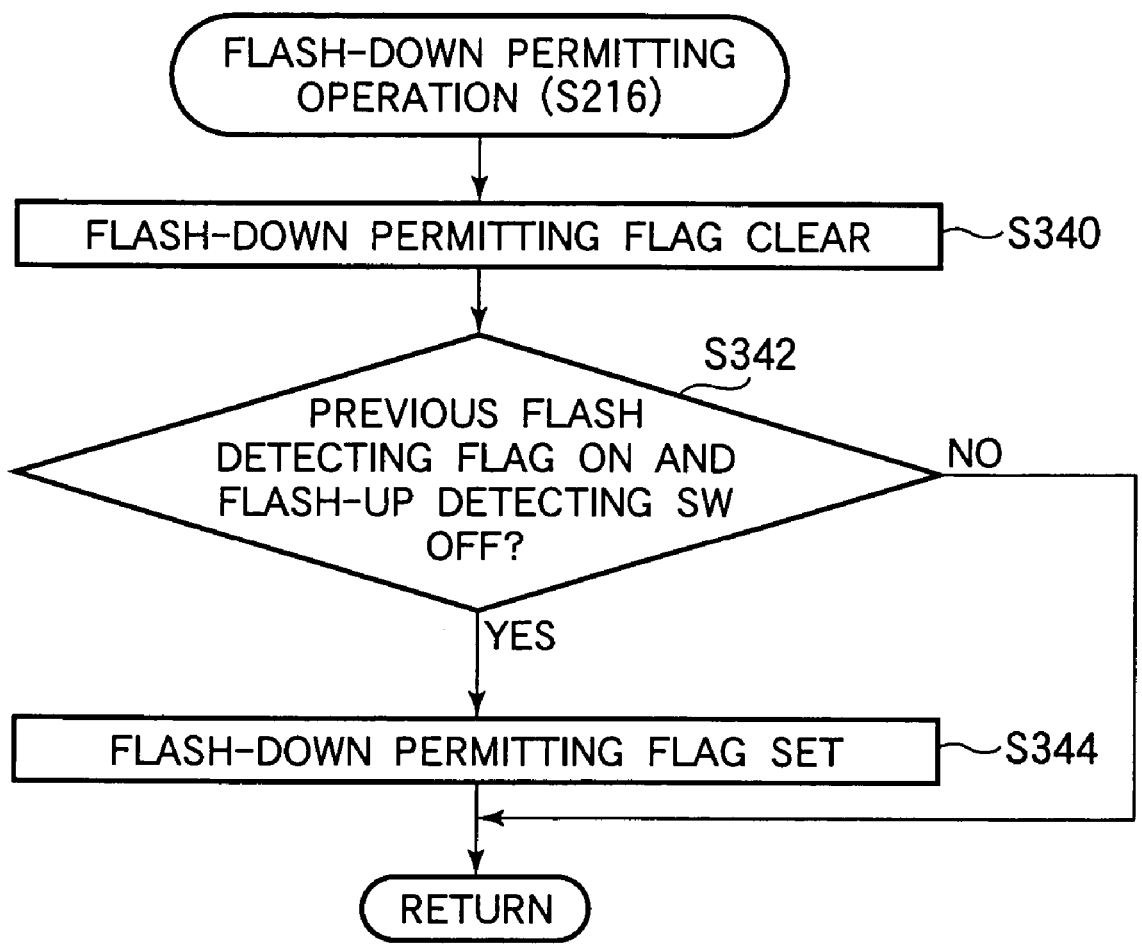
FIG. 37 is a flow-chart which shows procedures of a flash-down permitting operation.

FIG. 37 is a flow-chart which shows the procedures of the flash-down permitting operation which is called in step S216 of FIG. 32. In step S340, a flash-down permitting flag is set to "0" to be cleared. Next, in step S342, it is checked if the previous flash detecting flag is on and the flash-up detecting switch 230 is off. When these conditions are met, it means that an external force is added to the flash case 4 at the up position and the flash case 4 begins to be rotated to the down position. For example, when the user forcibly presses the flash case 4 to the down position by hand, or when the flash case 4 which is positioned at the up position is hit by other objects, these conditions are met. If the conditions of step S342 are met, the control goes to step S344, and the flash-down permitting flag is set to "1". If the conditions are not met, this routine is ended in a state where the flash-down permitting flag is kept "0".

With reference to FIG. 32, if it is confirmed in step S212 that the flash-up permitting flag is set to "1" after the flash-up permitting operation is called in step S210, the flash-up routine is called in step S214. Namely, the flash-up operation is called in the following cases: the case in which the user selects the raising of the flash case 4 in the state where the flash case 4 is at the down position; the case in which the user begins to forcibly raise the flash case 4 at the down position by hand; and the case in which the photometry switch is turned on in the auto flash mode and the flash case 4 is at the down position.

Further, when it is confirmed in step S212 that the flash-up permitting flag is still "0", and the flash-down permitting flag is set to "1" in step S218 after the flash-down permitting operation is called in step S216, the flash-down routine is called in step S220. Namely, when the user begins to forcibly take down the flash case 4 at the up position by hand, the flash-down operation is called.

Figure 38:
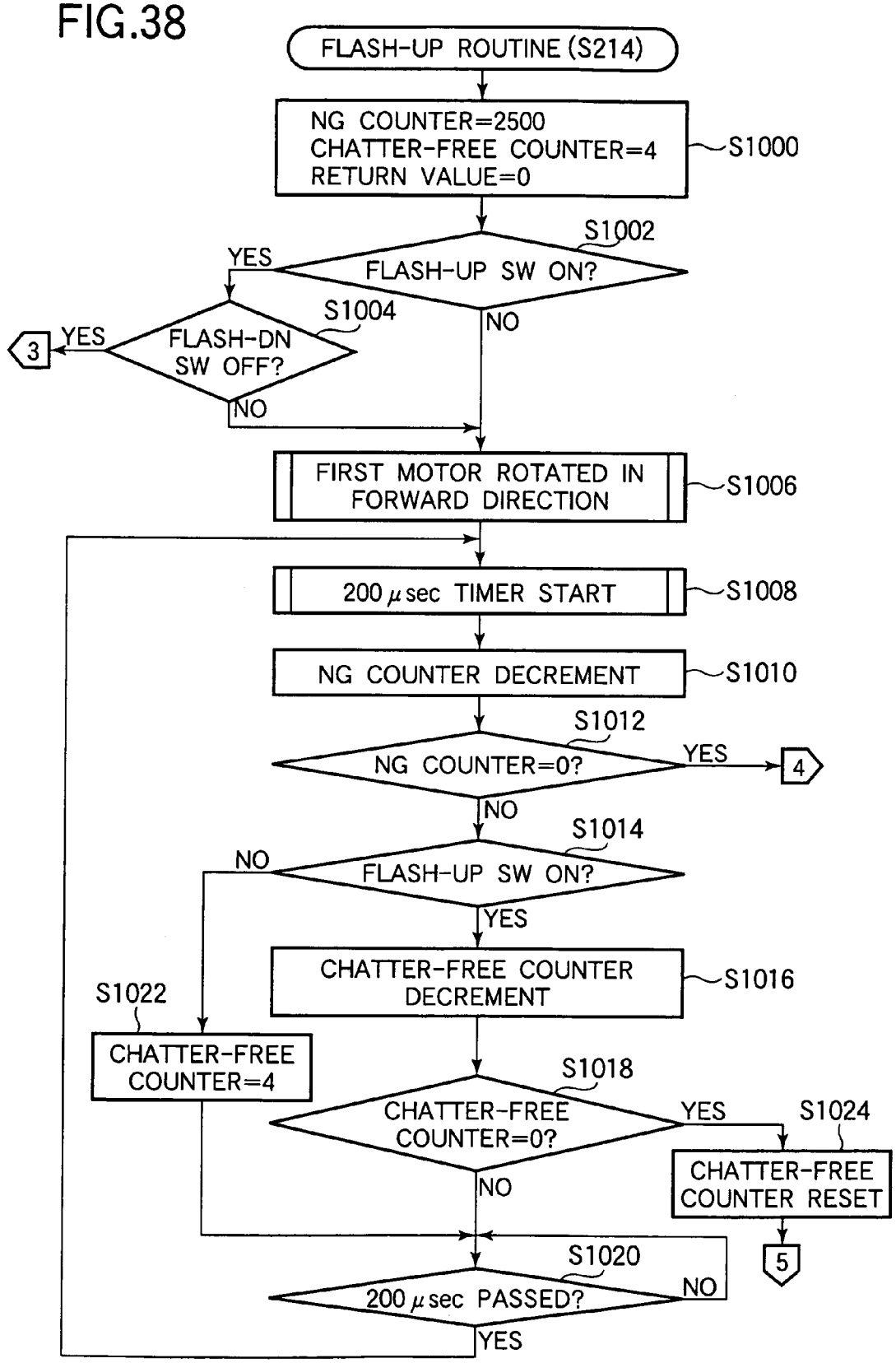
FIG. 38 is a flow-chart which shows the beginning procedures of rotation control of a first motor in an up routine of the flash case.
Figure 39:
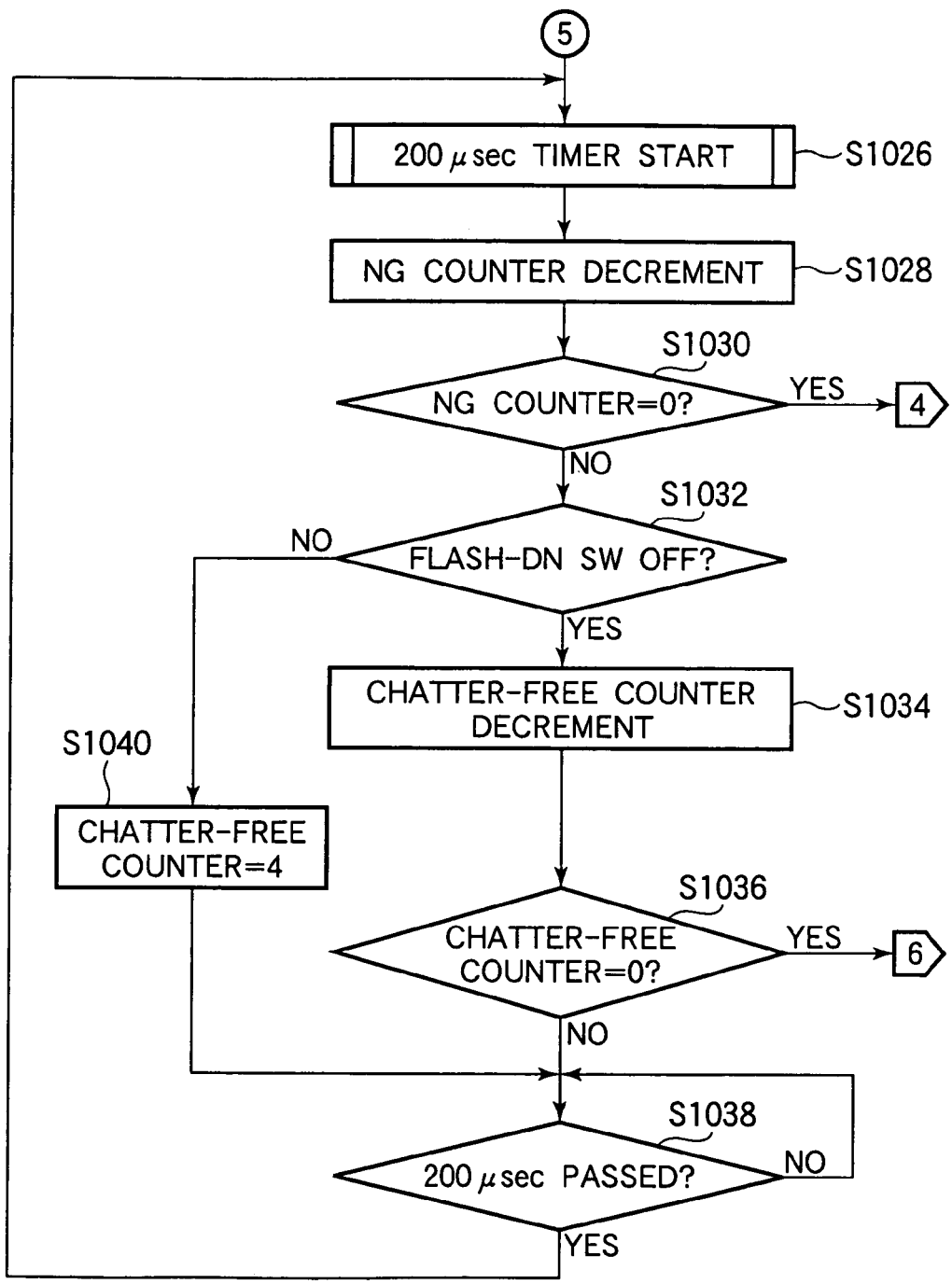
FIG. 39 is a flow-chart which shows the middle procedures of rotation control of the first motor in the up operation.
Figure 40:
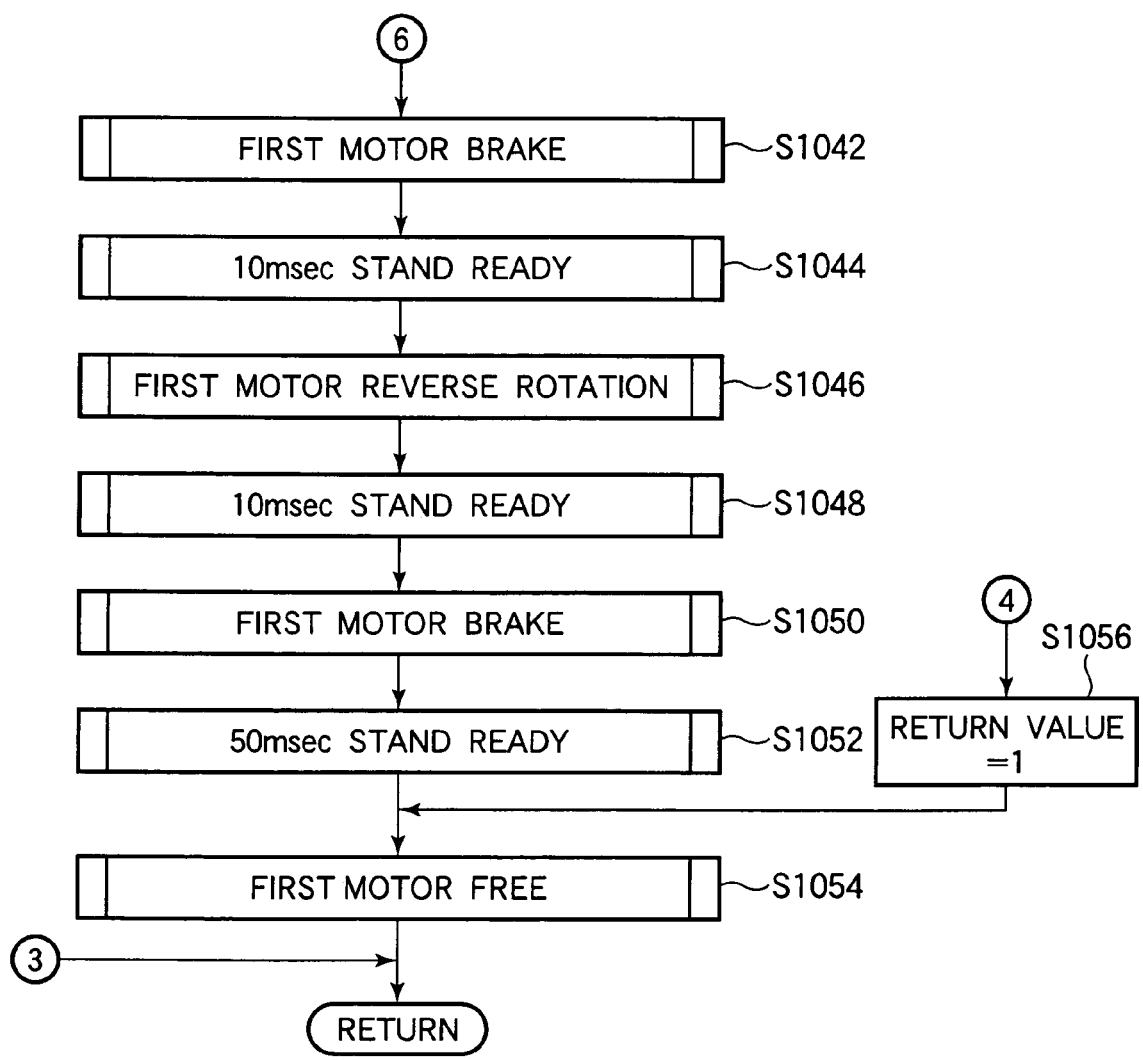
FIG. 40 is a flow-chart which shows the ending procedures of rotation control of the first motor in the up operation.

With reference to FIGS. 38 through 40, the procedures of the flash-up routine will be explained. In step S1000 of FIG. 38, counters and a return value are set to their original values. Namely, an NG counter is set to "2500", a chatter-free counter is set to "4", and the return value is set to "0".

When the driving mechanism is not driven due to trouble with any of the members after electrically energizing the first motor 11, the value of the NG counter is referred to. As described above, the positional relationship between the metal brush 123 and the code plate 124 is changed in accordance with the rotation of the cam gear 120. Therefore, based on the change of this positional relationship, it is confirmed by the value of the chatter-free counter that the metal brush 123 and the up and down portions 124a and 124b of the code plate 124 are in contact. When the flash-up operation has ended, the return value is returned to the routine that calls the flash-up operation.

Instep S1002, it is checked whether the flash-up switch 125, which is connected to the code plate 124, is on or not. If it is confirmed that the switch 125 is on, the control goes to step S1004. In step S1004, it is checked whether the flash-down switch 126 is off or not. When it is confirmed in this step that the flash-down switch 126 is off, this means that the flash-up switch 125 is on and the flash-down switch 126 is off. Namely, it means that the metal brush 123 is in the area UP of FIG. 20 and the flash case 4 is at the up position. Accordingly, the procedures of this operation are not carried out and this operation is ended (see FIG. 40).

If it is confirmed in step S1002 that the flash-up switch 125 is off, or if it confirmed in step S1004 that the flash-down switch 126 is on, the control goes to step S1006. When the metal brush 123 is in the areas UD, DN, or DU (see FIG. 20), the flash-up switch 125 is off or the flash-down switch

126 is on. In step S1006, the first motor 11 is rotated in the forward direction in order to rotate the flash case 4.

Next, in step S1008, a 200 μsec (micro second) timer is started, and in step S1010, the NG counter is decremented by "1". In step S1012, the value of the NG counter is checked. If the value reaches "0", it is judged that a state where each driving mechanism is not driven has continued for a predetermined time. Namely, the forward rotation of the first motor 11 continued, but each driving mechanism is not driven. Accordingly, the control goes to step S1056 of FIG. 40, the return value is set to "1" which represents an abnormal end. Then, this operation is ended.

If it is confirmed in step S1012 that the NG counter has not reached "0", the control goes to step S1014. In step S1014, it is checked whether the flash-up switch 125 is on or not. If it is confirmed that the switch 125 is on, the control goes to step S1016. In step S1016, the chatter-free counter is decremented by "1". Next, in step S1018, it is checked whether the chatter-free counter has reached "0" or not. If it is confirmed in step S1018 that the chatter-free counter has not reached "0", the control goes to step S1020, and it is checked whether 200 μsec have passed or not. If 200 μsec have passed, the control returns to step S1008, and the above-mentioned procedures are repeated.

If it is confirmed in step S1014 that the flash-up switch 125 is not on, the chatter-free counter is reset to "4" in step S1022. Then, the control goes to step S1020, and the above-mentioned procedure is carried out.

If it is confirmed in step S1018 that the chatter-free counter has reached "0", the control goes to step S1024. In step S1024, the chatter-free counter is reset to "4", and the control goes to step S1026 of FIG. 39.

As described above, the procedures from step S1008 through step S1022 are looped one time per 200 μsec, and the NG counter is decremented by "1" per 200 μsec. Accordingly, when the loop operation from step S1008 through step S1022 has been repeated continuously for 0.5 sec, the NG counter reaches "0". In this embodiment, it is judged that this state indicates an abnormal state where each driving mechanism is not driven against the forward rotation of the first motor 11.

Further, in the above-mentioned loop operation, if it is confirmed that the flash-up switch 125 is on, the chatter-free counter is decremented by "1", and then when the chatter-free counter changes from the initial value "4" to "0", the loop operation is ended and the control goes to step S1024. In other words, after confirming that the flash-up switch 125 is off or the flash-down switch 126 is on, and starting the forward rotation of the first motor 11, if the flash-up switch 125 is on for 800 μsec (200 μsec×4), the control goes to step S1024. Namely, if it is confirmed that a state where the flash-up switch 125 is on, has continued for 800 μsec, the loop operation is ended and the procedures described next are carried out.

When it is confirmed that the flash-up switch 125 is on for 800 μsec, and the chatter-free counter is reset in step S1024, the control goes to step S1026 of FIG. 39. The loop operation from step S1026 through step S1040 is carried out similarly to the above-mentioned loop operation from step S1008 through step S1022. In this loop operation, it is checked whether a state exists in which each driving mechanism has not been driven for 0.5 sec, while the electrically energizing of the first motor 11 has continued, or whether a state exists in which the flash-down switch 126 is off, has continued for 800 μsec. Namely, if it is confirmed in step S1030 that the NG counter has reached "0", the control goes to step S1056 of FIG. 40, the return value is set to "1", and this routine is ended.

Further, if it is confirmed in step S1036 that the chatter-free counter has reached "0" and a state in which the flash-down switch 126 is off has continued for 800 μsec, the control goes to step S1042 of FIG. 40, and the procedures after step S1042 are carried out.

When a state, in which the flash-up switch 125 is on and the flash-down switch 126 is off, has continued for a predetermined time, the control goes to step S1042. Namely, when the control goes to step S1042, the metal brush 138 enters the area UP (see FIG. 20), due to the forward rotation of the first motor 11 which started in step S1006, so that it can be determined if the flash case 4 has reached the up position. Accordingly, in the procedures from step S1042, the operation for stopping the first motor 11 is carried out.

In step S1042, a short brake operation is carried out. Both terminals of the first motor 11 are lowered to the ground level by the short brake operation. Next, after standing ready for 10 msec in step S1044, the first motor 11 is rotated in the opposite direction (namely, there verse direction) in step S1046. After standing ready for 10 msec in step S1048, the short brake operation similar to that in step S1042 is carried out in step S1050. Next, after standing ready for 50 msec, the first motor 11 is electrically deenergized, and this routine is ended.

Figure 41:
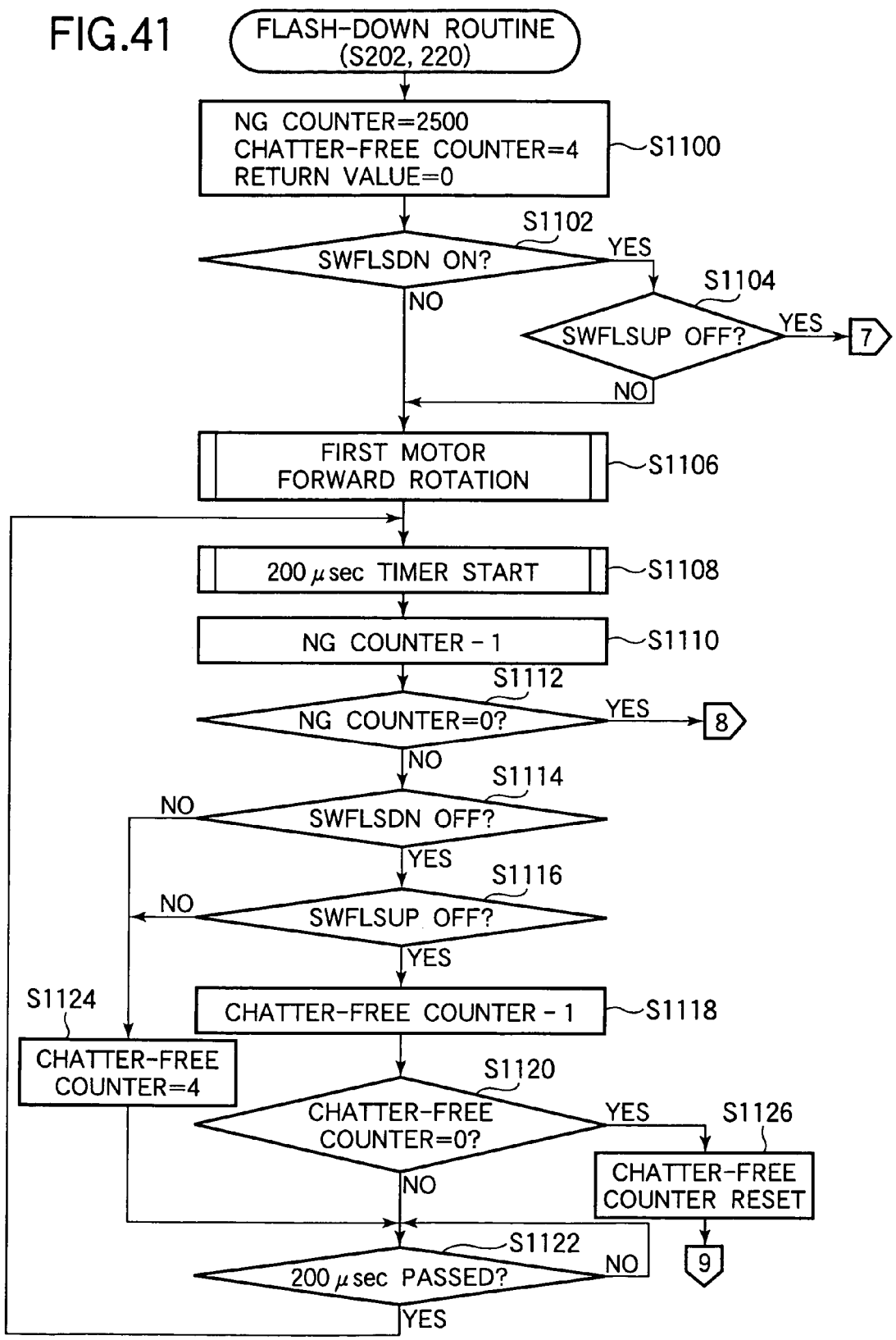
FIG. 41 is a flow-chart which shows the beginning procedures of rotation control of the first motor in a down routine of the flash case.

Now, with reference to FIGS. 41 through 43, the flash-down routine, which is carried out in the above-mentioned step S202 and step S220, will be explained. In steps S1100, the counters and the return value are initialized. Namely, the NG counter is set to "2500", the chatter-free counter is set to "4", and the return value is set to "0". When the flash-down switch 126 is on and the flash-up switch 125 is off (YES in step S1102 and YES in step S1104), it is judged that the metal brush 123 is in the area DN (see FIG. 20) and the flash case 4 is already at the down position. Accordingly, the procedures after step S1104 are not carried out, and this routine is ended.

When the flash-down switch 126 is off (NO in step S1102), or when the flash-down switch 126 is on and the flash-up switch 125 is on (YES in step S1102 and NO in step S1104), the control goes to step S1106. In step S1106, the rotation of the first motor 11 in the forward direction is started.

The loop operation from step S1108 through step S1124 is approximately similar to the operation from step S1008 through step S1022. This loop operation is carried out one time per 200 μsec. Note that, in this routine, if it is confirmed that both the flash-down switch 126 and the flash-up switch 125 are off (YES in step S1114 and YES in step S1116), the chatter-free counter is decremented by "1".

Figure 42:
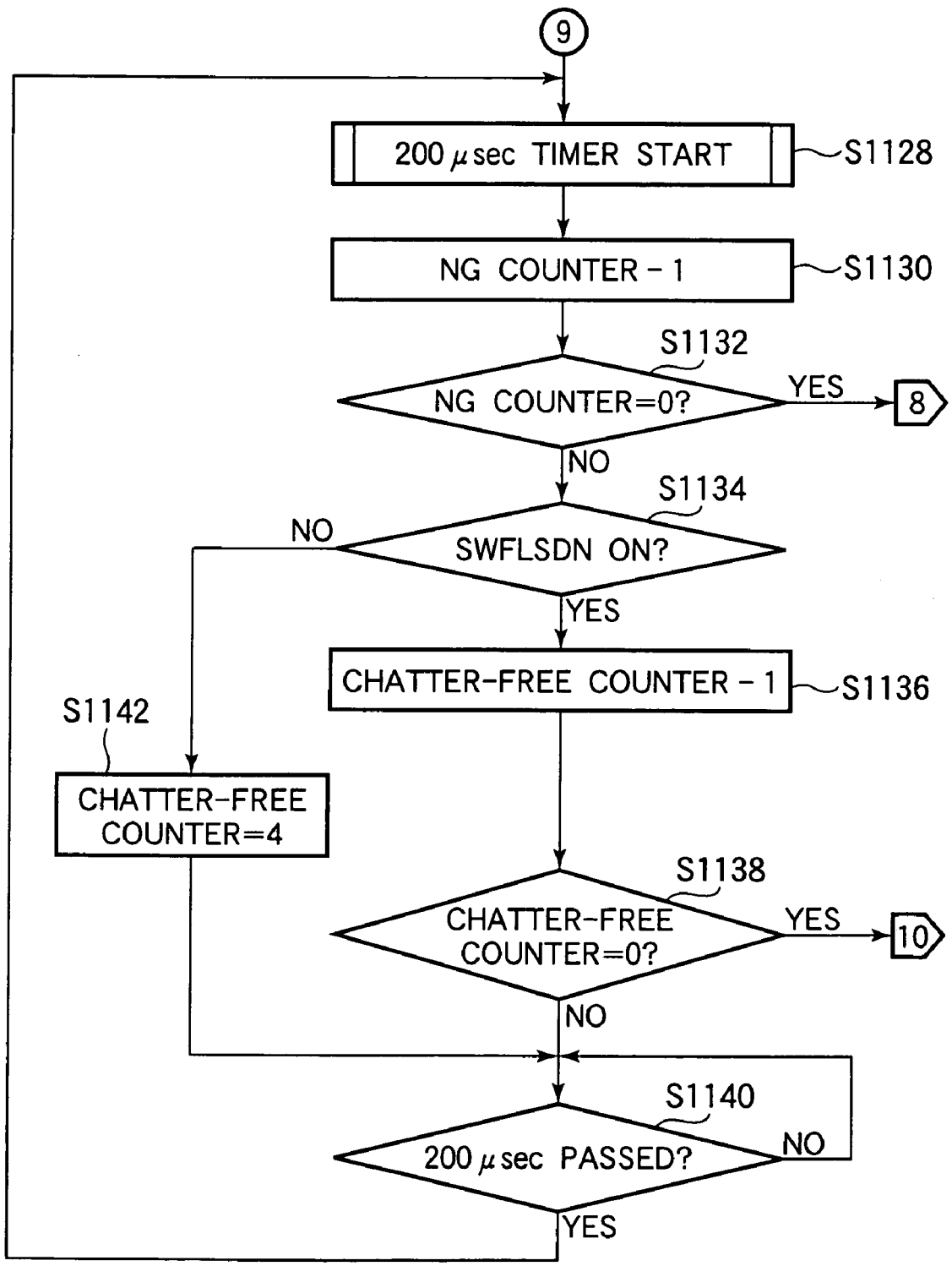
FIG. 42 is a flow-chart which shows the middle procedures of rotation control of the first motor in the down operation.
Figure 43:
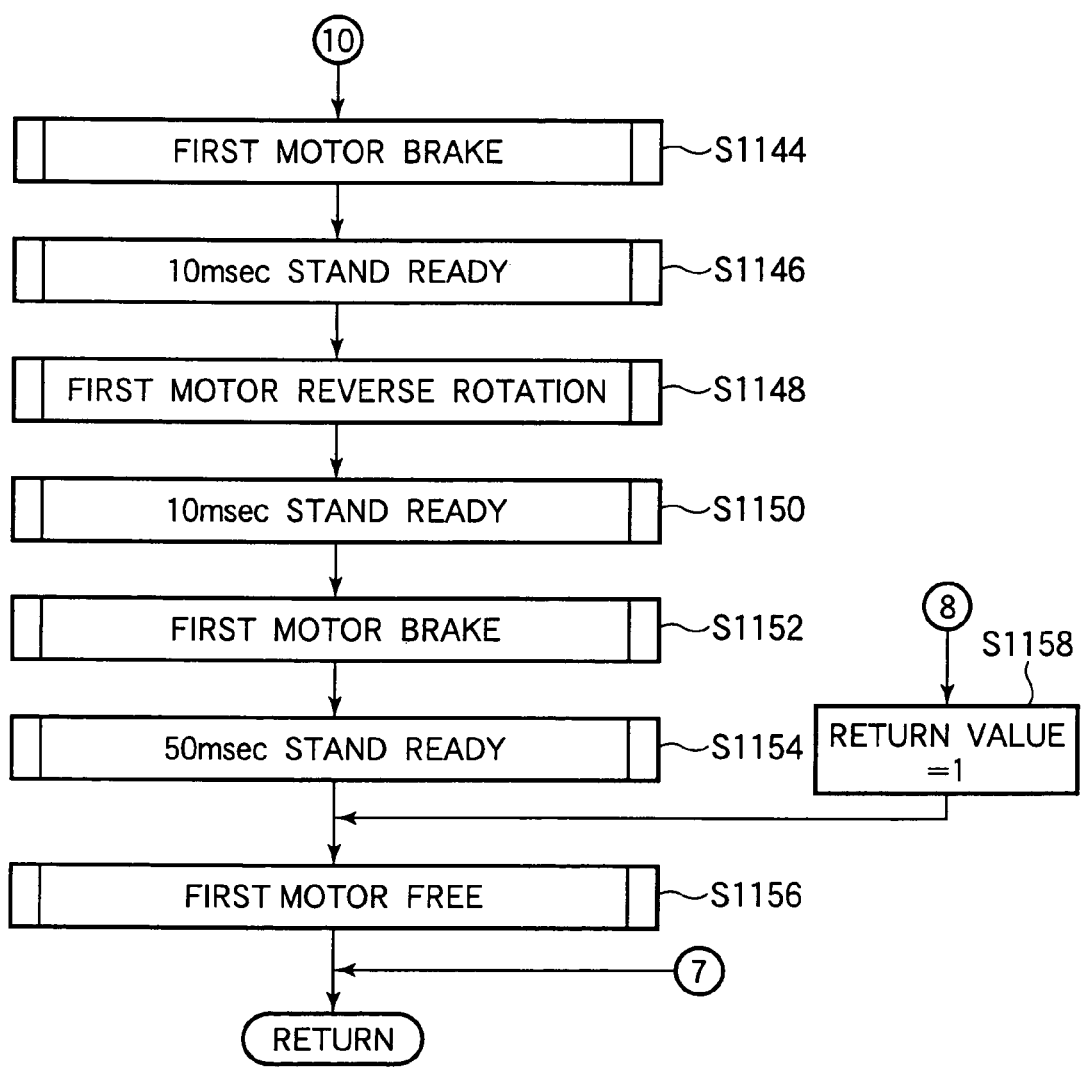
FIG. 43 is a flow-chart which shows the ending procedures of rotation control of the first motor in the down operation.

If it is confirmed that the chatter-free counter has reached "0" (YES in step S1120) and the metal brush 123 is in the area UD (see FIG. 20), the chatter-free counter is reset in step S1126, and the control goes to step S1128 of FIG. 42. The loop operation from step S1128 through step S1142 is approximately similar to the operation from step S1026 through step S1040 of FIG. 39. Note that, in this routine, if it is confirmed that a state in which the flash-down switch 126 is on has continued for 200 μsec (YES in step S1138), the control goes to step S1144 of FIG. 43. Namely, if it is confirmed that the metal brush 123 has moved from the area UD to the area DN, the procedures of step S1144 and the following steps are carried out.

The procedures from step S1144 through step S1156 are identical to the procedures from step S1042 through step S1054 of FIG. 40. Namely, after the short brake operation (steps S1144, S1152) and the reverse rotation of the first motor 11 (step S1148) are carried out, with the predetermined waiting times, the first motor 11 is stopped.

As described above, if the power to the camera body 1 is turned off in a state where the flash case 4 is at the up position, the operation of taking down the flash case 4 is carried out. Accordingly, if the user forgets to take down the flash case 4 after photographing with the flash 300, the flash 300 is automatically returned to the inside of the camera body 1.

Further, in this embodiment, the flash-up detecting switch 230, which is turned on/off in accordance with the movement of the flash case 4, is provided, and the previous flash detecting flag is updated with the updated status of the switch 230, at predetermined time intervals. Accordingly, by comparing the flag and the current status of the switch 230, it is possible to detect the situations: where the user begins to forcibly raise the flash case 4 by hand, which is at the down position; and: where the flash case 4 at the up position is pressed by an external force. In this embodiment, if the former situation is detected, the flash case 4 is automatically raised, and if the latter situation is detected, the flash case 4 is automatically taken down. In other words, if the user directly manipulates the flash case 4 by hand, it is possible to automatically drive the flash case 4 to the up or down positions without damaging the driving mechanism of the flash case 4.

As described above, the up and down operations of the flash case 4 are automatically performed for the predetermined situations. Accordingly, the convenience of manipulating the flash 300 is improved, and further, each member related to the flash case 4 is prevented from being damaged due to the continuation of the state where the flash case 4 is at the up position.

As described above, according to the present invention, the convenience of manipulating the flash case of the single-lens reflex camera is improved.

The present disclosure relates to subject matter contained in Japanese Patent Application No. P2003-040018 (filed on Feb. 18, 2003) which is expressly incorporated herein, by reference, in its entirety.

The invention claimed is:

1. A flash controlling mechanism of a camera comprising:
   a flash;
   a flash case in which said flash is housed, said flash case being rotatably supported by a camera body;
   a case rotating mechanism that moves said flash case between a down position at which said flash case is received by said camera body and an up position at which said flash case projects from said camera body; and
   a controller that controls said case rotating mechanism such that when said flash case at said down position is moved towards said up position by an external force, said flash case is automatically moved to said up position, when said flash case at said up position is moved towards said down position by an external force, said flash case is automatically moved to said down position, and when said flash case is at said up position and a power source of said camera body is turned off, said flash case is automatically moved to said down position;
   a first position detector that detects a current position of said flash case;
   a position memory in which a detected result of said first position detector is stored; and
   a comparator that compares said current position detected by said first position detector with said detected result which has been stored by said position memory;
   wherein, when said current position is different from said stored detected result, said controller drives said case rotating mechanism such that said flash case is moved to a position opposite to said stored detected result, and when said power source is turned off and said current position is said up position, said controller drives said case rotating mechanism such that said flash case is moved to said down position.

2. The flash controlling mechanism of a camera according to claim 1, wherein said first position detector is a switch, said switch is off when said flash case is at said down position, said switch is on when said flash case is at said up position, and the on/off status of said switch is changed when said flash case passes a predetermined position between said up and down positions.

3. A flash controlling mechanism of a camera comprising:
   a flash;
   a flash case in which said flash is housed, said flash case being rotatably supported by a camera body;
   a case rotating mechanism that moves said flash case between a down position at which said flash case is received by said camera body and an up position at which said flash case projects from said camera body;
   a controller that controls said case rotating mechanism such that when said flash case at said down position is moved towards said up position by an external force, said flash case is automatically moved to said up position, when said flash case at said up position is moved towards said down position by an external force, said flash case is automatically moved to said down position, and when said flash case is at said up position and a power source of said camera body is turned off, said flash case is automatically moved to said down position;
   wherein said case rotating mechanism comprises:
   a motor that provides a rotational force;
   a gear train that transmits the rotational force of said motor;
   a cam gear that is connected to said gear train, a cam being provided on one surface of said cam gear;
   a cam follower that is moved in accordance with rotation of said cam due to rotation of said cam gear;
   a converter that converts movement of said cam follower to rotation of said flash case;
   a position detector that detects a position of said flash case; and
   a motor controller that drives said motor in accordance with the detected result of said position detector.

4. The flash controlling mechanism of a camera according to claim 3, wherein said position detector includes:
   a brush that is provided on another surface of said cam gear;
   a code plate that is provided so as to face said another surface of said cam gear, and on which detecting areas are provided for detecting movement of said flash case due to the rotation of said cam gear; and
   a switch that works in accordance with the contact and non-contact status of said brush and said detecting areas.

5. A flash controlling mechanism of a camera comprising:
   a flash;
   a flash case in which said flash is housed, said flash case being rotatably supported by a camera body;
   a case rotating mechanism that moves said flash case between a down position at which said flash case is received by said camera body and an up position at which said flash case projects from said camera body;
   a controller that controls said case rotating mechanism such that when said flash case at said down position is moved towards said up position by an external force, said flash case is automatically moved to said up position, when said flash case at said up position is moved toward said down position by an external force, said flash case is automatically moved to said down position, and when said flash case is at said up position and a power source of said camera body is turned off, said flash case is automatically moved to said down position;

wherein said case rotating mechanism comprises:

a first connecting member that is mounted on and moved with said flash case, said first connecting member including a first engaging portion;

a second connecting member that includes a second engaging portion which is configured for engagement with said first engaging portion;

an urging member that urges said second connecting member such that said second connecting member is engaged with said first connecting member;

a pressing member that is moved together with said second connecting member, said pressing member comprising an arm configured to extend towards said first connecting member; and a driving mechanism that rotates said second connecting member;

wherein said first engaging portion is engaged with one of said second engaging portion and said pressing member.

6. The flash controlling mechanism of a camera according to claim 5, wherein said urging member urges said second connecting member in a first direction whereby said flash case is moved to said up position, and said first engaging portion is engaged with said pressing member when said second connecting member is driven in a second direction opposite to said first direction by said driving mechanism.

7. The flash controlling mechanism of a camera according to claim 1, said case rotating mechanism comprising:

a motor that provides a rotational force;

a rotational force transmission mechanism that causes a follower to move in association with movement of the motor;

a converter that converts movement of the follower into rotation of said flash case;

a further position detector that detects a position of said flash case; and a motor controller that controls driving of said motor in accordance with a position of said flash case detected by said further position detector.

8. The flash controlling mechanism of a camera according to claim 5, said case rotating mechanism comprising:

a motor that provides a rotational force;

a rotational force transmission mechanism that causes a follower to move in association with movement of the motor;

a converter that converts movement of the follower into rotation of said flash case;

a position detector that detects a position of said flash case; and a motor controller that controls driving of said motor in accordance with a position of said flash case detected by said position detector.

9. The flash controlling mechanism of a camera according to claim 3, further comprising:

a further position detector that detects a current position of said flash camera;

a memory in which a detected result of said further position detector is stored; and a comparator that compares said current position with said detected result;

wherein, when said current position is different from said detected result, said controller drives said case rotating mechanism such that the flash case is moved to a position opposite to said detected result; and when said power source is turned OFF and said current position is said up position, said controller drives said case rotating mechanism such that such flash case is moved to said down position.

10. The flash controlling mechanism of a camera according to claim 5, further comprising:

a position detector that detects a current position of said flash camera;

a memory in which a detected result of said position detector is stored; and a comparator that compares said current position with said detected result;

wherein, when said current position is different from said detected result, said controller drives said case rotating mechanism such that the flash case is moved to a position opposite to said detected result; and when said power source is turned OFF and said current position is said up position, said controller drives said case rotating mechanism such that such flash case is moved to said down position.

11. The flash controlling mechanism of a camera according to claim 1, said case rotating mechanism comprising:

a first connector mounted on and moveable with said flash case, said first connector including a first engager;

a second connector that includes a second engager, said second engager being configured for engagement with said first engager;

an urging member that urges one of said first and second connectors such that said first and second connectors are engaged;

a presser mounted for movement together with said second connector, said presser extending towards said first connector and having a length configured to provide a predetermined space between said second engager and said presser; and a driver mechanism that rotates said second connector;

wherein said first engager is engaged with one of said second engager and said presser.

12. The flash controlling mechanism of a camera according to claim 3, said case rotating mechanism comprising:

a first connector mounted on and moveable with said flash case, said first connector including a first engager;

a second connector that includes a second engager, said second engager being configured for engagement with said first engager;

an urging member that urges one of said first and second connectors such that said first and second connectors are engaged;

a presser mounted for movement together with said second connector, said presser extending towards said first connector and having a length configured to provide a predetermined space between said second engager and said presser; and a driver mechanism that rotates said second connector;

wherein said first engager is engaged with one of said second engager and said presser.

* * * * *